United States Patent [19]

Marshall et al.

[11] 3,740,466

[45] June 19, 1973

[54] SURVEILLANCE SYSTEM

[75] Inventors: James M. Marshall, Melbourne Beach; James W. Biglow, South Melbourne Beach, both of Fla.

[73] Assignee: Jackson & Church Electronics Company, Inc., Satellite Beach, Fla.

[22] Filed: Dec. 14, 1970

[21] Appl. No.: 98,002

[52] U.S. Cl......... 178/6.8, 178/DIG. 3, 178/DIG. 33

[51] Int. Cl. .............................................. H04n 7/18

[58] Field of Search............... 178/DIG. 33, DIG. 3, 178/6.8

[56] References Cited

UNITED STATES PATENTS

| | | | |
|---|---|---|---|
| 3,590,151 | 6/1971 | Keith | 178/6.8 |
| 3,532,865 | 1/1972 | Haskell et al. | 178/DIG. 3 |
| 3,531,588 | 9/1970 | Kartchner | 178/DIG. 33 |
| 3,603,729 | 9/1971 | Sperber | 178/6.8 |
| 3,580,998 | 5/1971 | Hammond et al. | 178/6.8 |
| 2,561,197 | 7/1951 | Goldsmith | 178/DIG. 33 |

*Primary Examiner*—Howard W. Britton
*Attorney*—Woodhams, Blanchard and Flynn

[57] ABSTRACT

A method and apparatus by which surveillance can be maintained over a domain for detecting changes of interest in the domain and ignoring other changes. A parameter of the domain under surveillance is scanned resulting in an electrical signal which is sampled. The resulting sample signals each correspond to an individual sample point or line segment in the domain under surveillance and are digitized. Digitized samples are stored in a memory unit. An arithmetic unit based on a Karnaugh mapping technique compares to current sample with a prior sample from the memory unit for the same sample point or segment in the domain and provides an alert signal when these differ by more than a predetermined amount. A plurality of scanning devices may be provided to a monitor. If an alert occurs, an intrusion logic unit determines if an alert signal previously occurred during a prior scanning period for the same scanning device and if so an alarm is actuated and the monitor is switched to display the signal from that scanning device.

27 Claims, 22 Drawing Figures

PATENTED JUN 19 1973

3,740,466

SHEET 02 OF 13

PATENTED JUN 19 1973

3,740,466

SHEET 08 OF 13

PATENTED JUN 19 1973

3,740,466

SURVEILLANCE SYSTEM

FIELD OF THE INVENTION

This invention relates to a method and apparatus for detecting significant changes in preselected parameters of a domain, and more particularly relates to a method and apparatus for sampling a signal representative of said parameters and for interpreting said samples to detect changes of interest while ignoring other changes not of interest.

BACKGROUND OF THE INVENTION

The present invention is an improvement on the invention of pending application Ser. No. 687,029 filed Nov. 30, 1967, now U.S. Pat. No. 3,590,151 and assigned to the Assignee of the present invention. Although the method and apparatus disclosed in the aforementioned prior application have proved highly satisfactory in use, it has been found that many uses exist wherein the level of sophistication provided by the apparatus of such prior application is not required to give a satisfactory result. Thus, the present invention arose out of a continuing effort to improve methods and apparatus for discriminating between significant and nonsignificant changes (that is, changes which are of interest to the system operator and changes which are not of interest) in a domain under surveillance, and more particularly, to provide a system of reduced complexity and cost capable of yielding satisfactory results in at least many of the uses of the system of the abovementioned prior application.

The method and apparatus embodying the invention are here illustrated in a preferred form, more particularly, as a television motion detection surveillance system. However, it will be recognized that at least in its broader aspects, the invention is readily adaptable to a number of other uses. The surveillance method and apparatus of the present invention, at least broadly considered, may, for example, be used for pattern comparison, (for example, to detect incorrect labelling of bottles on a filling line, incorrect distribution geometry and density in a particle suspension, incomplete or incorrect assembly of complex mechanical devices on an assembly line) or a variety of other uses wherein it is desired that certain changes in the appearance of a viewed area or of a set of similar, sequentially presented articles be noted.

Although the present invention arose from a need for a change detecting device and method having a strong capability for rejecting extraneous changes in a visible domain, it is contemplated that the invention in its broader aspects is applicable to other and nonvisible domains of a continuous or quasi-continuous nature, i.e., domains capable of being scanned and sampled. Thus, the term "domain" in its broadest sense is applicable not only to a scene illuminated by visible light but to an area emanating electromagnetic or other energy radiation other than visible light. As an example, the latter domain might comprise sounds generated by a normally functioning piece of mechanical equipment in which changes indicating malfunction are to be detected. It is further contemplated that the invention, in its broader aspects is also applicable to detecting significant changes on entities capable of providing a substantially continuous electrical output signal, which can be sampled.

The term "surveillance" as used in its broadest sense herein includes the concept of observation of the domain of interest for long, continuous periods or short, occasional periods and it is not intended that the term be limited to the sense of guarding a changeable domain, although the primary embodiment of the invention is particularly adapted to such use.

The embodiment of the invention shown is, however, particularly useful for maintaining surveillance over warehouses, storerooms, vaults, closed stores and other situations where human watchmen or sentinels have historically been used to detect trespassing persons or things or undesirable occurrences such as fire or the like. As a result, the following discussion will, for convenience in illustration only and not in limitation, refer primarily to such use.

Despite their traditional importance, there has been a recent tendency to replace or supplement human guards with mechanized devices, usually electronic devices, including those with visual sensing capabilities. In one known arrangement, one human guard is enabled to do the work of several by watching a television receiver connectible alternatively to a plurality of television cameras positioned to view areas or objects to be protected. In this arrangement, no area is continuously under surveillance which may allow an undesirable condition to escape detection or at least may delay detection. Further, actual detection of a prowler or the like is still done by the human guard and thus depends on his sharpness of perception as well as his alertness and integrity.

A further known device provides a television screen fed from a television camera surveying the area to be protected in which a plurality of photocells are fixed in front of the television screen. A change in photocell output activates an alarm. Such a device, has a number of disadvantages. More particularly, each photocell tends to detect the average light intensity of over a relatively large area of television screen, corresponding in size to the photocell itself. Thus, changes in the image within that area would not be detected unless the average light intensity for the area changed. Thus, such systems have not generally had a high degree of discrimination.

Further, a relatively large range of light intensity change must be allowed for each photocell to prevent false alarms due to variations in the light input to the photocell caused by normal electrical and optical noise, e.g., noise from power line fluctuation, radio frequency interference and a wide variety of other sources. Even when the sensitivity of such a system is set at a relatively low level it would be expected that a relatively high incidence of false alarms due to large amplitude, random noise might occur. Further, such known systems may be sensitive to false alarms resulting from natural phenomena not of interest to the operator such as the gradual darkening of a windowed room at dusk and shifting of shadows thrown by sun-lit objects in the field of view.

A basic requirement of an effective surveillance system is the ability to sense a parameter, such as light emanating from a domain under surveillance, to detect changes therein, to discriminate between changes signifying that an event of interest has occurred in the domain and other changes in the domain or spurious signals within the surveillance system which are not resultant from such an event of interest and to provide an indication that an event of interest has occurred. Of particular importance in mechanical or electronic surveillance systems, is the ability to discriminate between changes in the domain resulting from the occurrence or nonoccurrence of an event of interest and other changes which are not the result of the occurrence or nonoccurrence of such event of interest. The latter types of changes, whether occurring in the domain under surveillance or in the surveillance system itself, can be considered noise, that is, changes to be ignored and which should not result in a system output or alarm. A surveillance system which provides an alarm due to any change in the domain would be of little or no use.

As a result, it is an object of this invention to provide a method and apparatus for maintaining surveillance over subject matter, noting changes therein, reliably discriminating between meaningful and meaningless changes therein and causing an alarm to be actuated upon occurrence, or alternatively, upon nonoccurrence, of a meaningful change.

A further object is to provide a method and apparatus, as aforesaid, which does not utilize human perception or judgment to actuate an alarm in response to an undesired change in the subject matter.

A further object is to provide a method and apparatus, as aforesaid, in which the subject matter is a scene viewed, and in which the number of points changing in light intensity, the magnitude of intensity change and the distribution of changes in space and time are considered and compared to preselected limits to determine whether an alarm should be actuated.

A further object is to provide a method and apparatus, as aforesaid, in which changes in the light intensity at a plurality of points in the scene are sensed by an optical transducer and by a sequence of comparisons, it being determined whether the changes are relevant, e.g., indicate the presence of prowler, the decision that a change is relevant causing actuation of an alarm.

A further object is to provide apparatus, as aforesaid, which can maintain surveillance without human attention, which is capable of continuous and reliable operation over long periods of time without attention and which is highly resistant to emitting a false alarm.

A further object is to provide a method and apparatus, as aforesaid, which is immunized against normal electrical noise resulting from power line fluctuations, radio frequency interference and so forth and which is generally immune to spurious extrinsic phenomena or noise, for example, spurious optical phenomena or noise, such as lightning flashes or shifting shadows.

A further object is to provide an apparatus, as aforesaid, which is adapted to be constructed largely from integrated circuits and which thereby can be made relatively compact and portable for improved flexibility of use and for relatively inexpensive production.

A further object is to provide a method and apparatus, as aforesaid, which is particularly adapted, though not limited, to use of a standard television camera as an optical transducer, coupled to means for sampling the output thereof, and which at least in its broader aspects contemplates simultaneous scanning and sampling by use of an optical transducer including a matrix of many discrete, small light sensors or admitters corresponding in size, quantity and arrangement to the points to be sampled in the image of the scene viewed.

A further object is to provide a method and apparatus, as aforesaid, which in its preferred embodiment employs a television camera adaptable to a wide variety of divergent applications through use of different conventional television camera lenses including zoom lenses, wide-angle lenses and the like, the method and apparatus being insensitive to distortions of the scene by the lens system employed.

A further object is to provide a method and apparatus, as aforesaid, which can be adapted to use with a television camera made to periodically shift position for reducing camera burn and/or for scanning a wider area.

A further object is to provide a method and apparatus, as aforesaid, adapted to use with a wide variety of optical transducers including, either without adjustment or with minor changes, color television cameras and cameras operating beyond the visible electromagnetic radiation spectrum such as infrared cameras, ultraviolet cameras and so forth.

A further object is to provide a method and apparatus, as aforesaid, which is capable of simultaneously maintaining surveillance over several unrelated scenes by training a sensing device such as a television camera on each such scene in which the sampled signals from several sensing devices can be processed by the same processing circuitry and in which the sensing devices may be remotely located and arranged to communicate with the processing circuitry by cable, radio or other links.

A further object is to provide a method and apparatus, as aforesaid, which may use a television camera equipped with a microscope lens system for performing surveillance over biological cultures or other microscopic phenomena for actuating an alarm, photographing means or other devices upon a significant change in the pattern of the scene viewed, e.g., movement or division of cells in a cell culture.

A further object is to provide a method and apparatus, as aforesaid, adaptable to use as a pattern recognizer for simple, specially oriented patterns by comparing the pattern viewed with a desired pattern and actuating an alarm when the patterns do not coincide at least within preselected limits, and which, for example, could be used in fingerprint verification, bottle labeling verification, bottle filling line, or verification of correct assembly of complex mechanical devices or electrical circuit board on an assembly line.

A further object is to provide a method and apparatus, as aforesaid, which is adjustable so as to consider a particular change in the field of view used as a significant alarm actuating change or as a nonsignificant change to be ignored depending upon the requirements of the situation in which the apparatus is to be used.

A further object is to provide a method and apparatus, as aforesaid, capable of detecting motion in the field of view over which surveillance is required and wherein intrusion into an area can be detected even though the intruder has a full knowledge of the equipments' location and operation.

A further object is to provide a method and apparatus, as aforesaid, when an intrusion occurring in the field of view of one or more scanning devices results in an audiovisual warning including an audible alarm, indication of the particular one of the scanning devices responsible for the alarm and a display of the field of view of the alarm scanning device on a monitor.

A further object is to provide a method and apparatus, as aforesaid, usable under all but the most severe environmental conditions.

A further object is to provide a method and apparatus, as aforesaid, in which the processor updates simultaneously with the processing of incoming data for eliminating the possibility of nondetection during separate update cycles.

A further object is to provide a method and apparatus, as aforesaid, capable of a modular construction to minimize down time in the event of failure and to facilitate rapid repair by enabling same to be carried out merely by replacement of modules.

A further object is to provide a method and apparatus, as aforesaid, which is simplified in comparison with the method and apparatus of aforementioned application Ser. No. 687,029 but which is still as effective in many uses.

A further object is to provide a method and apparatus, as aforesaid, where processing speed is increased through use of parallel processing techniques.

A further object is to provide a method and apparatus, as aforesaid, particularly adapted to use with multiple sensing devices which provides for automatic or manual switching of the various sensors to a display device or monitor in which further automatically switches an alerted sensing device to the monitor to display signals therefrom and includes means for preventing display of signals from other scanning devices at the same time.

A further object is to provide a method and apparatus, as aforesaid, in which a plurality of techniques are use in a predetermined sequence for elimination of spurious effects due to system noise or changes not of interest in the domain under surveillance including substantial elimination of effect of noise spikes in the domain of scanning with the use of finite length samples.

Other objects and purposes of this invention will be apparent to persons acquainted with apparatus of this general type upon reading the following specification and inspecting the accompanying drawings.

SUMMARY OF THE INVENTION

Figure 1:
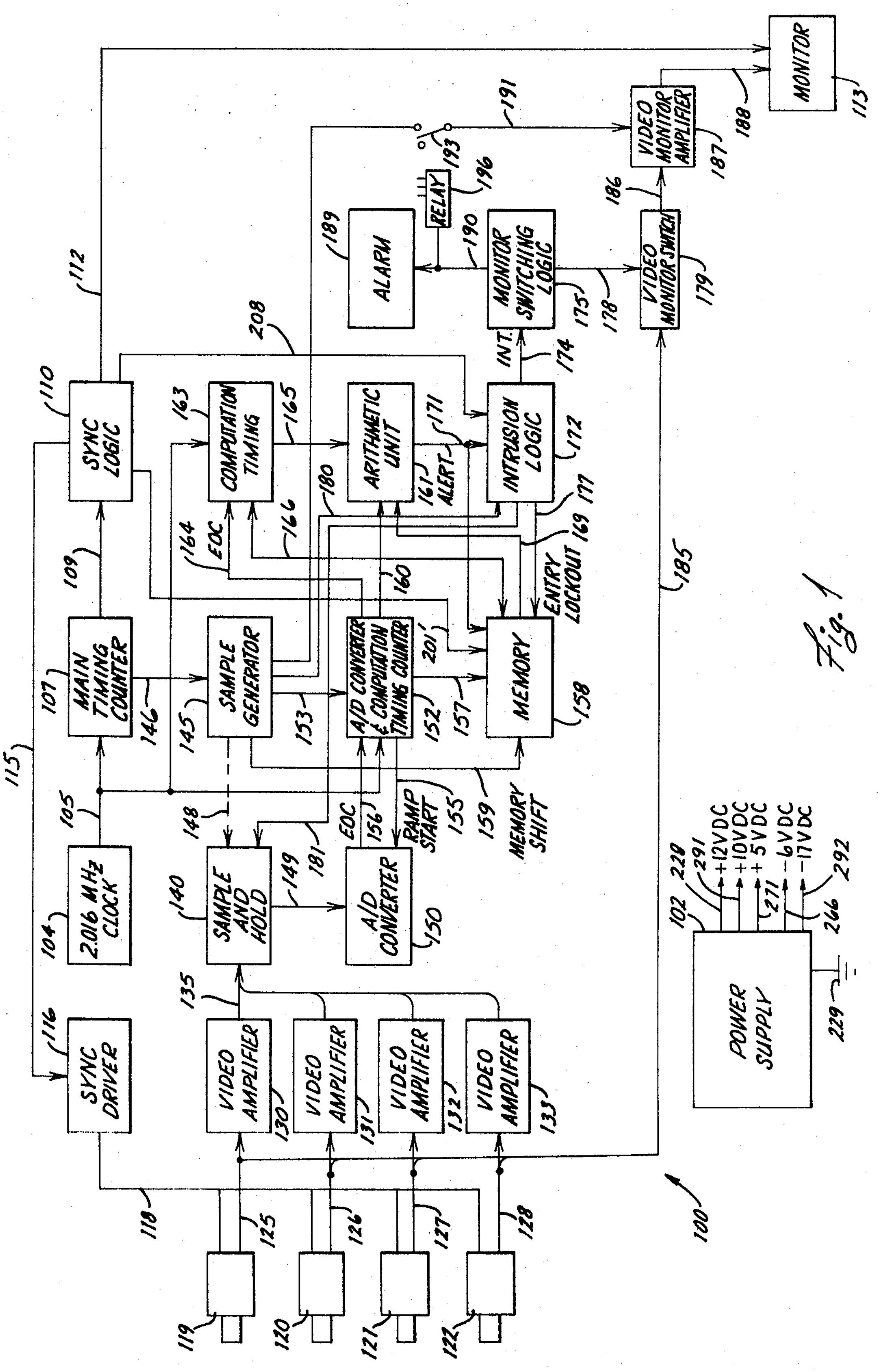
FIG. 1 is a block diagram of a preferred embodiment of the invention.

The objects and purposes of this invention are met by providing a method and apparatus by which surveillance can be maintained over a domain for detecting changes of interest in the domain and ignoring other changes. A parameter of the domain under surveillance is scanned resulting in an electrical signal which is sampled. The resulting sample signals, each corresponding to an individual sample point or line segment in the scanning pattern and hence in the domain under surveillance, are digitized. Digitized samples are stored in a memory unit. An arithmetic unit based on a Karnaugh mapping technique compares current samples with prior samples from the memory unit for the same sample point or segment and provides an alert signal when these differ by more than a predetermined amount. A plurality of scanning devices may be provided and switching is provided for sampling such scanning devices in sequence. If an alert occurs an intrusion logic unit determines if an alert signal previously occurred during a prior scanning period for the same scanning device and if so an alarm is actuated and the monitor is switched to display the signal from that scanning device.

DETAILED DESCRIPTION

SYSTEM AS A WHOLE (FIG. 1)

The preferred embodiment 100 (FIG. 1) of the invention includes a power supply 102 of any conventional type capable of supplying operating potential and current to the units of the apparatus 100 in a conventional manner.

The main timing portion of the apparatus 100 includes a clock unit 104 of conventional type comprising a crystal controlled oscillator capable of providing a square wave output at a frequency of 2.016 MHz on a line 105 to a main timing counter unit 107. The main timing counter 107 may be of any conventional construction capable of providing a plurality of periodic, essentially square wave signals of various frequencies less than 2.016 MHz.

Several timing signal outputs from the main timing counter 107 are applied through a path 109 to a sync logic unit 110. The sync logic unit 110 provides sync signals through a line 112 to a display device 113, preferably a television monitor. The sync logic unit 110 also supplies sync signals through a path 115 to a sync driver unit 116.

The sync driver unit 116 supplies, through a path 118, horizontal and vertical sync signals at proper voltage levels to each of several scanning devices, which in the preferred embodiment of the invention disclosed are television cameras 119 through 122. The cameras 119 through 122 are trained on scenes to be kept under surveillance. Since the monitor 113 and cameras 119 through 122 derive their horizontal and vertical sync signals ultimately from the same sync logic unit 110, the scanning beams thereof will be in synchronism so that the monitor unit is capable of displaying the scene viewed by any one of the cameras 119 through 122 when supplied with the video signal therefrom.

In the particular embodiment shown, four cameras are provided. However, fewer than four may be used. The apparatus 100 is also readily adapted to use of more than four cameras.

The video output from each of the cameras 119 through 122 is taken through lines 125 through 128, respectively, and applied to the inputs of respective video amplifiers 130 through 133, respectively. The outputs of the several video amplifiers 130 through 133 are applied through a path 135 to a sample and hold unit 140. The video amplifiers 130 through 133 ensure, despite different characteristics of the individual cameras that the outputs applied through path 135 to the sample and hold unit 140 will each have the dark level voltage and video peak voltage required by the sample and hold unit 140 and succeeding units and that such voltage values will be the same for all cameras. Thus, a wide variety of cameras can be used and indeed an intermixture of disparate types of cameras can be used simultaneously.

A sample generator unit 145 generates the basic sample pattern, determines the length of the sample segments and provides vertical and horizontal masking to eliminate sample points from the horizontal and vertical retrace times and from the edges of the image of the scanning devices 119 through 122. In the particular embodiment shown, the sample generator is arranged to provide final pattern of 32 sample segments per field.

The sample generator 145 receives timing signals from the main timing counter 107 through a path 146 and provides the final pattern of sampling signal to the sample and hold circuit 140. This may be done directly, where only one camera is used, through broken line 148. However, in the embodiment disclosed, where multiple cameras 119 through 122 are used, the sampling signals pass from the sample generator 145 through a line 180 to a portion of an intrusion logic unit 172 which gates same through a path 181 to the sample and hold unit 140 to cause same to sample the cameras 119 through 122 in proper sequence.

In response to a sampling signal on the path 181, the sample and hold unit 140 samples the video from the video amplifiers 130 through 133, one at a time, and provides a series of video samples on a line 149 to an analog to digital (A/D) converter analog section 150.

An A/D converter and computation timing counter unit 152, which includes the A/D converter digital section, receives a start digitize signal on a line 153 from the sample generator 145. As a result, the unit 152 applies a ramp start signal on line 155 to the A/D converter analog section 150 to cause same to start the analog to digital conversion of a video sample. The A/D converter analog portion 150, at the end of its conversion activity, passes the end of conversion (EOC) signal through a line 156 to the A/D converter and computation timing counter 152. The unit 152 provides a digitized sample (a binary count proportional to the video sample amplitude) in parallel through a path 157 to a memory unit 158 and through a path 160 to an arithmetic unit 161.

A computation timing unit 163 receives clock signals on the line 105. The computation timing unit 163 also receives an end of conversion (EOC) signal from the A/D converter and computation timing counter 152 via a line 164. The computation timing unit 163 provides pulses occurring in sequence at preselected times after the end of A/D conversion. One such pulse is applied through line 165 to the arithmetic unit 161 and a subsequent one is applied through a path 166 to the memory 158 to cause entering of the digitized sample therein.

The memory unit 158 receives a memory shift signal on line 159 from the sample generator 145. The memory unit 158 stores digitized samples and is arranged to make available a stored sample after a complete cycle of sampling of the several cameras.

As the A/D converter and computation timing counter 152 applies a digitized sample through line 160 to the arithmetic unit 161, the memory 158 applies a stored digitized sample from a prior field, but corresponding to the same sample point and same scanning device, through a path 169 to the arithmetic unit 161. In response to a preselected difference between the new and stored digitized samples for the same point, the arithmetic unit 161, at a time controlled by a signal through line 165 from the computation timing unit 163, applies an alert or suspicion signal through line 171 to the intrusion logic unit 172.

The intrusion logic 172 responds to alert signals in two successive fields for the same scanning device for providing an intrusion signal through a line 174 to a monitor switching logic unit 175. The intrusion logic unit also drives indicating lamps (not shown) which show the system operator which sensing device has suffered an intrusion. The intrusion logic unit 172 stores intrusions and through line 177 allows updating of the memory after an intrusion occurs.

The monitor switching logic unit 175, controlled by intrusion logic unit 172, actuates an alarm 189 and relay 196 through line 190 and through the path 178 controls a video monitor switch unit 179. The relay 196 is provided for actuating ancillary devices of any desired type, such as an alarm recorder, when the alarm 189 is actuated. The relay preferably has three outputs: a common line, a normally closed contact and a normally open contact.

The monitor switching logic 175 insures that several intrusions in close succession on different scanning devices will not result in multiple images on the monitor 113. The monitor switching logic 175 also includes drivers for the monitor lamps (not shown).

The video monitor switch unit 179 receives video signals through path 185 from the video outputs 125 through 128 of the scanning devices 119 through 122 and applies the video from the scanning device suffering an intrusion through a line 186 to a video monitor amplifier 187 and thence through line 188 to the monitor 113.

Video monitor amplifier 187 includes means for superimposing on monitor display the sample points or segments, such portion of the video monitor amplifier being supplied the sampling signal from the sample generator 145 through line 191.

The apparatus 100 of FIG. 1, as above described, is primarily intended for use with up to a preselected number of scanning devices, for example, four. Should it be desired to utilize the same alarm and monitor facility for additional groups of scanning devices, each group having associated therewith its own analog and digital processing system similar to the system 100, the several systems can be multiplexed to the monitor and alarm facility of the disclosed system 100. More particularly, the video monitor switch units (not shown) of such additional systems may have their outputs coupled to the input of video monitor amplifier 187. In addition, a multiposition switch (not shown) may be interposed in the line 191 for coupling sampling signals from such additional systems to the video monitor amplifier 187. Further, the alarm outputs of the additional system may be connected to the alarm 189. Still further, a switching unit similar to the lockout portion of the monitor switching logic unit 175 may interconnect the inputs and outputs of the switching logic units of the several systems to prevent application of multiple images to the monitor unit 113.

CLOCK AND MAIN TIMING COUNTER (FIG. 2)

Figure 2:
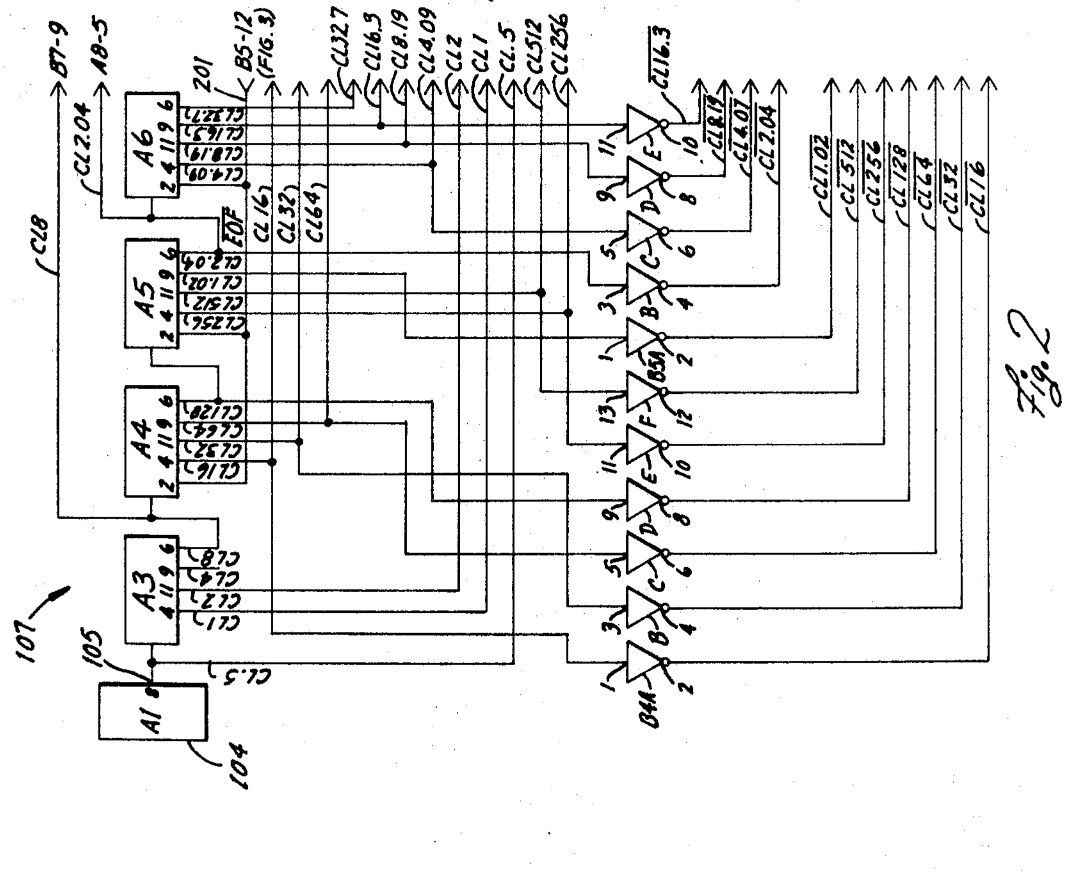
FIG. 2 is a block diagram of the clock and main timing counter portion of the apparatus of FIG. 1.
Figure 5:
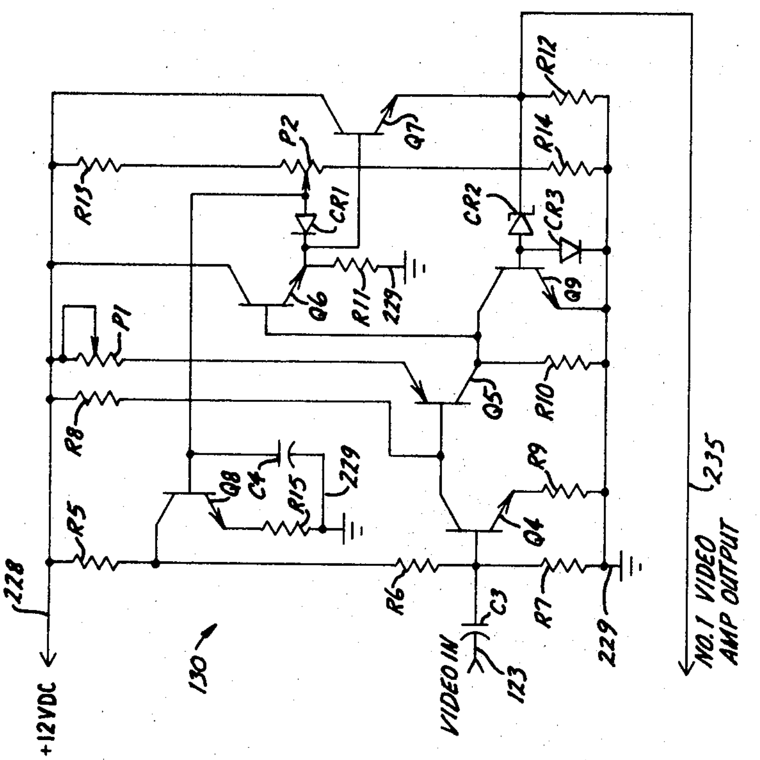
FIG. 5 is a schematic diagram of one of the video amplifier units of FIG. 1.

Referring to FIG. 2, the 2.016 MHz crystal clock 104 provides a square wave output having a period of about 0.5 usec. and applies same through line 105 to the main timing counter 107. Main timing counter 107 may be a downcounter of any conventional type and here consists of a series of conventional binary counters A3, A4, A5 and A6 in series for providing a plurality of square wave timing signals and also includes a plurality of inverters B4A through B4F and B5A through B5F for providing corresponding complement, or amplitude inverted, square wave timing signals. The clock frequency of 2.016 MHz was chosen so that a horizontal sync signal generated by the main timing counter would be exactly 15,750 KHz. For the sake of discussion, the clock frequency can be referred to as a 2 MHz signal. The main timing counter is arranged to timing signals and complements thereof having different periods as set forth in the table below.

TABLE 1

| Signal | Period |
|---|---|
| CL .5 | 0.5 usec |
| CL 1 | 1 usec |
| CL 2 | 2 usec |
| CL 4 | 4 usec |
| CL 8 | 8 usec |
| CL 16 | 16 usec |
| CL 32 | 32 usec |
| CL 64 | 64 usec |
| CL 128 | 128 usec |
| CL 256 | 256 usec |
| CL 512 | 512 usec |
| CL 1.02 | 1.024 msec |
| CL 2.04 | 2.048 msec |
| CL 4.09 | 4.096 msec |
| CL 8.19 | 8.192 msec |
| CL 16.3 | 16.384 msec |
| CL 32.7 | 32.768 msec |

Thus it will be noted that each of the square wave timing signals applied by the main timing counter is referred to by the letters CL plus a digit or digits, the number making reference to the length of period of the signal so that, for example, signal CL 16 has a 16 usec. period. The main timing counter provides as outputs the following square wave timing signals CL .5 through CL 2, CL 8 through CL 64, CL 256, CL 512, CL 2.04 through CL 32.7 thus covering a range of 0.5 usec. through 32.7 msec. The main timing counter also provides complemental outputs $\overline{\text{CL 16}}$ through $\overline{\text{CL 16.3}}$ covering a period range from 16 usec. to 16.3 msec. The CL and complemental CL numbers referred to above will be used as reference numerals to designate the main timing counter output lines carrying the corresponding timing signals.

A reset line 201 connects to pin 2 of each of the counters A4, A5, A6 for resetting same.

Timing lines CL 1, CL 256, CL 512, CL 32.7, $\overline{\text{CL 16}}$ through $\overline{\text{CL 128}}$, $\overline{\text{CL 1.02}}$ through $\overline{\text{CL 16.3}}$ connect to the sync logic unit 110 through the path 109 above described in connection with FIG. 1.

SYNC LOGIC UNIT (FIG. 3)

The sync logic unit 110 comprises an end of field circuit 203, a horizontal camera sync circuit 204, a vertical camera sync circuit 205 as well as a monitor sync generator A10D and field flip-flop A7A.

The end of field circuit 203 comprises a NAND gate B7A expanded by expander AND units B6A and B6B as well as a pair of NAND gates B8A and B8B arranged as a flip-flop and an inverter B5F. Expandable NAND gate B7A has input pins 1, 2 and 4 connected respectively to lines $\overline{\text{CL 128}}$, $\overline{\text{CL 64}}$ and CL 256 from the main timing counter 107. Input pin 3 of NAND gate B7A, which is the expansion input, connects to the output pins 4 and 11 of the expanders B6A and B6B, respectively. Input pins 2, 3, 5 and 6 of expander B6A are connected to lines CL 32.7, $\overline{\text{CL 16.3}}$, $\overline{\text{CL 8.19}}$ and $\overline{\text{CL 4.09}}$ of the main timing unit 107. Similarly, input pins 9, 10, 12 and 13 of expander B6B are connected respectively to timing lines $\overline{\text{CL 2.04}}$, $\overline{\text{CL 1.02}}$, CL 512 and CL 1 of the main timing unit 107. The output of expandable NAND gate B7A is normally high (a logical "1") and goes low (to a logical "0") only when all of its inputs 1–4 are at a logical "1," the input 3 of expandable NAND gate B7A being at a logical "1" when all of the inputs of expanders B6A and B6B are at a logical "1." The effect of the expanders B6A and B6B is in effect to expand the number of inputs of the NAND B7A, here providing 12 inputs of which 11 are used, rather than the 4 with which NAND B7A would otherwise be provided.

NAND gates B8A and B8B are wired to form an R-S flip-flop 207. More particularly, output pin 3 of NAND B8A connects to input pin 4 of NAND B8B and output pin 6 of NAND B8B connects to input pin 2 of NAND B8A. The set input of R-S flip-flop 207, which is input pin 1 of NAND B8A, connects to output pin 6 of the expandable NAND gate B7A. The reset input of R-S flip-flop 207, which is input pin 5 of NAND B8B, connects to timing line CL 1 from the main timing unit 107. The output of R-S flip-flop 207 and of the end of field circuit 203 appears on output pin 3 of NAND B8A and comprises a .5 usec. pulse marking the end of the field of scan of the scanning devices 119 through 122.

This signal is the end of field (EOF) signal and is applied to a line 209 for purposes appearing hereinafter. The end of field line 209 connects to input pin 13 of the inverter B5F to form at output pin 12 thereof an end of field complement ($\overline{EOF}$) signal which is applied to a line 201. The $\overline{EOF}$ line 201 connects as above mentioned to the main timing unit 107 and more particularly to pin 2 of each of the counters A4, A5 and A6 thereof for resetting such counters at the end of each field of scan.

It will be apparent that the end of field complement signal also appears on output pin 6 of NAND B8B of the R-S flip-flop 207 and indeed the $\overline{EOF}$ signal is taken from such location through a line 201' and applied to the field flip-flop A7A and vertical camera sync circuit 205 as hereinafter discussed.

The field J-K flip-flop A7A has a clock input pin 1 connected to the $\overline{EOF}$ line 201' and has output pins 5 and 6 which carry the field flip-flop (FFF) output and complemental field flip-flop ($\overline{FFF}$) output, respectively and which connect to output lines 212 and 213, respectively. The field flip-flop A7A has its output lines 212 and 213 connected, preferably by internal wiring, and as indicated in broken lines at 215 and 216, to its set and reset inputs, respectively, so that J-K flip-flop A7A will toggle at the end of each field. Thus, the FFF line 212 will normally be at a logical "0" for the first of a pair of fields and at a logical "1" for the second of such pair of fields.

The $\overline{EOF}$ line 201', as stated, connects to the vertical camera sync circuit 205 and, more particularly, to input pin 9 of NAND gate B8C. Nand gate B8C and NAND gate B8D are wired to form an R-S flip-flop, the vertical sync flip-flop. Input pin 13 of NAND B8B connects to line $\overline{\text{CL 2.04}}$ from the main timing counter 107. Input pin 9 of NAND B8C is the set input of the flip-flop and input pin 13 of NAND B8D is the reset input of the flip-flop. The NAND gates B8C and B8D are cross connected in a conventional manner. More particularly, output pin 8 of NAND B8C connecting to input pin 12 of NAND B8D and output pin 11 of NAND B8D is connected to input pin 10 of NAND B8C. The vertical sync signal is taken from output pin 8 of NAND B8C and applied to a vertical sync line 218. The complement of the vertical sync signal is taken from output pin 11 of NAND B8A and applied to the complemental vertical sync output line 219. Although the vertical sync signal for the cameras should be at the end of field or EOF rate, the EOF signal itself is not suitable since a pulse of approximately 1 msec. width is required. A pulse of such width is supplied by the R-S flip-flop, composed of NAND B8C and B8D, to the vertical sync line 218. If desired or if required by the particular circuitry to be driven by the vertical sync signal, switch selectable power inverters F6A and F6B may be provided, to give adequate drive, and inserted in the lines 218 and 219, the inverters F6A and F6B being shown in a disconnected state in FIG. 3 to avoid crowding in the drawing.

The horizontal camera sync circuit 204 comprises a NAND gate B9A and an inverter C1A. The input pins 3, 4 and 5 of NAND B9A connect respectively to lines $\overline{\text{CL 16}}$, $\overline{\text{CL 32}}$ and $\overline{\text{CL 64}}$ from the main timing counter 107. The NAND gate B9A provides a horizontal sync signal at output pin 6 thereof comprising an 8 usec. pulse occurring every 64 usec. the horizontal sync signal being applied to a line 220 as well as to input pin 1 of the horizontal sync inverter C1A which provides, at the output pin 2 thereof and on connected line 221, the complement of the horizontal sync signal appearing on line 220.

Thus, both polarities of the vertical sync signal are available from lines 218 and 219 and both polarities of the horizontal sync signal are available from lines 220 and 221.

Figure 18:
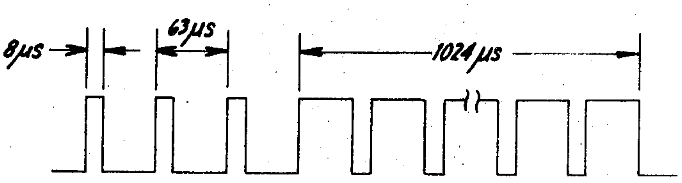
FIG. 18 is a waveform diagram corresponding to the sync signal applied to the monitor unit.

The monitor sync generator A10D comprises an exclusive OR gate, input pin 12 of which connects to the horizontal sync line 220 and input pin 13 of which connects to vertical sync line 218. Output pin 11 of exclusive OR gate A10D connects through the monitor sync line 112 to the monitor 113 (FIG. 1). The monitor sync signal includes both horizontal and vertical sync signals on the same line 112, inverted horizontal pulses being sent during the vertical sync time as indicated in FIG. 18.

The lines 218 and 220 (or depending on the nature of the cameras used, the lines 219 and 221) taken together comprise path 115 of FIG. 1 connecting the sync logic unit 110 to the sync driver unit 116.

In the leftward and rightward margins of drawing figures disclosing digital portions of the apparatus 100 and located adjacent to input and output lines connecting to other drawing figures, there will be found reference designations or characters comprising an alphabetic character, a first numerical character or characters, a hyphen and a second numerical character or characters. These designations are supplied for convenience in reference between drawings disclosing digital circuitry. The alphabetic character and first numerical character or characters refer to a digital device, such as a NAND gate, an inverter, a flip-flop, etc. in another figure, to which the opposed line is connected. The second numerical character or characters, following the hyphen, is the pin number on that digital device of the other figure to which the opposed line is connected. Below certain of such reference designations, the number of the drawing figure on which the connecting device can be found is indicated. For example, the $\overline{EOF}$ line 201, as appearing in FIG. 2, carries the margin designation "B5-12FIG.3" indicating that such line comes from inverter B5F, output pin 12 of FIG. 3. However, where a given line, for example, an output line, is connected to several digital devices on other figures, only one of the connecting digital devices is given, because of space limitations on the drawings.

SYNC DRIVER UNIT (FIG. 4)

The sync driver unit 116 comprises a horizontal sync driver circuit 226 and a vertical sync driver circuit 227. In the particular embodiment shown, each of the driver circuits is capable of providing adequate sync drive to as many as four scanning devices or cameras. In the event that more than four cameras are used, additional sync driver circuits similar to the circuits 226 and 227 may be provided in parallel with the circuits 226 and 227.

The horizontal and vertical sync driver circuits 226 and 227 are preferably identical and thus a description of one thereof, for example, the horizontal sync driver circuit 226 will serve for both.

The horizontal sync driver circuit 226 comprises transistors Q1, Q2 and Q3. The horizontal sync signal from horizontal sync line 220 (FIG. 3) is applied through a parallel capacitor C1 and resistor R1 to the base of transistor Q1. The collector of transistor Q1 is supplied positive operating potential for resistor R2 from a positive supply line 228 of the power supply 102 (FIG. 1). In the particular embodiment shown the line 228 is held at a positive 12 volts. The emitter of transistor Q1 connects to the ground or reference potential line 229 of the power supply. Transistors Q2 and Q3 are arranged as a complemental output pair, the collector of transistor Q1 being connected to the base of both transistors Q2 and Q3. The collector of transistor Q2 connects to the positive supply line 228 and the collector of transistor Q3 connects to the ground line 229. The emitters of transistors Q2 and Q3 are connected through a series pair of resistors R3 and R4. The output of the horizontal sync driver circuit 226 is taken from a point between the resistors R3 and R4 through a capacitor C2 and applied to the horizontal sync driver output line 231. In a similar manner, the vertical sync driver circuit 227 receives the vertical sync signal from line 218 (FIG. 3) and energizes a vertical sync driver output line 232. Output lines 231 and 232 comprise the path 118 (FIG. 1) between the sync driver unit 116 and the scanning devices, for example, cameras 119 through 122.

VIDEO AMPLIFIER UNIT (FIG. 5)

The video amplifiers 130 through 133 are preferably identical and a disclosure of one thereof, the video amplifier 130, will serve for all. The video amplifier 130 comprises transistors Q4 through Q9. Video from scanning device 119 is supplied through line 123 and a capacitor C3 to the base of transistor Q4. Base bias is applied to the base of transistors Q4 through a series resistor network comprising resistors R5, R6 and R7 connected from the DC positive potential line 228 of the power supply 107 to the ground line 229. Collector voltage is applied to the collector of transistor Q4 through a resistor R8 connected to the positive potential line 228. Emitter bias is supplied to transistor Q4 by a resistor R9 connecting the emitter thereof to the ground line 229. Output is taken from the collector of transistor Q4 and applied to the base of transistor Q5. Emitter bias is supplied to transistor Q5 through a potentiometer P1 connected to the positive potential line 228. Collector potential is supplied to the transistor Q5 through a resistor R10 connected to the ground line 229. Transistors Q4 and Q5 provide amplification to the incoming video signal.

Transistors Q6 and Q7 are arranged as cascaded emitter followers and act as a buffer to give an output impedence of 75 ohms. output is taken from the amplifier portion Q4, Q5 at the collector of transistor Q5 and applied to the base of emitter follower transistor Q6. Collector potential is supplied the transistor Q6 directly from the positive potential line 228 and emitter bias is supplied thereto through a resistor R11 connected to the ground line 229. The output of transistor Q6 is taken from the emitter thereof and applied to the base of emitter follower transistor Q7. Collector potential for the transistor Q7 is taken directly from the positive potential line 228 and emitter bias is supplied thereto through a resistor R12 connected to the ground line 229. The output of the video amplifier unit 130 is taken from the emitter of transistor Q7 and applied to output line 235, one of the output lines making up the path 135 of FIG. 1 and connected to the sample and hold unit 140.

A diode CR 1 is connected at its cathode to the emitter of transistor Q6 for the purpose of detecting sync pulses in the video signal. The anode of diode CR 1 is provided operating bias by connection to the movable contact of a potentiometer P2. The resistance element of the potentiometer P2 is connected intermediate the ends of a voltage divider comprising a resistor R13, the potentiometer P2 and a resistor R14 connected from the positive potential line 228 to the ground line 229. The anode of diode CR 1 also connects to the base of transistor Q8 which in turn is connected through a sync storage capacitor C4 to the ground line 229. Emitter bias is supplied to the transistor Q8 through a resistor R15 connected to the ground line 229. The collector of transistor Q8 connects to and between the resistors R5 and R6 of the voltage divider R5, R6, R7 for controlling the bias level on the base of amplifier transistor Q4.

Transistor Q9 provides overvoltage protection for the output transistor Q7 and for succeeding circuitry. Thus, the base of transistor Q9 connects through the anode and cathode of a Zener diode CR2, in that order, to the emitter of transistor Q7 and hence to the output line 235. The base of transistor Q9 also connects through the anode and cathode of a diode CR3, in that order, to the ground line 229, the diode CR3 being provided to bleed to ground any current leakage through the Zener CR3 and thus prevent unintentional conduction of the transistor Q9 due to such leakage. The emitter of transistor Q9 is supplied bias directly from the ground line 229 and the collector thereof connects to the base of transistor Q6 for reducing the base potential of transistor Q6 in response to overvoltage condition at the output of transistor Q7.

SAMPLE GENERATOR UNIT (FIG. 6)

Figure 6:
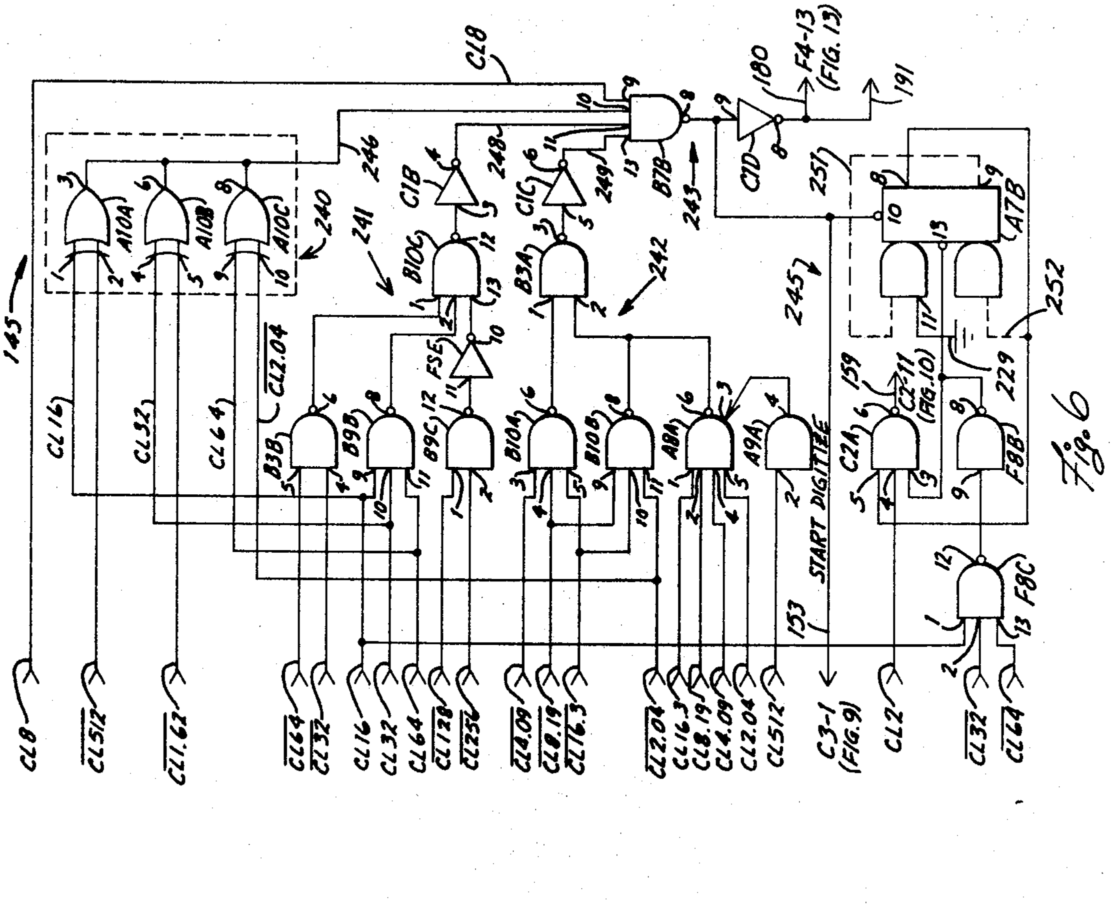
FIG. 6 is a schematic diagram of the sample generator unit of FIG. 1.

The sample generator unit 145 comprises a basic sample pattern circuit 240, a horizontal masking circuit 241, a vertical masking circuit 242 and an output circuit 243. Included in FIG. 6 is a shift pulse generating circuit 245 which provides a series of four shift pulses to the memory unit 158 through line 159 following each sample pulse.

Figure 21:
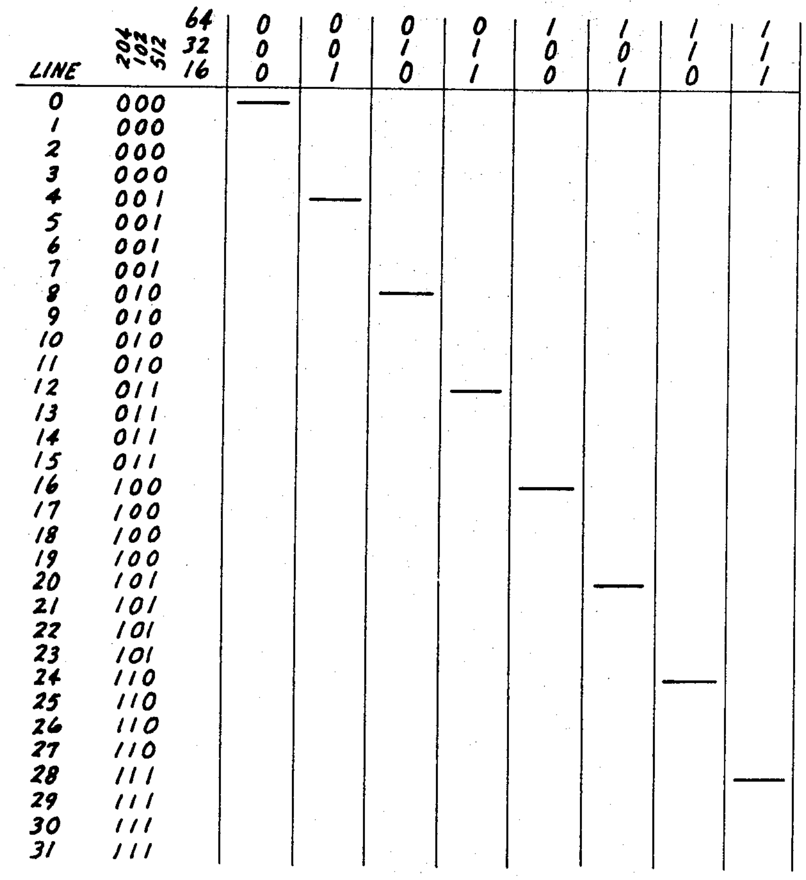
FIG. 21 discloses the basic sample pattern used in the present embodiment of the invention.

The basic sample pattern circuit 240 comprises three exclusive OR gates A10A, A10B and A10C. Input pins 1 and 2 of exclusive OR A10A connect, respectively, to timing lines CL 16 and $\overline{\text{CL 512}}$. Input pins 4 and 5 of exclusive OR A10B connect, respectively, to timing lines CL 32 and $\overline{\text{CL 1.02}}$. Input pins 9 and 10 of exclusive OR A10C connect, respectively, to timing lines CL 64 and $\overline{\text{CL 2.04}}$. Output pins 3, 6 and 8 of exclusive OR's A10A, A10B and A10C, respectively, all connect to the basic sample pattern output line 246. The basic sample pattern consists of one sample per line the location of the sample in the line being shifted to the right by 8 usec. every fourth line, as generally indicated in FIG. 21.

The horizontal masking circuit 241 removes the last three lines of each successive four line group in the scanning field and also removes sample points from the horizontal retrace time and from the vertical edges of the picture. The horizontal masking circuit comprises NAND gates B3B, B9B, B9C and B10C as well as inverters F5E and C1B. Input pins 4 and 5 of NAND B3B connect to timing lines $\overline{\text{CL 32}}$ and $\overline{\text{CL 64}}$, respectively. Input pins 9, 10 and 11 of NAND B9B connect to timing lines CL 16, CL 32 and CL 64, respectively. Input pins 1 and 2 of NAND B9C connect to timing lines $\overline{\text{CL}}$ $\overline{128}$ and $\overline{CL\ 256}$, respectively. Output pins 6 and 8 of NAND's B3B and B9B, respectively, connect to input pins 1 and 2, respectively, of NAND B10C. Output pin 12 of NAND B9C connects through inverter F5E to input pin 13 of NAND B10C. It is NAND B9C and inverter F5E which remove the sample points of the last three lines of each successive four scanning line group. Output pin 12 of NAND B10C connects through inverter C1B to horizontal masking output line 248.

The vertical masking circuit 242 removes sample points or segments which would occur during the vertical retrace time and at the top and bottom edges of the picture. The vertical masking circuit 242 comprises NAND gates B10A, B10B and B3A, expandable NAND gate A8A with its expander A9A and inverter C1C.

Input pins 3, 4 and 5 of NAND B10A connect to timing lines $\overline{CL\ 4.09}$, $\overline{CL\ 8.19}$ and $\overline{CL\ 16.3}$, respectively. Input pins 9, 10 and 11 of NAND B10B connect to timing lines $\overline{CL\ 8.19}$, $\overline{CL\ 16.3}$ and $\overline{CL\ 2.04}$, respectively. Input pins 1, 2, 4 and 5 of expandable NAND A8A connect to timing lines CL 16.3, CL 8.19, CL 4.09 and CL 2.04, respectively. The expander input 3 of expandable NAND A8A connects to output pin 4 of the expander A9A, input pin 2 of expander A9A being connected to the timing line CL 512. Output pin 6 of NAND B10A connects to input pin 1 of NAND B3A and output pins 8 and 6 of NAND B10B and expandable NAND A8A both connect to input pin 2 of NAND B3A.

NAND B10A is responsible for removal of samples from the first 32 lines (including the vertical retrace time) and last six lines of the picture. NAND B10B is responsible for removal of sample points from the 33rd through 48th scanning lines. Expandable NAND A8A and its expander A9A are responsible for removal of one additional sample point located near the bottom of the picture. The output of NAND B3A passes through inverter C1C to vertical masking output line 249.

The output circuit 243 comprises a NAND gate B7B and an inverter C1D. Input pins 9, 10, 12 and 13 of NAND B7B connect respectively to timing line CL 8, the basic sample pattern output line 246, the horizontal masking output line 248 and the vertical masking output line 249. The final sampling signal appears on output pin 8 of NAND B7B and is applied to input pin 9 of inverter C1D, appearing in inverted form at output pin 8 thereof. The final sampling signal output from NAND B7B is also applied through the start digitize line 153 to the A/D converter and computation timing counter 152. The sampling signal appearing at the output pin 8 of inverter C1D is applied through line 191 to the video monitor amplifier 187 as well as to the intrusion logic unit 172. The sample pattern defined by the sampling signal appearing on the output of NAND B7B is disclosed in FIG. 17.

The shift pulse generator circuit 245 operates in conjunction with the memory circuit 158 and is disposed between the memory circuit and the output circuit 243 of the sample generator 145. More particularly, the shift pulse generator circuit includes NAND gates F8C, C2A and F8B as well as a J-K flip-flop A7B. The direct set input pin 10 of J-K flip-flop A7B connects through the line 153 to output pin 8 of NAND B7B for receiving therefrom the final sampling signal. Output pin 9 of the J-K flip-flop A7B is connected, preferably internally, as indicated by the broken line 251, to one of the set inputs of the J-K flip-flop. Output pin 8 of the J-K flip-flop A7B connects, as indicated by broken line 252, to the reset input of the J-K flip-flop and also connects to the pin 5 of NAND C2A. The other set input pin 11 of the J-K flip-flop A7B connects to the system ground line 229. NAND F8C has input pins 1, 2 and 13 connected respectively to timing lines CL 16, $\overline{CL\ 32}$ and $\overline{CL\ 64}$. Output pin 12 of NAND F8C connects to input pin 9 of NAND F8B. Output pin 8 of NAND F8B connects to clock input 13 of the J-K flip-flop A7B and also to input pin 3 of NAND C2A. Input pin 4 of NAND C2A connects to the timing line CL 2 and, as aforementioned, input pin 5 of NAND C2A connects to output pin 8 of the J-K flip-flop A7B. Output from the shift pulse generator circuit 245 is taken from output pin 6 of NAND C2A and applied through the line 159 to the memory unit 158. The shift pulse generator circuit 245 provides to the memory 158 a series of four shift pulses following each sampling pulse appearing on the output of the sample generator output circuit 243.

SAMPLE AND HOLD UNIT (FIG. 7)

Figure 7:
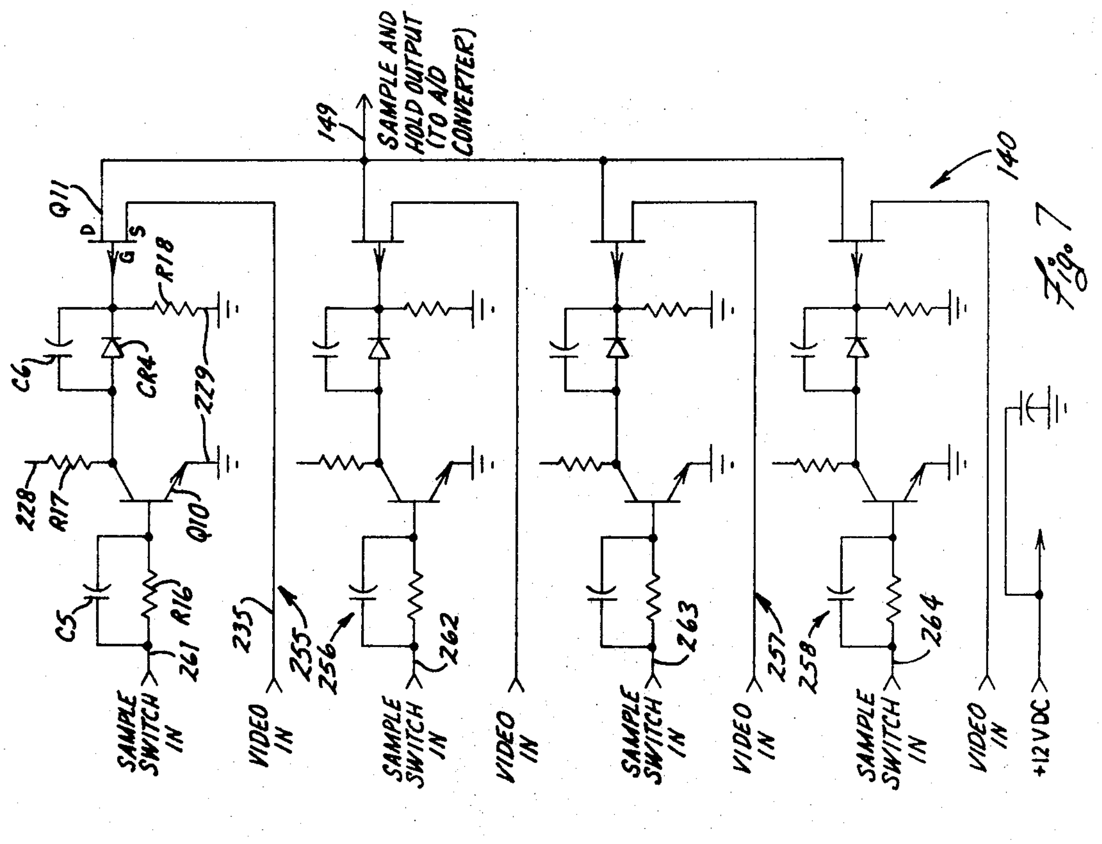
FIG. 7 is a schematic diagram of the sample and hold unit of FIG. 1.

The sample and hold unit 140 of FIG. 7 comprises a plurality of preferably identical sample and hold circuits equal in number to the number of scanning devices or cameras to be used. Thus, in the particular embodiment shown, four such sample and hold circuits 255 through 258 are provided, corresponding to scanning devices 119 through 122, respectively. In view of the preferably identical nature of the sample and hold circuits 255 through 258, description of the sample and hold circuit 255 will suffice for all.

The sample and hold circuit 255 comprises a transistor Q10 and a field effect transistor (FET) Q11. The video line 235 from the corresponding video amplifier 130 is connected to the source S of FET Q11. The drain D of FET Q11 is connected to the common output line 149 to which the corresponding portions of the remaining sample and hold circuits 256 through 258 are also connected, the line 149 connecting to the analog portion 150 of the A/D convertor.

A sampling signal input line connects to the sample and hold circuit 235. Where the apparatus 100 includes only a single camera, for example camera 119, the sampling signal may be taken directly from the sample generator 145 via line 148 (FIG. 1). On the other hand, when a plurality of cameras are used and sampled in sequence, sampling signals are sequentially applied to the sample signal inputs 261 through 264 of the several sample and hold circuits 255 through 258 via path 181 from sequencing circuitry (hereinafter described) in the intrusion logic 172. In the latter case, the line 148 is not used. The disclosed embodiment, being a multiple camera embodiment therefore does not use a connection corresponding to line 148, the latter thus being shown as an imaginary line.

The sampling signal input line 261 of the sample and hold circuit 255 connects through a parallel resistor and capacitor R16 and C5 to the base of transistor Q10. Emitter bias is supplied to the transistor Q10 directly from the ground line 229 and the collector potential is supplied thereto through a resistor R17 connected to the positive supply line 228. Output is taken from the collector. The collector of transistor Q10 connects through the anode and cathode, in that order, of a diode CR4 to the gate G of FET Q11. A capacitor C6 parallels the diode CR4. Gate bias for FET Q11 and a discharge path for the capacitor C6 are provided by a resistor R18 connected from the gate of FET Q11 to the ground line 229. Video and sampling signal inputs to the sampling circuit 255 result in a sampled video output applied to sample output line 149.

Where, as in the disclosed embodiment, a plurality of scanning devices and corresponding sample and hold circuits are provided, video samples are taken from one camera, here for one field, whereafter samples are taken from the video of the next camera in sequence for a second field and so forth, the cameras thus being sampled in sequence repetitively. Thus, a set of video samples for the first camera in the sequence appears on an output line 149 followed by a set of video signals for the second camera in the sequence and so forth.

A/D CONVERTER ANALOG SECTION (FIG. 8)

Figure 8:
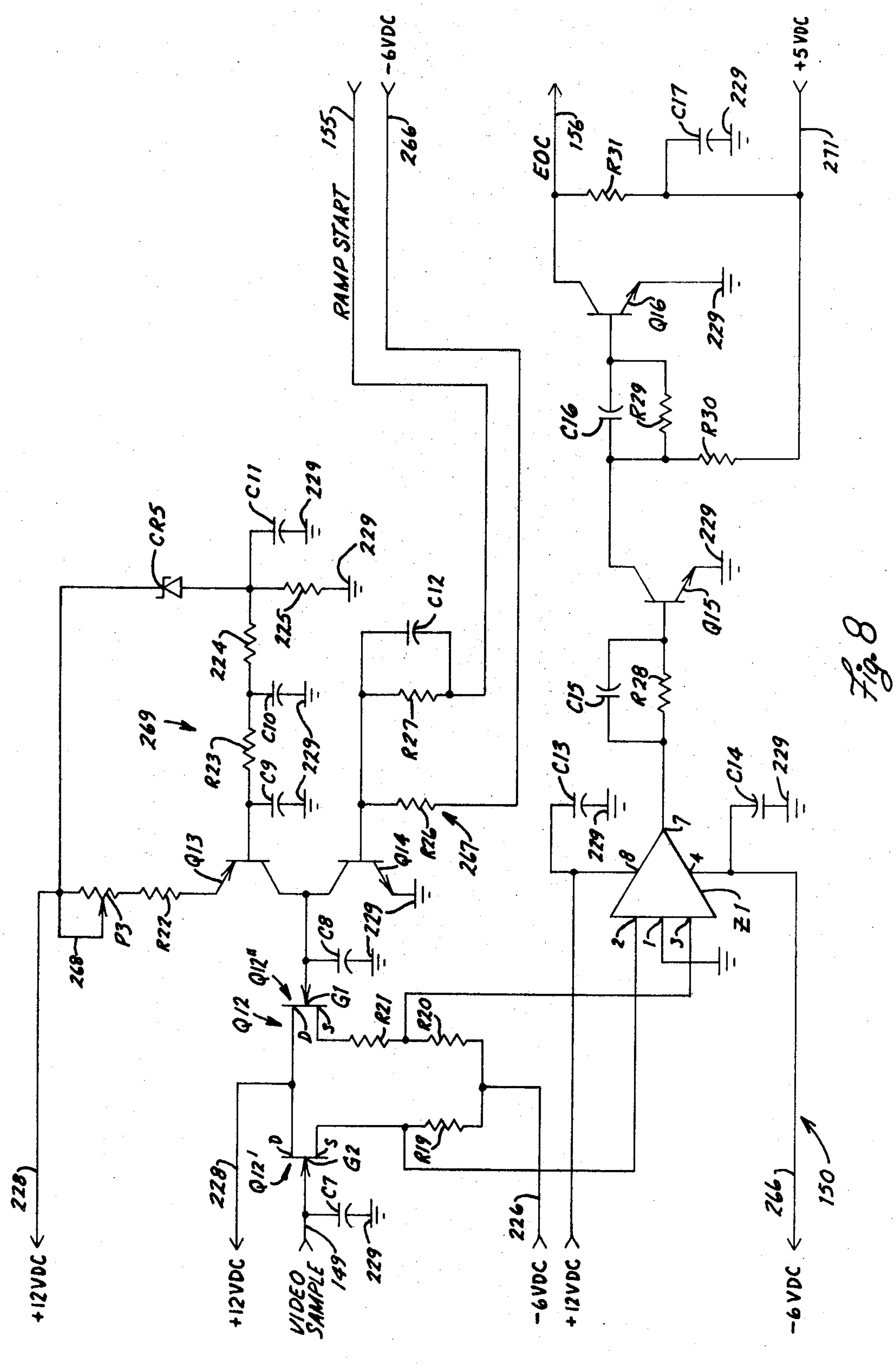
FIG. 8 is a schematic diagram of the analog portion of the analog to digital converter unit of FIG. 1.

The analog portion 150 of the A/D converter (FIG. 8) comprises a dual field effect transistor Q12, comparator Z1 and transistors Q13 through Q16. The dual FET Q12 comprises a pair of matched FET sections Q12′ and Q12″. The drain terminals D of the FET sections Q12′ and Q12″ both connect to the positive 12 volt supply line 228. The sources S of the FET sections Q12′ and Q12″ are connected through a series resistor network comprising resistors R19 through R21, in that order. Source bias is provided to the FET sections Q12′ and Q12″ by a negative 6 volt potential line 266 from the power supply 102 (FIG. 1). The negative potential line 266 connects to the series resistor network aforementioned between the resistors R19 and R20 thereof. The video samples from the sample and hold unit 140 are applied to the gate G2 of FET section Q12′ through the line 149. A storage capacitor C7 connects between the gate G2 of the FET section Q12′ and the ground line 229 for storing incoming video samples, in sequence, until the remaining circuitry is ready to process same.

A further storage capacitor C8, hereinafter referred to as the ramp storage capacitor, is connected between the gate G1 of FET section Q12″ and the ground line 229. Ramp capacitor C8 and transistors Q13 and Q14 comprise a portion of a ramp generating circuit 267. Transistor Q13 and the circuitry associated therewith as hereinafter described, act as a constant current source for charging of the ramp capacitor C8. The collector of transistor Q13 connects to the gate G1 of FET section Q12′ and hence to the upper side of ramp capacitor C8. The emitter of transistor Q13 connects through a resistor R22 and potentiometer P3 to the positive potential line 228, the slider 268 of the potentiometer P3 being connected to such positive potential line 228. The base of transistor Q13 connects to a filter circuit 269 which comprises series resistors R23 through R25 connected from the base of the transistor Q13 to the ground line 229, in that order. Filter capacitors C9, C10 and C11 connect at the upper ends thereof intermediate the base of transistor Q13 and resistor R23, between resistors R23 and R24, and between resistors R24 and R25, respectively. The remaining or lower ends of the capacitors C9 through C11 connect to the ground line 229. The anode of a Zener diode CR5 also connects between filter resistors R24 and R25, the cathode thereof connecting to the positive potential line 228.

Transistor Q14 and the circuitry associated therewith acts to control initiation of ramp generation by the capacitor C8. The collector of transistor 214 connects to the gate G1 of FET section 212″ and the emitter thereof connects directly to the ground line 229. The base of transistor 214 connects through a bias resistor R26 to the negative potential line 266 of the power supply unit 102 (FIG. 1). The ramp start signal line 155 from the A/D converter and computation timing counter unit 152 connects through a resistor R27 and parallel bypass capacitor C12 to the base of ramp start transistor Q14.

Output is taken from the FET section Q12′ directly from the source S thereof and applied to input pin 2 of the comparator Z1. Output is taken from the FET section Q12″ at the junction of resistors R21 and R20 and applied to input pin 3 of the comparator Z1. The operating level of comparator Z1 is established by connection of pin 1 thereof to the ground line 229. Operating potential is supplied to the comparator Z1 by connection of pin 8 thereof to the positive supply line 228 and connection of pin 4 thereof to the negative potential line 266. Power supply filter capacitors C13 and C14 connect from aforementioned pins 8 and 4, respectively, of the comparator Z1 to the ground line 229. Output pin 7 of comparator Z1 is normally at a high potential but drops to a low potential when the input potentials on input pins 2 and 3 thereof indicate that the potentials on storage capacitor C7 and ramp capacitor C8 are equal.

The output of comparator Z1 is taken from pin 7 thereof and applied through a resistor R28, paralleled by a bypass capacitor C15, to the base of transistor Q15. Transistors Q15 and Q16 act as amplifiers. The emitter of transistor Q15 connects directly to the ground line 229 and the collector thereof connects through a resistor R29 and parallel bypass capacitor C16 to the base of transistor Q16. Operating potential is applied through a collector supply resistor R30 to the transistor Q15 from a low (5 volts) positive potential line 271 of the power supply 102 (FIG. 1).

The emitter of amplifier transistor Q16 connects directly to the ground line 229 and the collector potential is supplied to transistor Q16 through a collector supply resistor R31 from the low positive potential line 271. A power supply filter capacitor C17 connects from the low positive potential line 271 to the ground line 229. Output is taken from the collector of transistor Q16 and applied through the end of conversion (EOC) line 156 to the A/D converter and computation timing counter unit 152 to indicate that the ramp signal generated on capacitor C8 has reached the level of the video sample stored on capacitor C7.

As hereinafter described with respect to the A/D converter and computation timing counter unit 152, such EOC signal on line 156 eliminates the ramp start signal from ramp start line 155, causing discharging of the ramp capacitor C8.

A/D CONVERTER AND COMPUTATION TIMING COUNTER UNIT (FIG. 9)

The A/D converter and computation timing counter unit 152 includes the digital portion 275 of the A/D converter and a frame counting circuit 276. The computation timing unit 163 is also disclosed in FIG. 9.

The digital portion 275 of the A/D converter comprises a J-K flip-flop C3A, a NAND gate D3C and a parallel output binary counter C9A. Toggle or clock input pin 1 of J-K flip-flop C3A is connected to the start digitize line 153 from the sample generator 145.

Direct reset pin 4 of j-K flip-flop C3A connects to the EOC line 156 from the analog portion 150 of the A/D converter. Output pin 5 of J-K flip-flop C3A connects, preferably internally, as indicated by the broken line 277, to an input on the reset side of the flip-flop and complemental output pin 6 of J-K flip-flop C3A connects preferably by an internal connection, as indicated by the broken line 278, to an input on the set side of the flip-flop. Complimental output pin 6 of J-K flip-flop C3A also connects to the ramp start line 155 which goes to the analog section 150 of the A/D converter. Output pin 5 of J-K flip-flop C3A connects to input pin 10 of NAND B3C and also, through the further end of conversion (EOC) line 164 to the computation timing unit 163.

The other input, pin 9, of NAND B3C connects to the clock line CL .5. Output pin 8 of NAND B3C connects to input pin 1 of the counter C9A which provides a parallel binary representation of the sample amplitude on output pins 4, 11, 9 and 6 thereof. Output pins 4, 11, 9 and 6 of counter C9A connect through lines AD0, AD1, AD2, and AD3, comprising the path 157, to the memory unit 158.

The frame counting circuit 276 comprises a parallel output counter C4A, a NAND gate A8B and an inverter C1E. Input pin 1 of counter C4A connects through line 279 to the output of the frame flip-flop (hereinafter discussed) of the intrusion logic unit 110. Parallel output pins 4, 11, 9 and 6 of counter C4A connect to input pins 9, 10, 12 and 13 respectively of NAND A8B. Output pin 8 of NAND A8B connects through the inverter C1E and hence through line 281, comprising a part of path 157 (FIG. 1), to the memory unit 158. The counter C4A causes an output to appear on line 281 once in every 16 frames of the scanning devices 119 through 122 (FIG. 1).

The computation timing unit 163 (FIG. 9) includes inverters F7F, C7B and C1F, NAND gate F8A, 4 bit counter D7A and MSI (medium scale integration) decoder C10A. The end of conversion (EOC) signal from line 164 above discussed is applied through the inverter F57 to the zero set input pin 2 of the 4 bit counter D7A as well as to input pin 5 of NAND F8A. The 4 bit counter D7A has four parallel output pins 4, 11, 9 and 6 and of these, output pin 6, which carries the most significant digit, connects through inverter C7B to input pin 3 of NAND F8A. Input pin 4 of NAND F8A connects to timing line CL .5. The output of NAND F8A connects to data input pin 1 of the four bit counter D7A. Thus, upon occurrence of the EOC signal indicating the end of conversion of the A/D converter and upon the resultant setting of the four bit counter D7A to output to zero, NAND F8A passes the 2 MHz clock pulses from line CL .5 to the four bit counter D7A causing same to count through 8 states.

The first three outputs of the 4 bit counter D7A, namely output pins 4, 11 and 9 thereof, connect to input pins 1, 13 and 2 of the MSI decoder C10A, the fourth and remaining input pin 3 thereof being held at a logical zero by connection to the system ground line 229. The MSI decoder C10A has three output pins 10, 8 and 5 which are serially actuated as the four bit counter D7A achieves the second, fourth and eighth of its eight states, respectively. The outputs appearing on output pins 10, 8 and 5 of the MSI decoder C10A are negative going pulses. The output at pin 10 of MSI decoder C10A passes through and is inverted by the inverter C1F and will be referred hereinafter as the alert clock pulse, same being passed by the line 165 (FIG. 1) to the arithmetic unit 161. The pulse appearing on output pin 8 of the MSI decoder C10A and corresponding to the fourth state of the four bit counter D7A is passed by a line 282 to the memory unit 158. The pulse appearing on output pin 5 of the MSI decoder C10A, corresponding to the eighth state of the four bit counter D7A, is passed by a 283 also to the memory unit 158.

Output pin 5 of the MSI decoder C10A which carries the pulse corresponding to the eighth and last state of the four bit counter D7A, also connects to the set input pin 2 of counter C9A of the digital portion 275 of the A/D converter for setting the counter C9A to zero after the digitized sample thereon has been applied to memory unit 158.

Finally, a shift input signal, taken from the output pin 6 of the four bit counter D7A, is applied through a line 284 to the memory unit 158. Lines 282, 283 and 284 comprise the path 166 (FIG. 1) to the memory unit 158.

MEMORY UNIT (FIG. 10)

The memory unit 158 (FIG. 10) comprises storage circuitry generally indicated at 287, a control circuit generally indicated at 288 and an inhibit circuit generally indicated at 289.

The storage circuitry 287 in the particular embodiment shown has a 516 bit capability and comprises NAND gate B3D, a pair of 256 bit MOS shift registers D5A and D6A and a 4 bit MSI shift register C5A having parallel inputs and outputs. The storage circuitry 287 further includes a J-K flip-flop E8B and inverter C7A and a pair of DTL power gates C6A and C6B. The control circuitry 288 associated with the storage circuitry 287 includes a NAND gate C2B and an inverter F7E.

The 4 bit shift register C5A acts as a parallel input-output device for serially storing digitized samples in, and retrieving stored digitized samples from, the memory sift registers D5A and D6A. The digitized sample inputs 2, 1, 13 and 12 of MSI register C5A connect to the parallel digitized sample lines AD0, AD1, AD2 and AD3, respectively, from the A/D converter and computation timing counter 152. The 4 bit shift register C5A also has output pins 4, 6, 8 and 10 connected to parallel stored sample output lines M0, M1, M2 and M3, respectively, which comprise the path 169 (FIG. 1) to the arithmetic unit 161. In addition, the four bit shift register C5A has a serial input at pin 3 thereof and receives control inputs as hereinafter discussed at control input pins 9, 11 and 5 thereof.

More particularly, pin 9 of shift register C5A serves as a load input and is connected through line the line 281 to the frame counting circuit 276 of the A/D converter and computation timing counter unit 152 for preventing updating of the memory except once every sixteenth frame of the set of scanning devices 119 through 122. Input pin 11 of shift register C5A connects through the shift input line 284 to the computation timing unit 163.

Input pin 5 of shift register C5A acts an a clock input and is connected to the control circuitry 288 comprising NAND C2B and inverter F7E. More particularly, input pins 9, 10 and 11 of NAND C2B are respectively connected through line 282 to the computation timing unit 163, through line 201' (the $\overline{\text{EOF}}$ line) to the end of field circuit 203 of the sync logic unit 110 and through the shift pulse line 159 to the shift pulse generator circuit 245 associated with the sample generator unit 145. Output is taken from output pin 8 of NAND C2B and applied through inverter F7E to the clock input pin 5 of the shift register C5A for determining the time at which the digitized sample will be clocked through the shift register C5A into the memory.

Memory shift registers D5A and D6A are connected in series to give a 516 bit storage capability. Thus, output pin 2 of shift register D5A connects to input pin 13 of shift register D6A.

Operating potential is supplied to the shift registers D5A and D6A as follows. An intermediate positive potential line 291 supplies a 10 volt positive potential from the power supply 102 to pin 1 of each of the shift registers D5A and D6A. Pin 14 of each of the shift registers D5A and D6A is connected to the ground line 229 of power supply 102. Negative operating potential is supplied to pin 9 of each of the shift registers D5A and D6A from a low negative potential line 292 of the power supply 102 which in the particular embodiment shown applies a negative 17 volt potential.

NAND gate B3D and DTL power gate C6A supply clock signals to the shift registers D5A and D6A for clocking data thereinto. More particularly, input pins 12 and 13 of the NAND b3D respectively connect to the shift pulse line 159 of the shift pulse generator circuit 245 of the sample generator unit 145 and to the $\overline{\text{EOF}}$ line 201' from the sync logic unit 110. Output pin 11 of NAND B3D connects through the DTL power gate C6A, which acts as a clock interface level converter, to the clock input pin 5 of each of the shift registers D5A and D6A.

The J-K flip-flop E8B, inverter C7A and DTL power gate C6B are provided to compensate for timing discrepancies between the MSI type shift register C5A and the slower MOS type memory shift registers D5A and D6A. Switching of J-K flip-flop E8B is controlled by connection of the clock input 13 thereof to output pin 8 of NAND C2B above-described. Preferably internal connections, indicated at broken lines at 294 and 295, extend from output pins 8 and 9, respectively, of the J-K flip-flop E8B to inputs at the set and reset sides, respectively, thereof. The digitized sample is fed serially from output pin 10 of the four bit shift register C5A directly to set input pin 11 of the J-K flip-flop E8B and also through inverter C7A to reset input pin 12 of the J-K flip-flop E8B. Data output, or more particularly the digitized sample, is taken in serial form from the output pin 9 of the J-K flip-flop E8B and fed through the data DTL power gate c6B to input pin 13 of the first MOS shift register D5A, such pin comprising data input to the MOS memory.

Because of the difference in the operating potential range of the MOS storage registers D5A and D6A from the remainder of the to the digital portion of the memory unit, a bank F9 of external pull-up resistors R32 through R35 is provided. More particularly, the MOS storage registers D5A and D6A operate on a 0 to positive 10 volt range whereas the remainder of the memory unit operates on a 0 to 5 volt range. Thus, the resistor R32 biases the clock input pins 5 of the shift registers D5A and D6A by connection therethrough to the positive 10 volt potential line 291 and the resistor R33 biases the memory data input pin 13 of shift register D5A by connection thereof also to the positive 10 volt potential line 291. The data output line connected to output pin 2 of the second MOS shift register D6A connects through resistors R34 and R35 in series to the ground line 229, the stored sample output being taken on a line 296 connected intermediate the resistors R34 and R35 and thus having an amplitude range of from 0 to 5 volts rather than from 0 to 10 volts.

Thus, previously stored samples in serial form are applied through the line 296 to the serial input pin 3 of the four bit shift register C5A.

The 4 bit shift register C5A applies the thus stored sample through its parallel output pins 4, 6, 8 and 10 to the parallel stored sample output line M0, M1, M2 and M3 and thence to the arithmetic unit 161, said lines M0, M1, M2 and M3 comprising the path 169 of FIG. 1.

The inhibit circuit 289 comprises an inhibit flip-flop 298 of the RS type, comprising NAND gates C8A and D9D, and a buffer inverter C2C.

Output pin 3 of NAND C8A connects to input pin 12 of NAND D9D and, similarly, output pin 11 of NAND D9D connects to input pin 2 of NAND C8A, the usual R-S flip-flop configuration. The alert signal line 171 from the arithmetic unit 161 connects to set input pin 1 of the R-S flip-flop 298 and the line 283 from the A/D converter and computation timing counter unit 152 connects to reset input pin 13 of R-S flip-flop 298. Output is taken from pin 3 of the R-S flip-flop 298 and applied to input pin 1 of NAND C2C. Input pin 2 of NAND C2C is connected to the entry lockout line 177 from the intrusion logic 172. The NAND C2C acts as a buffer inverter and output is taken from pin 12 thereof and applied to the load input 9 of MSI register C5A, for inhibiting same when a noise spike coincides with the sample to prevent the sample from entering the memory to cause a spurious alert as hereinafter discussed, the inhibit function being removed when an alarm has occurred to allow updating the memory.

Figure 11:
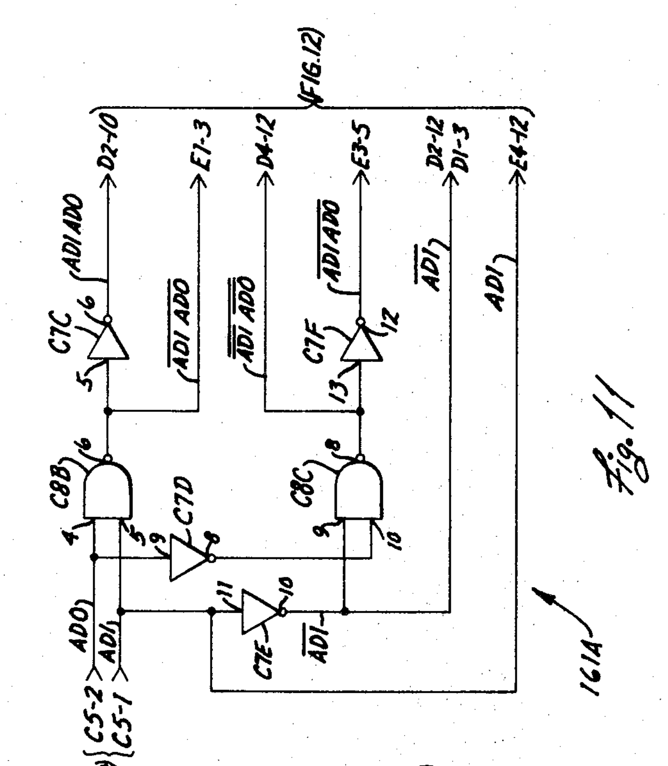
FIG. 11 is a schematic diagram of the input or combinational logic portion of the arithmetic unit of FIG. 1.
Figure 12:
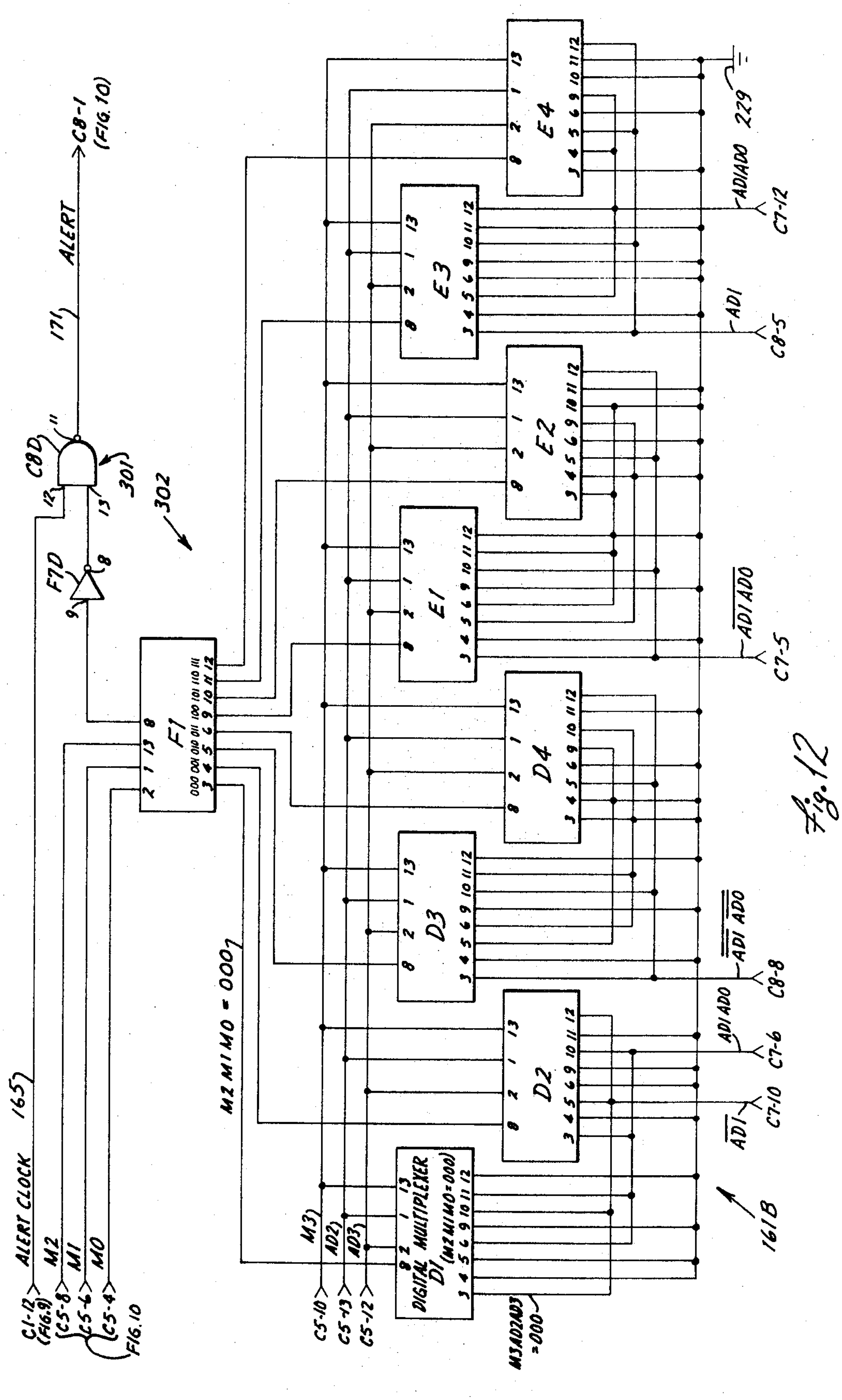
FIG. 12 is a schematic diagram of the multiplexer portion of the arithmetic unit of FIG. 1.

ARITHMETIC UNIT (FIGS. 11 and 12)

The arithmetic unit 161 comprises an input or combinational logic circuit 161A (FIG. 11) and a multiplexer circuit 161B (FIG. 12). The multiplexer and associated input logic 161A act as a hard-wired, read-only memory, the output of which is a logical zero at line 171 if the digitized sample on lines AD0, AD1, AD2, and AD3 differs from the stored sample appearing on lines M0, M1, M2 and M3 from the memory unit 158 by an amount equal to or exceeding a reference setting R. In the particular embodiment shown, R equals 2.

The input logic circuit 161A of the arithmetic unit 161 comprises NAND gates C8B and C8C, together with inverters C7C, C7D, C7E and C7F.

As stated, the arithmetic unit 161 is arranged for determining whether the difference between a new digitized sample and a previously stored sample equals or exceeds the reference R which in the particular embodiment shown is a difference of two digits or light levels. The least significant digit of the newly digitized sample appears on line AD0 and the second least significant digit thereof appears on line AD1. The input logic circuit 161A of the arithmetic unit is thus arranged to provide a plurality of outputs reflecting the relationship of the least and second least significant digits AD0 and AD1 of the binary representation for the newly digitized sample. Thus, lines AD0 and AD1 are the input lines to the input logic circuit 161A and are connected to input pins 4 and 5, respectively, of NAND gate C8B.

The operation of any NAND gate may be characterized by the equation:

$$C = \overline{AB}$$

where AB means "A" and "B" and where the inputs to the NAND gate are respectively A and B and C is the output. This relationship means A and B is one if and only if A is a logical "1" and B is a logical "1." The bar over the term AB conventionally indicates an inversion.

For convenience in reference, the output lines of the input logic circuit 161A, which carry signals resulting from application of the basic equation above, will be characterized by reference characters in accordance with the outputs carried thereby and in accordance with the above equation of Boolean algebra. Thus, output pin 6 of NAND C8B connects directly to logic output line $\overline{AD1\ AD0}$ and also, through inverter C7C, connects to output line AD1 AD0. Input line AD0 connects through inverter C7D to input pin 10 of NAND gate C8C and input line AD1 connects through the inverter C7E to input pin 9 of NAND gate C8C whereby the compliments of the AD0 and AD1 signals are applied to such input pins 10 and 9, respectively, of NAND gate C8C. Output pin 8 of NAND C8C connects directly to output line ($\overline{AD1\ AD0}$) and connects indirectly through inverter C7F to output line $\overline{AD1}$ $\overline{AD0}$. In addition, the output of inverter C7E taken from pin 10 thereof appears on output line $\overline{AD1}$. An extension of the AD1 line provides the final output of the input logic circuit 161A. All of the output lines of the input logic circuit 161A of FIG. 11 connect to the multiplexer circuit 161B of FIG. 12.

Thus, the input logic unit circuit 161A provides to the multiplexer circuit 161B the signals $\overline{AD1}$ $\overline{AD0}$, $\overline{AD1}$ $\overline{AD0}$, $\overline{AD1\ AD0}$, $\overline{AD1\ AD0}$, $\overline{AD1}$, and AD1, all said signals being derived from the AD0 and AD1 signals directly or through NAND gates and/or inverters.

The multiplexer circuit 161B is intended to provide, as an output, an alert signal when the difference between the digital sample representation appearing on lines AD0, AD1 AD2 and AD3 differs from the digital representation of the stored sample from a previous scan of the same point or segment in the scene viewed by the same scanning device by value of two or more. Conversely, no alert signal is given when such difference is 0 and 1. To this end, the multiplexer circuit 161B includes alert output circuitry generally indicated at 301 and a multiplexer array generally indicated at 302.

The multiplexer array comprises commercially available MSI (medium scale integration) devices known as digital multiplexers or data distributors which in the particular embodiment shown are arranged in two levels. The first level comprises digital multiplexer F1 and the second level comprises a bank of eight digital multiplexers D1, D2, D3, D4, E1, E2, E3 and E4. The nine digital multiplexers are preferably identical. In the particular embodiment shown, 8 bit multiplexers are used.

In standard form, digital multiplexers have $n$ "address" inputs, $2^n$ "data" inputs and 1 output. Thus, in the particular embodiment shown, the 8 bit multiplexers utilized each have three address inputs comprising pins 2, 1 and 13, eight data inputs comprising pins 3, 4, 5, 6, 9, 10, 11 and 12 and one output comprising pin 8. Each multiplexer is arranged to gate to its output whichever one of its inputs is addressed. Thus, for example, if the address was 101, the fifth data bit value would be present at the output of the multiplexer.

Such digital multiplexers can be used to implement directly Boolean functions having $n + 1$ variables. Thus, where $n = 3$ (so that there are three address inputs and eight data inputs in the multiplexer), a four variable Boolean function can be implemented.

Figure 19A:
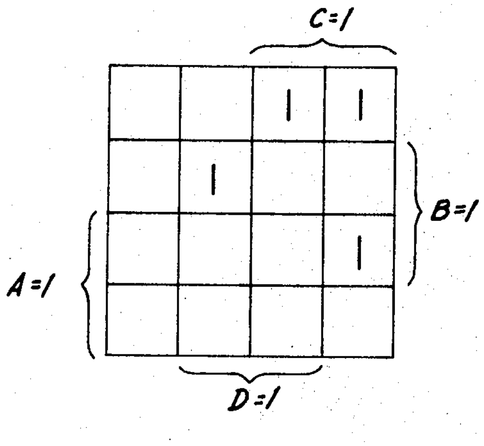
FIG. 19A is a Karnaugh map used as a step in implementing a four variable function using an eight bit digital multiplexer.

As an example of how a function of four variables A, B, C and D may be implemented using a single 8 bit multiplexer consider the function $X = \bar{A}\ \bar{B}\ C + \bar{A}\ B\ \bar{C}\ D + A\ B\ C\ \bar{D}$. FIG. 19A discloses a Karnaugh map comprising a square divided into 16 subsquares, arranged in four columns of four subsquares each. Inside several of the squares are numerals 1 which are the value of the function X for corresponding values of A, B, C and D.

More particularly, the top two horizontal rows of subsquares correspond to the values $A = 0$ and the bottom two rows to the values $A = 1$. The top and bottom horizontal rows correspond to values $B = 0$ and the middle two horizontal rows to $B = 1$. The leftward two vertical columns correspond to $C = 0$ and the rightward two vertical columns correspond to $C = 1$. The extreme leftward and rightward columns correspond to $D = 0$ and the middle two columns correspond to $D = 1$. Such is indicated by the brackets labeled A, B, C and D.

The Karnaugh map is filled in with values of the function X by determing the value of X for each different combination of A, B, C and D equals 0 or 1. Thus, for example, taking the uppermost and leftwardmost subsquare of the Karnaugh map of FIG. 19A, such corresponds to $A = 0$, $B = 0$, $C = 0$ and $D = 0$ for which the above equation gives $X = 0$. Where no number appears in a subsquare, the value of $X = 0$ for that subsquare. As a further example, consider the uppermost and rightwardmost subsquare of the Karnaugh map (FIG. 19A) corresponding to the values $A = 0$, $B = 0$, $C = 1$ and $D = 0$ for which it will be seen that the above equation gives $X = 1$, whereby the numeral 1 is placed in that subsquare. In this manner, the Karnaugh map is completed for the different values of A, B, C and D.

Thereafter, an input function table, for example, the following Table 2, can be made from the Karnaugh map of FIG. 19A in which, for purposes of example, the variables A, B, and C are utilized as independent variables and the corresponding value of X as a function of D is listed for each combination of the various values of variables A, B and C, X as a function of D being taken from the Karnaugh map (FIG. 19A). More particularly, X as a function of D may be found for A, B and C all equal 0 (the first line of the table) by noting from the Karnaugh map that for A, B and C equal to 0 (the leftwardmost two subsquares in the top horizontal row of the Karnaugh map) that X is 0 is both cases (for $D = 0$ or 1) so that, for the first line of the input function Table 2, X as a function of D is 0. In this manner, the table is completed from the Karnaugh map to provide eight different values of X for the corresponding values of A, B and C.

TABLE 2

INPUT FUNCTIONS

| | A | B | C | X = F(D) |
|---|---|---|---|---|
| 0 | 0 | 0 | 0 | 0 |
| 1 | 0 | 0 | 1 | 1 |
| 2 | 0 | 1 | 0 | D |
| 3 | 0 | 1 | 1 | 0 |
| 4 | 1 | 0 | 0 | 0 |
| 5 | 1 | 0 | 1 | 0 |

| | | | | |
|---|---|---|---|---|
| 6 | 1 | 1 | 0 | 0 |
| 7 | 1 | 1 | 1 | D |

Figure 19B:
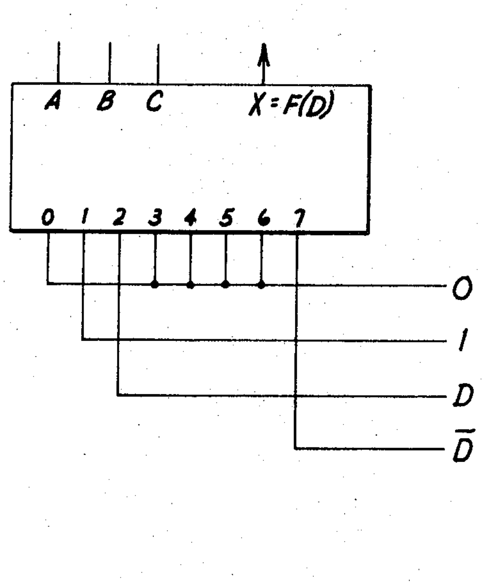
FIG. 19B is a diagram of an eight bit digital multiplexer wired in accordance with the Karnaugh map of FIG. 19A.

The remaining step in the process of implementing the above function X in A, B, C and D with a digital multiplexer is to, as seen in FIG. 19B, utilize A, B and C as the three address terminals of the digital multiplexer shown and to apply as data inputs to the input terminals 0 through 7 the values of X as a function of D given by the correspondingly numbered lines of Table 2. Thus, for example, input pin 1 of the digital multiplexer is supplied with a logical zero, input pin 1 is supplied with a logical one, input pin 2 is supplied with a signal D, etc.

With respect to the present invention, however, it will be noted that there are not merely four variables, the capability of a single 8 bit multiplexer, but rather eight variables, more particularly, the variables M3, M2, M1, M0, and AD3, AD2, AD1 and AD0 which are the 4 bit representations for the stored sample and corresponding new digitized sample, as above discussed. It has been found that two techniques may be employed to use the 8 bit multiplexers to implement functions with larger numbers of variables. One approach is to provide additional combinational logic. It has been found that combinational logic, in general, could be used efficiently to increase the number of variables only by 1, since it is conceivable that it would be necessary to generate all possible functions of the variables involved. This approach is utilized in the present invention and FIG. 11 discloses the combinational logic employed, such being utilized to generate functions of the variables AD1 and AD0. The particular functions of the variables AD1 and AD0 required are determined by a method similar to that employed for determining the functions of the variable D in the example above given with respect to FIGS. 19A and 19B and Table 2, such method being discussed hereinafter.

The second approach to increasing the number of variables, which has been found, is to utilize several multiplexers in an array connection wherein the outputs of one group of multiplexers serve as inputs for another, such an array connection being shown in FIG. 12 wherein the outputs of the eight multiplexers D1 through E4 serve as inputs for the multiplexer F1. This array in effect creates a device which will implement a function of $2n + 1$ variables or, in other words, where $n = 3$ (three address inputs) such arrangement will handle 7 variables. Combining the two approaches, that of combinational logic and an array of multiplexers, an arithmetic unit (FIGS. 11 and 12) is achieved which is capable of implementing a function of eight variables, the variables M3, M2, M1, M0, AD3, AD2, AD1 and AD0.

As mentioned, the relationship to be implemented by the arithmetic unit of FIGS. 11 and 12 is one in which the absolute value of the difference (M3 M2 M1 M0 - AD3 AD2 AD1 AD0) is less than $R = 2$, that is, 0 or 1. It will be noted that the same approach set forth below can be employed when R is a number other than 2.

In the following analysis, the number 0000 is taken to differ from the number 1111 by one unit (1).

The purpose of the following analysis is to determine the connections of the lines carrying signals corresponding to the variables M3, M2, M1, M0, AD3, AD2, AD1 and AD0 to the multiplexers F1 and D1 through E4, the interconnections of the multiplexers above-mentioned, and the combinational functions of two of the variables to be used as data inputs for digital multiplexers D1 through E4. To implement the above-discussed relationship between the numbers M3 M2 M1 M0 and AD3 AD2 AD1 AD0 the variables M3, M2, M1, M0, AD3 and AD2 are conveniently used as address inputs for the array of FIG. 12 and the remaining variables AD1 and AD0 are conveniently used to generate the combinational functions to be applied to the data input pins 3 through 6, 9 through 12 of the second level multiplexers D1 through E4.

Figure 20:
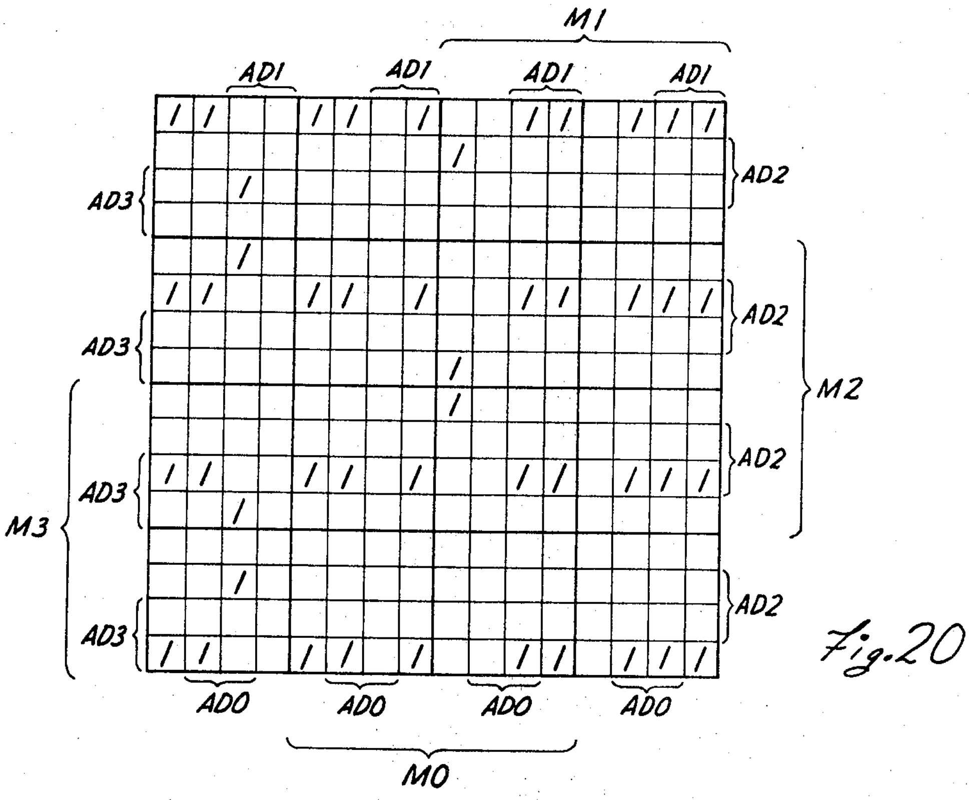
FIG. 20 is a Karnaugh map upon which the arithmetic unit of FIGS. 11 and 12 is based.

The above problem can be solved by essentially the same method set forth above in the example involving the variables A, B, C and D. More particularly, a Karnaugh map as shown in FIG. 20 may be constructed for the eight variables above mentioned. Obviously, the eight variable Karnaugh map of FIG. 20 will be more complex than the four variable Karnaugh map of the example above, shown in FIG. 19A. The eight variable Karnaugh map of FIG. 20 comprises 16 vertical columns and 16 horizontal rows defining 256 subsquares. The construction of the map is facilitated by considering it to be a four variable map in M3, M2, M1, M0 corresponding to the 16 major squares set forth in heavy lines in FIG. 20, with each of these major squares being a four variable map in AD3, AD2, AD1, AD0.

Thus, for example, the major square in the upper right-hand corner of the Karnaugh map of FIG. 20 represents the number M3 M2 M1 M0 = 0010 = 2. The values plotted in this major square represent the numbers 0, 1, 2, 3, etc. in the AD3 AD2 AD1 AD0 code, that is, the numbers 0000, 0001, 0010, 0011, etc. The values inside the subsquares in each case represent the desired output from the array F1, D1 through E4, which is a logical 1 for difference between the example AD3, AD2, AD1, AD0 and the stored sample M3, M2, M1, M0 of less than 2, that is, 0 or 1. The output is to be a logical zero for other differences between the new and stored samples. Such output appears at pin 8 of the first level multiplexer F1. Such output will be a function of the data input variables AD1 and AD0.

Using the above statement of the relationship of the desired output and the eight variables, the subsquares in the Karnaugh map may be filled in as shown either directly from the above relationship or through the use of a truth table. Thus, for example, for M3 M2 M1 M0 = 0010 (corresponding to the top right-hand major square of the Karnaugh map of FIG. 20), the desired output would be 0 for AD3 AD2 AD1 AD0 = 0000. Again, nothing (meaning output of 0) is put inside the corresponding subsquare of the aforementioned upper rightward major block, corresponding to the value AD3, AD2, AD1, AD0 = 0000, such subsquare being of course the upper, left-hand subsquare of that major square.

Similarly, the next rightward subsquare (corresponding to AD3 AD2 AD1 AD0 = 0011) carries the numeral 1 inserted therein corresponding to an array output of 1 indicating a difference between M3 M2 M1 M0 = 0010 and AD3 AD2 AD1 AD0 = 0001 of 1, which is less than R = 2, thus giving an array output of 1 (no alert). By repetition of this process, for each of the 256 subsquares of the Karnaugh map of FIG. 20, the Karnaugh map is completed.

Thus, the Karnaugh map of FIG. 20 provides a means for determining the value of the function of AD1, AD0 for each value of M3, M2, M1, M0, AD3 and AD2, there being 64 such values given by the Karnaugh map corresponding respectively to each of the 64 data inputs of the second level multiplexers D1 through E4. Each such value is represented by a corresponding horizontal line of four subsquares of a major square of the Karnaugh map. Thus, for example, the top line of the upper, leftward major square of the Karnaugh map of FIG. 20 corresponds to the values M3 M2 M1 M0 = 0000 and AD3 AD2 = 00, and the Karnaugh map indicates that the value of the function of AD1, AD0 required give a proper output for the array of FIG. 12 is $\overline{AD1}$. More particularly, the aforementioned top line of the upper leftward major square establishes the following truth table:

TABLE 3

| AD1 | AD0 | f(AD1 AD0) |
|---|---|---|
| 0 | 0 | 1 |
| 0 | 1 | 1 |
| 1 | 0 | 0 |
| 1 | 1 | 0 |

It will be apparent that the function of AD1, AD0 resulting from the above truth table is indeed $\overline{AD1}$.

In a similar manner, the remaining horizontal, four subsquare lines of the major squares of the Karnaugh map of FIG. 20 provide corresponding functions of AD1, AD0. Upon such a consultation of the Karnaugh map, it will be found that the required functions of AD1, AD0 are 0, AD1, $\overline{AD1}$, AD1 AD0, $\overline{AD1\ AD0}$, $\overline{AD1}$ $\overline{AD0}$ and $\overline{AD1}$ $\overline{AD0}$. These then are the functions that must be provided by the combinational logic of FIG. 11, which, as discussed above with respect to FIG. 11, same does provide.

In the above manner, the following map to array transition table (Table 4) can be developed.

multiplexer D1, the input should be $\overline{AD1}$. More particularly, $\overline{AD1}$ is the input corresponding to M2 M1 M0 = 000 (or, in other words, digital multiplexer D1 and input pin 3 of multiplexer F1) and AD3 AD2 M3 = 000 (or in other words, input pin 3 of digital multiplexer D1). Thus, Table 4 gives the proper functions of the variables AD1 and AD0 to be applied to each of the input pins 3 through 6 and 9 through 12 of the eight second-level multiplexers D1 through E4.

Table 4 can be omitted if desired and one may proceed directly from the Karnaugh map in assigning functions of AD1 AD0 to the various inputs of the second level multiplexers D1 through E4.

Given thus the required inputs for input pins 3 through 6 and 9 through 12 of each of the second level multiplexers D1 through E4, it becomes a simple matter to crosswire same to the appropriate function lines $\overline{AD1}$, AD1, AD0, etc. from the combinational logic of FIG. 11. Thus, in the particular embodiment shown in FIG. 12, pins 3 and 10 of multiplexer D1 and pins 5 and 12 of digital multiplexer D2 are connected to the $\overline{AD1}$ line. Similarly, pins 6 and 11 of multiplexer D1 and pins 3 and 10 of multiplexer D2 are connected to the AD1 AD0 line. The remaining input pins of multiplexers D1 and D2 connect to the zero or ground line 229. In a similar manner, the input connections of multiplexers D3, D4 and E1 through E4 are made in accordance with Table 4 and the Karnaugh map of FIG. 20.

Although the address inputs 2, 1 and 13 of the first-level multiplexer F1 and of second-level multiplexers D1 through E4 may carry different ones of the variables M3, M2, M1, M0, AD3 and AD2 without changing the ability of the array 302 to function correctly and give the proper output, such a rearrangement of the crosswiring of the data inputs 3 through 6, 9 through 12

TABLE 4 MAP TO ARRAY TRANSITIONS

| Pin | AD3 AD2 M3 | D1 M2 M1 M0 = 000 | E1 M2 M1 M0 = 001 | D3 M2 M1 M0 = 010 | E3 M2 M1 M0 = 011 | D2 M2 M1 M0 = 100 | E2 M2 M1 M0 = 101 | D4 M2 M1 M0 = 110 | E4 M2 M1 M0 = 111 |
|---|---|---|---|---|---|---|---|---|---|
| 3 | 000 | $\overline{AD1}$ | $\overline{AD1\ AD0}$ | $\overline{\overline{AD1}\ \overline{AD0}}$ | AD1 | AD1 AD0 | 0 | 0 | 0 |
| 4 | 001 | 0 | 0 | 0 | 0 | 0 | 0 | 0 | $\overline{\overline{AD1}\ \overline{AD0}}$ |
| 5 | 010 | 0 | 0 | 0 | AD1 AD0 | $\overline{AD1}$ | $\overline{AD1\ AD0}$ | $\overline{\overline{AD1}\ \overline{AD0}}$ | AD1 |
| 6 | 011 | AD1 AD0 | 0 | 0 | 0 | 0 | 0 | 0 | 0 |
| 9 | 100 | 0 | 0 | 0 | 0 | 0 | 0 | 0 | $\overline{\overline{AD1}\ \overline{AD0}}$ |
| 10 | 101 | $\overline{AD1}$ | $\overline{AD1\ AD0}$ | $\overline{\overline{AD1}\ \overline{AD0}}$ | AD1 | AD1 AD0 | 0 | 0 | 0 |
| 11 | 110 | AD1 AD0 | 0 | 0 | 0 | 0 | 0 | 0 | 0 |
| 12 | 111 | 0 | 0 | 0 | $\overline{AD1\ AD0}$ | $\overline{AD1}$ | $\overline{AD1\ AD0}$ | $\overline{\overline{AD1}\ \overline{AD0}}$ | AD1 |

In the particular embodiment shown, the variables M2, M1 and M0 were arbitrarily choosen as the address variables for the first level multiplexer F1 and the corresponding lines M2, M1 and M0 connect to the address input pins 13, 1 and 2 of multiplexer F1. Similarly, the variables M3, AD2 and AD3 were chosen as the address variables for the second level multiplexers D1 through E4 and the corresponding lines M3, AD2 and AD3 connect to the address input pins 13, 1 and 2 of the second level multiplexers D1 through E4. Input pins 3 through 6 and 9 through 12 of the first level multiplexer F1 connect to the output pins 8 of the second level multiplexers D1 through E4, respectively. Multiplexer array output, taken from pin 8 of multiplexer F1 is to be a logical "0" (signifying an alert) where the new sample and stored sample differ by two or more, as above indicated.

Thus, for example, Table 4 indicates that for pin 3 of of the individual multiplexers D1 through E4 and a correspondingly different arrangement of Table 4, although the same Karnaugh map would be used.

It will be seen that by merely changing the wiring of the inputs of the second-level multiplexers D1 through E4 that the array 302 can be used to provide an alert output in response to a different set of relationships between the new digitized sample AD3 AD2 AD1 AD0 and the prior sample from memory M3 M2 M1 M0, for example, for providing an alert where the difference between those two numbers is equal to or greater than 3.

Figure 13:
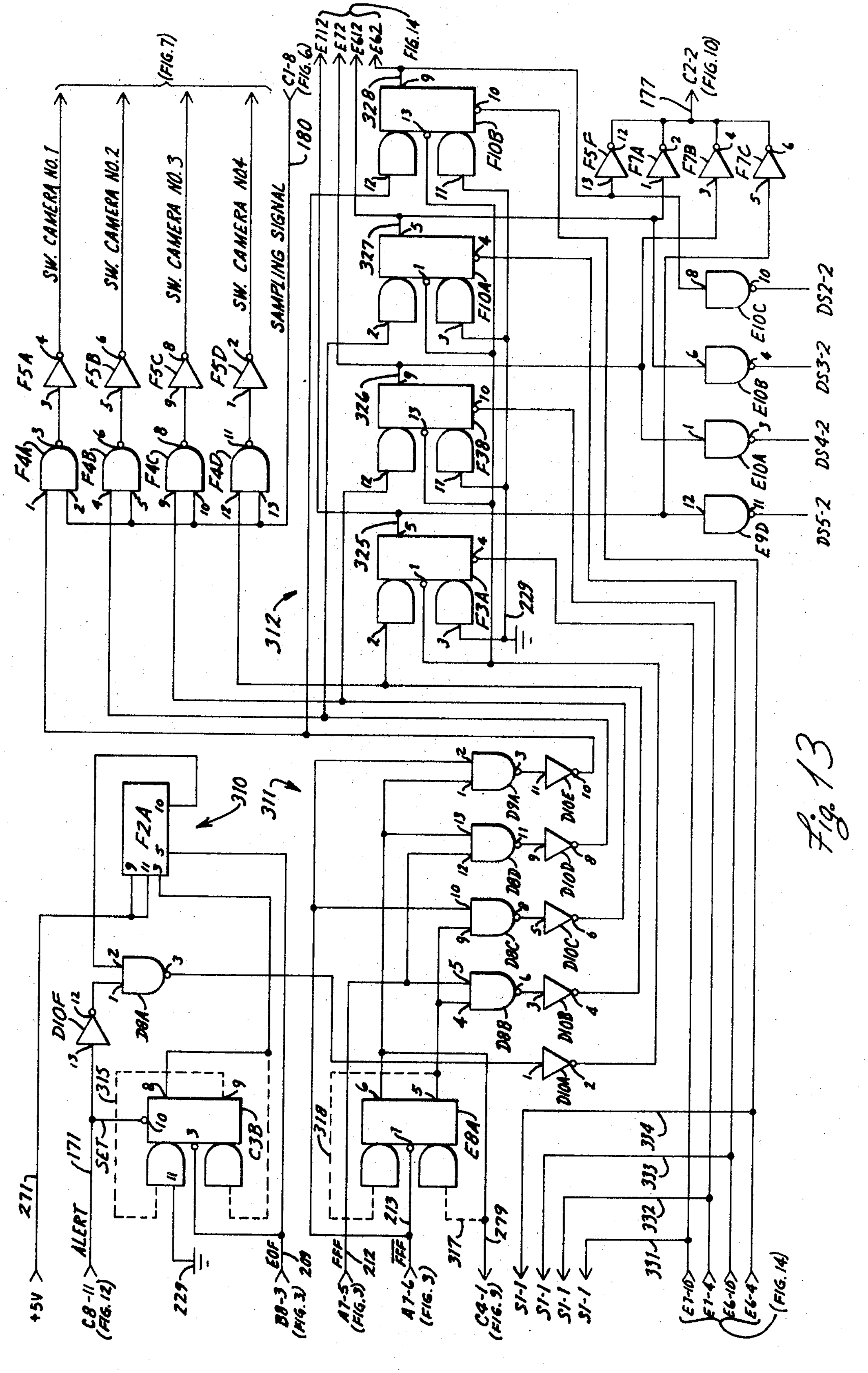
FIG. 13 is a schematic diagram of the intrusion logic unit of FIG. 1.

The output of the array 302 is taken from pin 8 of multiplexer F1 and applied through inverter F7D to input pin 13 of NAND gate C8D. The other input pin 12 of NAND gate C8D connects through line 165 to the computation timing unit 163 (FIG. 9) which provides an alert clock signal for determining the time at which an alert output will be supplied. The alert output is taken from output pin 11 of NAND C8D and applied through the alert line 171 to the inhibit circuit of the memory 158 and also to the intrusion logic unit 172 of FIG. 13.

INTRUSION LOGIC UNIT (FIG. 13)

The intrusion logic unit 174 includes an intrusion detect circuit 310, a camera sequencing circuit 311 and an intrusion storage and control circuit 312.

The intrusion detect circuit 310 comprises a suspicion storage register F2A, a J-K flip-flop C3B, a NAND gate D8A and inverters D10F and D10A. The alert line 171 from the arithmetic unit of FIG. 12 connects to the direct set input pin 10 of the J-K flip-flop C3B. The end of field (EOF) line 209 from the sync logic unit 110 of FIG. 3 connects to the clock or toggle input pin 13 of J-K flip-flop C3B. Output pin 8 and complemental output pin 9 of J-K flip-flop C3B connect, preferably by internal connections indicated in broken lines at 314 and 315, respectively, to inputs on the reset and set sides of the J-K flip-flop C3B, such inputs being unnumbered. Operating bias is applied to the J-K flip-flop C3B via a connection from set input 11 to the ground line 229. Output is taken from the J-K flip-flop C3B from output pin 8 thereof and applied to input pin 3 of the suspicion storage register F2A.

The EOF line 209 also connects to clock input pin 5 of the suspicion storage register F2A. Input pins 9 and 11 of suspicion storage register F2A are connected to the positive 5 volt potential line 271.

The suspicion storage register F2A is a 4 bit shift register shifted at the end of each field by the EOF line 209 so that when an alert signal is applied to pin 3 thereof by the J-K flip-flop C3B, and shifted thereinto by the EOF signal on line 209 at the end of the field in which the alert appeared, same is stored for the next four fields and until the end of the next scan of the same camera, whereat a logical "1" is applied from output pin 10 of the suspicion storage register F2A to input pin 2 of NAND D8A. The negative going alert pulse from line 171 is also applied through inverter D10F to input pin 1 of NAND D8A. The NAND D8A provides at pin 3 thereof a logical "0" output in response to an alert for the same camera in two succeeding fields (succeeding fields being every fourth field for the present embodiment wherein four cameras are sequenced in a one field per camera sequence). The negative going intrusion pulse thus appearing on the output pin 3 of NAND D8A is applied to the intrusion inverter D10A. Such intrusion signal indicates that the system has determined that an intrusion has occurred in the scene scanned by one of the scanning devices 119 through 122.

The scanning device or camera sequencing circuit 311 comprises a frame flip-flop E8A, NAND-type decoding gates D8B, D8C, D8D and D9A, inverters D10B, D10C, D10D and D10E, further NAND gates F4A through F4D and further inverters F5A through F5D.

Frame flip-flop E8A is connected at its toggle or clock input 1 to the complemental output ($\overline{FFF}$) line 213 of the field flip-flop A7A of the sync logic unit 110. The frame J-K flip-flop E8A has an output pin 6 and a complimental output pin 5 which respectively connect, preferably through the internal connections indicated at broken lines at 117 and 118, respectively, to inputs on the reset and set sides, respectively, of the J-K flip-flop E8A.

NAND gates D8B, D8C, D8D and D9A are arranged as a field decoder, such NAND gates providing sequential outputs, each NAND having an output during a respective one of four successive fields. To this end, the inputs of the aforementioned NAND gates are connected to the output lines 212 and 213 of the field flip-flop and also to the output pins 6 and 5 of the frame flip-flop E8A. More particularly, input pins 4 and 5 of NAND D8B connect to complemental output pin 5 of NAND D8A and to the field flip-flop line 212.

Input pins 9 and 10 of NAND D8C connect to the complimental output pin 5 of frame flip-flop E8A and the complimental output line 213 of the field flip-flop. Input pins 12 and 13 of NAND D8D connect to the output line 212 of the field flip-flop and output pin 6 of the frame flip-flop E8A. Input pins 1 and 2 of NAND D9A connect to output pin 6 of frame flip-flop E8A and the complemental line 213 of the field flip-flop.

Figure 3:
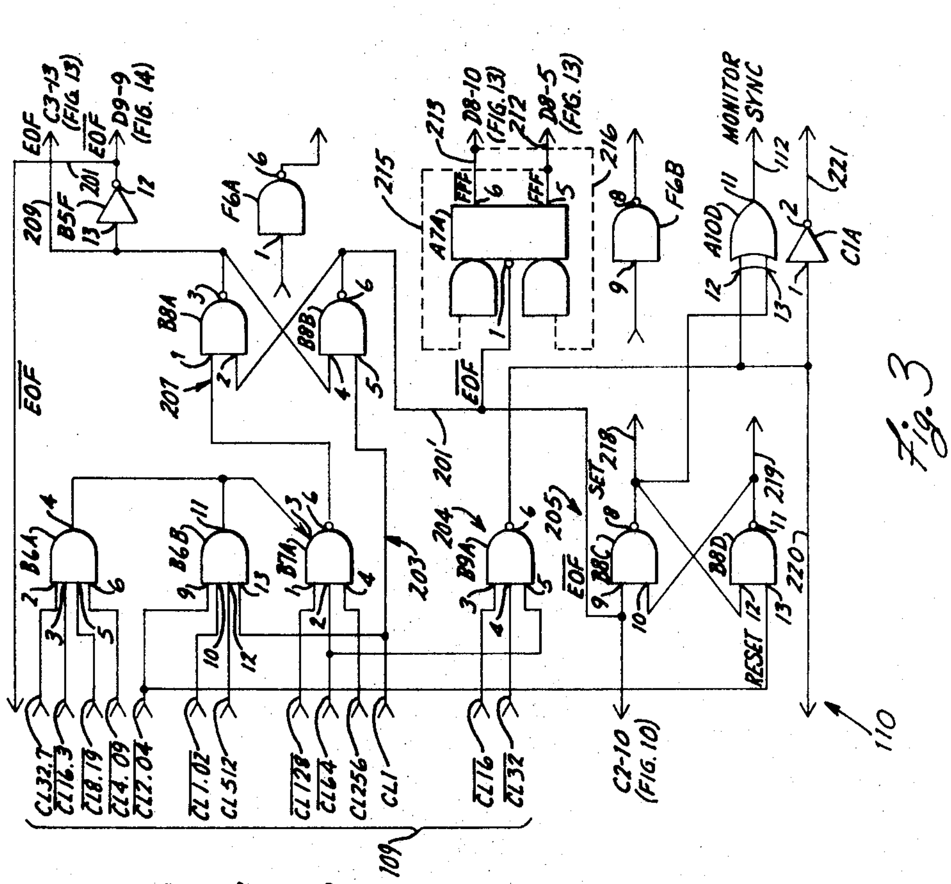
FIG. 3 is a schematic diagram of the sync logic unit of the apparatus in FIG. 1.

Thus, the field flip-flop of FIG. 3 and the frame flip-flop E8A provide a two bit binary code which is decoded by the gates D8B, D8C, D8D and D9A, the "one in four camera" code outputs appearing on pins 6, 8, 11 and 3 of the respective gates and being applied through inverters D10B through D10E to input pins 1, 4, 9 and 12 of the camera sequence NAND gates F4A, F4B, F4C and F4D. The remaining inputs of these NAND gates F4A through F4C, namely, input pins 2, 5, 10 and 13, respectively, are connected to the sampling signal line 180 from the sample generator 145 of FIG. 6. Thus, in response to the "one in four camera" code the NAND gates F4A through F4D gate the sampling signal therethrough in a field-by-field sequence. Output pins 3, 6, 8 and 11 are of the NAND gates F4A through F4D, respectively, connect through inverters F5A through F5D, respectively, to lines 319 through 322 which connect to the sampling signal inputs of respective ones of the sample and hold circuits of the sample and hold unit 140. As a result, camera 119 is sampled for one field, camera 120 is sampled for the next field, camera 121 for a third field, camera 122 for a fourth field and then camera 119 again is sampled for a fifth field and so on in a continuing cycle.

The intrusion storage and indication circuit 312 comprises intrusion storage flip-flops F3A, F3B, F10A and F10B. The toggle or clock inputs of these flip-flops, pins 1, 13, 1 and 13, respectively, all connect to the output of intrusion inverter D10A and are supplied with the positive going intrusion pulse therefrom. The reset input pins 3, 11, 3 and 11, respectively of these flip-flops connect to ground line 229 and are held thereby at a logical "0." The set inputs, pins 2, 12, 2 and 12, respectively of these flip-flops are connected respectively to the outputs of inverters D10B, D10C, D10D and D10E so that the "one and four camera" code is applied thereto whereby one and only one of such flip-flops can be set at any one time and then only in response to an intrusion signal appearing on the output of inverter D10A. Output is taken from the intrusion storage flip-flops F3A, F3B, F10A and F10B at output pins 5, 9, 5 and 9 thereof, respectively, which outputs connect to lines 325 through 328, respectively. The presence of a signal on any one of such lines indicates an intrusion on the corresponding one of the cameras 119 through 122.

The intrusion lines 325 through 328 connect to the monitor switching logic unit 175, such lines comprising a portion of the path 174 of FIG. 1.

Intrusion lines 325 through 328 also connect through respective lamp drivers E9, E10, E10B and E10C to panel intrusion lamps (not shown), there being one such lamp for each camera. Lighting of a given intrusion lamp indicating that an intrusion has occurred on the corresponding one of the camera 119 through 122.

Finally, intrusion lines 325 through 328 are connected to corresponding ones of inverters F7C, F7B, F7A and F5F, respectively, and therethrough to line 177 to the memory unit 158 for allowing updating of the memory upon occurrence of an intrusion for any camera. Such actuation of the line 177 results in updating of the memory, upon an occurrence of an intrusion on one of the cameras.

MONITOR SWITCHING LOGIC UNIT (FIG. 14)

Figure 14:
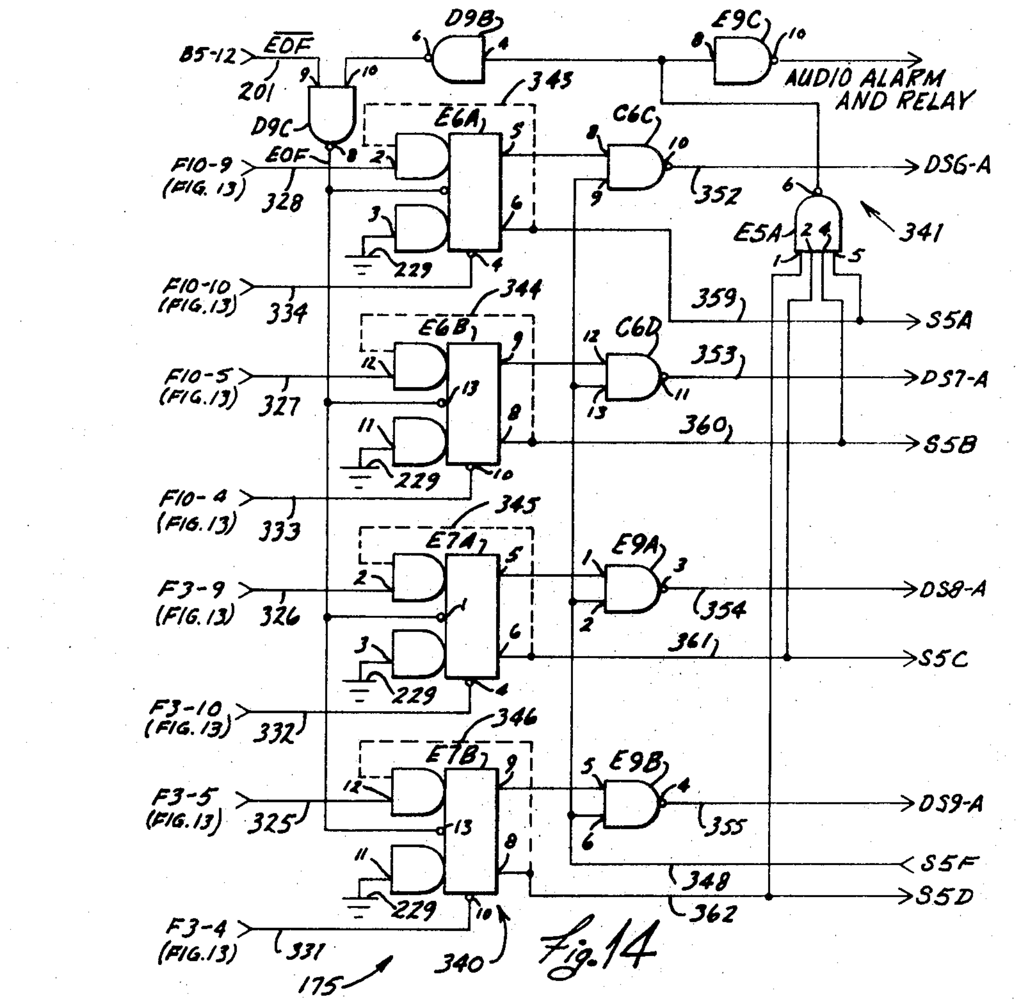
FIG. 14 is a schematic diagram of the monitor switching logic unit of FIG. 1.

The monitor switching logic unit 175 (FIG. 14) is provided to generate drive signals to the video monitor switch unit 179 so that the monitor 113 to connected to the particular one of the cameras 119 through 122 showing an intrusion. The monitor switching logic 175 also provides for preventing double images on the monitor due to several intrusions in close succession on different cameras.

The monitor switching logic includes monitor switch drive circuitry 340 and alarm and inhibit circuitry 341.

The monitor switch drive circuitry 340 includes a NAND gate D9C, monitor control flip-flops E6A, E6B, E7A and E7B and corresponding drivers C6C, C6D, E9A and E9B, respectively. Each flip-flop and driver set (for example, the flip-flop E6A and driver C6C) corresponds to a particular one of the cameras 119 through 122, the flip-flop and driver sets being preferably identical. One input pin 9 of NAND D9C connects to the $\overline{\text{EOF}}$ line 201. Remaining input pin 10 of NAND D9C is normally held at a logical "1" by the inhibit and alarm circuitry 341. Output pin 8 of NAND D9C normally carries the EOF signal (the $\overline{\text{EOF}}$ signal inverted) and is connected to the clock inputs 1, 13, 1 and 13 of the flip-flops E6A, E6B, E7A and E7B. Reset inputs, pins 3, 11, 3 and 11, respectively, of the above-mentioned flip-flops connect to the ground line 229 and are held thereby at a logical "0." The direct reset inputs 4, 10, 4 and 10, respectively of the above-mentioned flip-flops connect respectively to lines 334, 333, 332, and 331, the manual reset lines from the intrusion logic unit 172 of FIG. 13. The set inputs, pins 2, 12, 2 and 12, respectively, of the above-mentioned flip-flops connect to the intrusion output lines 328, 327, 326 and 325, respectively, of the intrusion logic unit 172 of FIG. 13. The complemental outputs, pins 6, 8, 6 and 8, respectively, of the above-mentioned flip-flops connect, preferably by an internal connection indicated by the broken lines 343 through 346, respectively, to unnumbered set inputs of the respective flip-flops.

The inputs, pins 8, 12, 1 and 5, respectively, of drivers C6C, C6D, E9A and E9B connect to the direct output pins 5, 9, 5 and 9, respectively, of the flip-flops E6A, E6B, E7A and E7B, respectively, the remaining inputs of such drivers, pins 9, 13, 2 and 6, respectively, all connecting through a line 348 to a suitable manual switch (not shown). The output pins 10, 11, 3 and 4 of the drivers C6C, C6D, E9A and E9B, respectively, connect through lines 352 through 355, respectively, comprising path 178 (FIG. 1), to the video monitor switch unit 179 and to monitor lamps (not shown) associated with the video monitor.

The inhibit and alarm circuitry 341 comprises NAND gate E5A and drivers E9C and D9B. Input pins 1, 2, 4 and 5 of NAND E5A connect respectively to the complemental output lines 362, 361, 360 and 359 of the monitor control flip-flops E7B, E7A, E6B and E6A, respectively, so that switching of one of the monitor control flip-flops to display the output of one camera on the video monitor 187 due to an intrusion on such camera will cause an output of NAND E5A at pin 6 thereof. This output is applied to input pin 8 of driver E9C and input pin 4 of driver D9B by connection of the output pin 6 of NAND E5A thereto. Driver E9C when so energized activates alarm 189 and relay 196 (FIG. 1). On the other hand, the driver D9B when so actuated, provides an inhibit signal which prevents the NAND D9B from applying the $\overline{\text{EOF}}$ signal to the clock input of the monitor control flip-flops E6A, E6B, E7A and E7B and thereby prevents an intrusion on a second camera from resulting in a display of a double image on the monitor.

It will have been noted that two sets of lamps are provided, each of which respond to an intrusion on a given camera. The intrusion lamps connected to the drivers E9D, E10A, E10B and E10C of FIG. 13 above-described remain actuated until the corresponding one of the intrusion flip-flops F3A, F3B, F10A and F10B is manually reset via the pushbuttons (not shown) associated with the lines 331 through 334. On the other hand, the monitor lamps (not shown) associated with the monitor lines 352 through 355 of FIG. 14 remain in an actuated condition for as long as the ccorresponding camera is connected to the monitor, no two of these monitor lamps being lit at the same time since two images will not be displayed on a monitor at the same time as a result of the action of NAND E5A. Thus, the first mentioned set of lamps acts as an intrusion memory indicator, whereas the second set of lamps indicates which camera's output is being displayed on the monitor.

VIDEO MONITOR SWITCH UNIT (FIG. 15)

Figure 15:
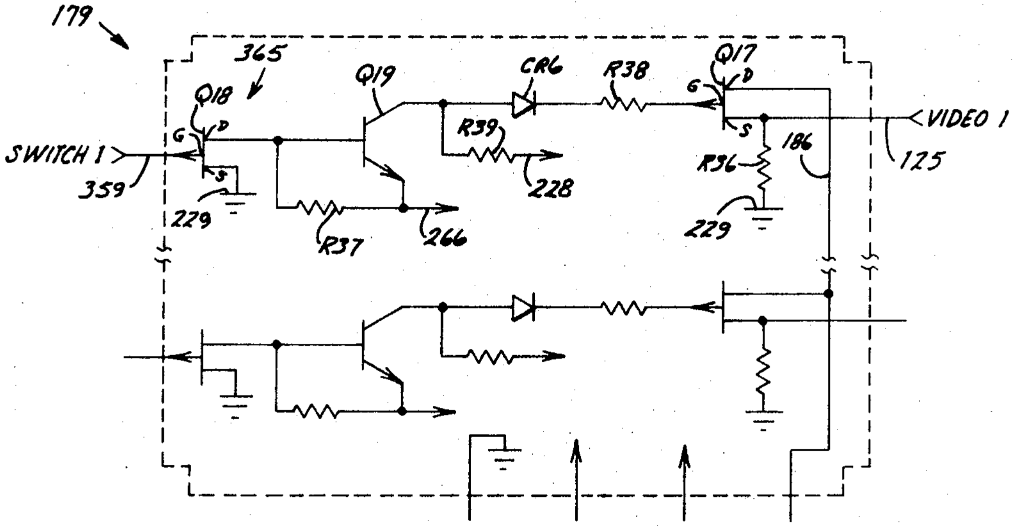
FIG. 15 is a schematic diagram of the video monitor switch unit of FIG. 1.

The video monitor switch unit 179 (FIG. 15) comprises a plurality (only two being shown in the drawing) of electronic switch circuits arranged for connecting the output of a given camera to the monitor 113 in response to actuation by the monitor switching logic unit 175. The electronic switches associated with the several cameras are preferably identical, one thereof being provided for each camera and a description of one will suffice for all. Whereas in the particular embodiment disclosed four cameras are used, four video monitor switch circuits will be required. Considering the video monitor switch circuit 365 associated with camera 119 and output line 359 of the monitor switching logic unit of FIG. 14, same comprises field effect transistors Q17 and Q18 and transistor Q19. The video signal on line 125 (FIG. 1) from camera 119 is conducted through the path 185 to the source S of FET Q17. Source bias is provided by a resistor R36 connected to the ground line 229.

The switching signal from the monitor switching logic is applied through line 359 to the gate G of FET Q18. Source bias is provided the FET Q18 by direct connection to the ground line 229. The output is taken from the drain D of FET Q18 and applied to the base of transistor Q19. Emitter bias is supplied the transistor Q19 by direct connection to the negative 6 volt supply line 266. Base bias is provided by connection of a resistor R37 from the emitter to the base of transistor Q19. Output is taken from the collector of transistor Q19 and applied through the anode and cathode, in that order, of a protective diode CR6 and thence through a series resistor R38 to the gate G of FET Q17. Collector potential is supplied to transistor Q19 through a resistor R39 from the positive 12 volt supply line 228. Thus, the switching signal applied to line 359 controls, through FET Q18 and transistor Q19, switching of FET Q17. Video output is taken from the drain D of FET Q17 and applied to a common output line, to which are connected the corresponding outputs of the remaining and preferably identical switching circuits of the video monitor switch unit 179, such common output line being indicated at 186 and being connected to the video monitor amplifier unit 187.

VIDEO MONITOR AMPLIFIER UNIT (FIG. 16)

Figure 16:
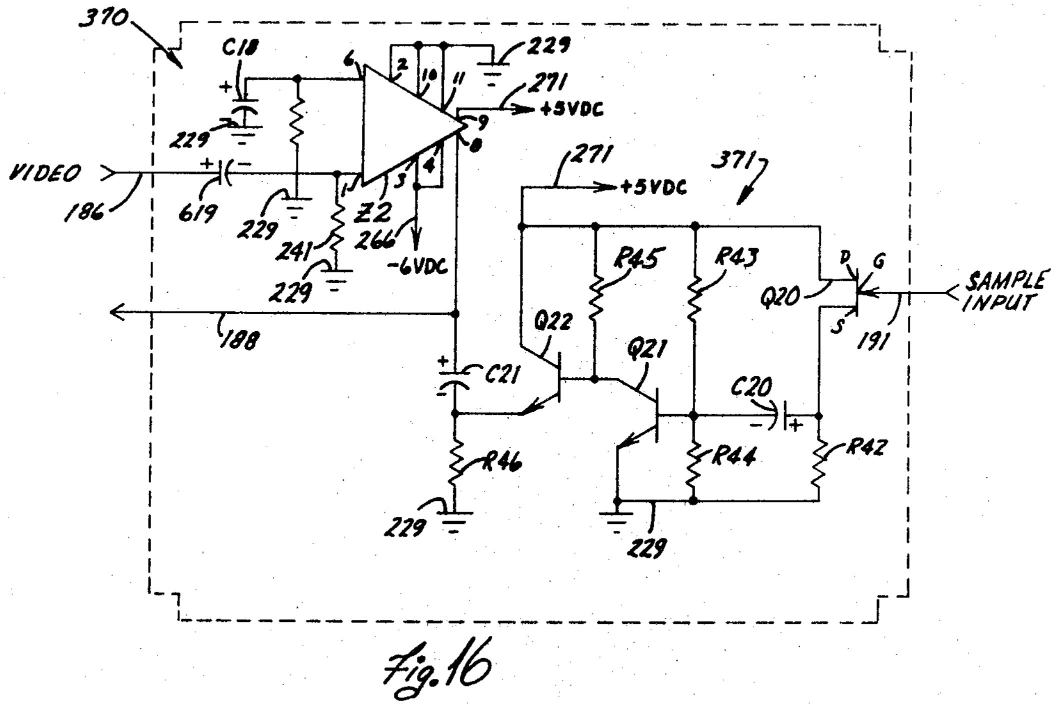
FIG. 16 is a schematic diagram of the video monitor amplifier unit of FIG. 1.

The video monitor amplifier 187 (FIG. 16) comprises a camera video amplifier circuit 370 and a sample display amplifier circuit 371.

The camera video amplifier 370 comprises an integrated circuit video amplifier Z2 which in the particular embodiment shown is an RCA Model No. CA3001. The power supply connections to the video amplifier, making same suitable for amplification of the video signal to be fed to a monitor, include connection of pins 2, 10 and 12 thereof to the ground line 229, connection of pin 9 thereof to the positive 5 volt line 271 and connection of pins 3 and 4 thereof to the minus 6 volt supply line 266. Further, bias is supplied to pin 6 thereof by connection to the ground line 229 through a paralleled resistor R40 and capacitor C18. Video from a selected camera is applied through line 186 from the video monitor switch unit 179 and through a coupling capacitor C19 to input pin 1 of the amplifier Z2. Bias is applied to input pin 1 of amplifier Z2 through a resistor R41 connected to the ground line 229. Output is taken from pin 8 of the amplifier Z2 and applied through line 188 to the video monitor or display device 113.

The sample display amplifier circuit 371 is provided for the purpose of displaying on the monitor, either alone or in superimposed relationship with an image corresponding to the video output of one of the cameras 119 through 122, the sample points or segments generated by the sample generator 145. The sample display amplifier circuit includes an FET Q20 arranged as a source follower and transistors Q21 and Q22.

The sampling signal from the sample generator unit 145 is applied to the gate G of FET Q20 through line 191. Positive operating potential is applied to the drain of FET Q20 from the positive 5 volt line 271. Source bias is applied to source S of FET Q20 through a resistor R42 connected to the ground line 229. Output is taken from the FET Q20 at the source S thereof and applied through a capacitor C20 to the base of transistor Q21. Base bias is applied to transistor Q21 by connection to, and intermediate, resistors R43 and R44 which form a voltage divider connected from the positive potential line 271 to the ground line 229. Collector voltage is applied to the transistor Q21 through a resistor R45. The collector of transistor Q21 connects to the base of transistor Q22. Collector potential is applied to transistor Q22 directly from the positive 5 volt line 271. A resistor R46 couples the emitter of transistor Q22 to the ground line 229 and is chosen to provide a proper impedance match to the monitor 113. The output is taken from the emitter of transistor Q22 and applied through a coupling capacitor C21 to the line 188 connected to the monitor 113. The transistor Q22 thus provides a low impedance output and isolation between the monitor input and the output of the sample generator 145.

OPERATION

Although the operation of the apparatus 100 embodying the invention has been indicated above, same will now be summarized to assure clear understanding of the invention.

OVERALL CIRCUIT (FIG. 1)

Briefly summarizing the overall operation of the apparatus 100 with respect to the block diagram of FIG. 1, the sync logic unit 110 in response to timing signals from the main timing counter unit 107 produces vertical and horizontal sync signals from the cameras 119 through 122, applying same thereto through the horizontal and vertical sync drivers of the sync driver unit 116. The sync logic unit 110 also provides horizontal and vertical sync signals through the line 112 to monitor 113. In addition, sync logic unit 110 provides the EOF and $\overline{\text{EOF}}$ signals at the end of each field of scan and the field flip-flop signals FFF and $\overline{\text{FFF}}$ which have a period of two fields (one frame).

The video output of cameras 119 through 122 is applied to the respective video amplifiers 130 through 133 which adapt the dark level and maximum voltage to the succeeding circuitry and apply the thus amplified video signal to the individual sample and hold circuits of the sample and hold unit 140.

The sample generator 145 responds to timing signals from the main timing counter 107 to provide a sampling signal which is applied through the line 180 to the intrusion logic unit 172. The intrusion logic unit 172 in turn applies the sampling signals to each of the sample and hold circuits of the sample and hold unit 140 in sequence, through path 181, causing the sample and hold unit to sequentially sample the video of each of cameras 119 through 122. The sample generator 145 subjects the basic sample signal to horizontal and vertical masking to remove sample points from the picture margin and horizontal and vertical retrace times and to reduce the number of sample segments to a number compatible with the number of cameras being processed and the size of the memory. Sample generator unit 145 also produces four memory shift pulses following each sample to provide a time interval between computations and which are applied through the line 159 to the memory unit 158.

The analog samples from the sample and hold unit 140 are applied through line 149 to the analog portion 150 of the A/D converter which generates a constant slope ramp, the ultimate amplitude and time duration of which corresponds to the amplitude of the analog sample. A pulse of corresponding length is applied to the digital portion of the A/D converter which is a part of the A/D converter and computation timing counter unit 152.

The unit 152 provides, in response to the time duration pulse from the unit 150, a 4 bit digital representation of the amplitude of each analog sample. The A/D converter and computation timing counter also provides a frame count, the frame count and 4 bit digitized sample being applied through path 157 to the memory unit 158. The computation timing unit 163 provides a plurality of negative going .5 usec. pulses sequenced in time, including an alert clock pulse supplied to the arithmetic unit 161 and several other pulses to the digital portion of the A/D converter and memory for readying same for another conversion.

The digitized sample is also applied through path 160 to the arithmetic unit 161 which compares the magnitude of the new digitized sample with a corresponding digitized sample from memory from the same point of a prior field of the same camera and provides an output or alert signal if the difference exceeds a preselected magnitude. The arithmetic unit provides parallel processing utilizing a digital multiplexer array and combination logic for very rapidly (.5 usec.) comparing the new and stored samples.

The intrusion logic unit 172 responds to two successive alert signals resulting from two successive fields of the same camera by producing an intrusion signal indicating that an intrusion or other condition of interest has occurred in the scene viewed by the camera. The intrusion logic unit stores the intrusion signal in the flip-flop assigned to the particular camera which suffered the intrusion, lights a corresponding intrusion lamp and enables the memory unit to update, although the normal updating time may not have occurred. The intrusion logic unit also controls the sequence in which the sample and hold unit 140 samples the cameras 119 through 122.

The monitor switching logic unit 175 responds to the output of the intrusion logic unit 172, indicating that an intrusion has occurred on one of the cameras, to cause the video monitor switch unit 179 to switch the camera which has suffered that intrusion to the monitor 113 so that the output thereof can be displayed and the operator can view the scene in which the intrusion occurred. The monitor switching logic unit 175 also provides for actuation of an alarm and for preventing display of multiple images on the monitor in the event of successive, close-in-time intrusions on several cameras.

The video monitor switch unit 179 in response to signals from the monitor switching logic unit 175 causes switching of the video of the camera which has suffered an intrusion through the video monitor amplifier 187 to the monitor 113.

The video monitor amplifier unit 187, in conjunction with the switch 195, allows sample signals from the sample generator to be applied to the monitor 113 in superposition upon a video signal appearing thereon so that the placement of the sample segments can be viewed, for purposes of setting up the system or the like.

While in the particular embodiment disclosed, certain characteristics, such as number of samples per field, placement of samples on the field of view, sample time length, number of cameras, bit capacity of memory, number of bits utilized to represent a sample timing signal periods, sync rates and so forth have been set forth, it will be recognized that variations in such quantities are contemplated within the scope of the invention.

SYNC LOGIC UNIT (FIG. 3)

Turning now to the operation of the apparatus 100 in more detail, the operation of the clock 104 and main timing counter 107 has been fully discussed above.

Referring to the signal period table (Table 1) above, the signal C1 64 represents the horizontal frequency. Since a field contains 262 ½ lines, vertical sync is obtained from signal C1 32 divided by (262 ½) × 2 or, in other words, by 525. The binary representation of the decimal number 525 is 1000001101. This corresponds to the logic combination of signals C1 32.7, C1 16.3, C1 8.19, C1 4.09, C1 2.04 C1 1.02, C1 512, C1 256, C1 128 and C1 64. Gates B6A, B6B and B7A of the sync logic unit 110 form this combination and signal C1 1 is also included in the combination to prevent crossover slivers from generating noise impulses.

The R-S flip-flop 207 formed by gates B8A and B8B is set by the output of gate B7A and reset by signal C1 1. The purpose of the R-S flip-flop 207 is to make the end of field (EOF) pulse 0.5 usec. wide. The resetting of the down counters A4, A5 and A6 of the main timing counter 107 by the EOF pulse results in the output of gate B7A being a very narrow sliver or spike. This sliver must set the R-S flip-flop 207 and does indeed set the flip-flop 207 because the flip-flop 207 generates the reset signal for the down counters A4, A5 and A6.

The EOF signal, or more particularly $\overline{\text{EOF}}$, triggers the field flip-flop A7A with the result that the output FFF on output pin 5 of flip-flop A7A is a logical "0" for the first field in a frame and a logical "1" in the second field, the field flip-flop A7A thus cycling once every two fields.

Horizontal sync signals for the camera are generated by gate B9A. The combination of the inputs C1 16, C1 32 and C1 64 yields an 8 usec. pulse occurring every 64 usec., 64 usec. being the length of the horizontal scan line for the cameras. Inverter C1A inverts the 8 usec. pulse so that both polarities of the sync may be made available to the cameras, enabling use of cameras of different sync polarity requirements.

Vertical sync for the camera should be at the EOF rate. The EOF signal itself, as produced by the R-S flip-flop 207, is not suitable since a pulse approximately 1 msec. wide is required for vertical sync. This problem is solved by use of R-S flip-flop comprising gates D8C and D8D. The EOF signal, or more properly $\overline{\text{EOF}}$, sets the flip-flop and the C1 2.04 signal resets it. The C1 2.04 signal was chosen for reset since it switches 1.024 msec. after the EOF signal switches. Inverters F6A and F6B are used as switch selectable power inverters to give positive or negative sync, as well as additional drive required and are normally coupled in the output lines 218 and 219 of the vertical R-S flip-flop.

Horizontal and vertical sync signals for the monitor must be carried on one line to keep the horizontal oscillator of the monitor locked in during vertical sync. Inverted horizontal pulses are sent during the vertical sync time as shown in FIG. 18, such being achieved through the use of the exclusive OR gate A10D.

SYNC DRIVER UNIT (FIG. 4)

Figure 4:
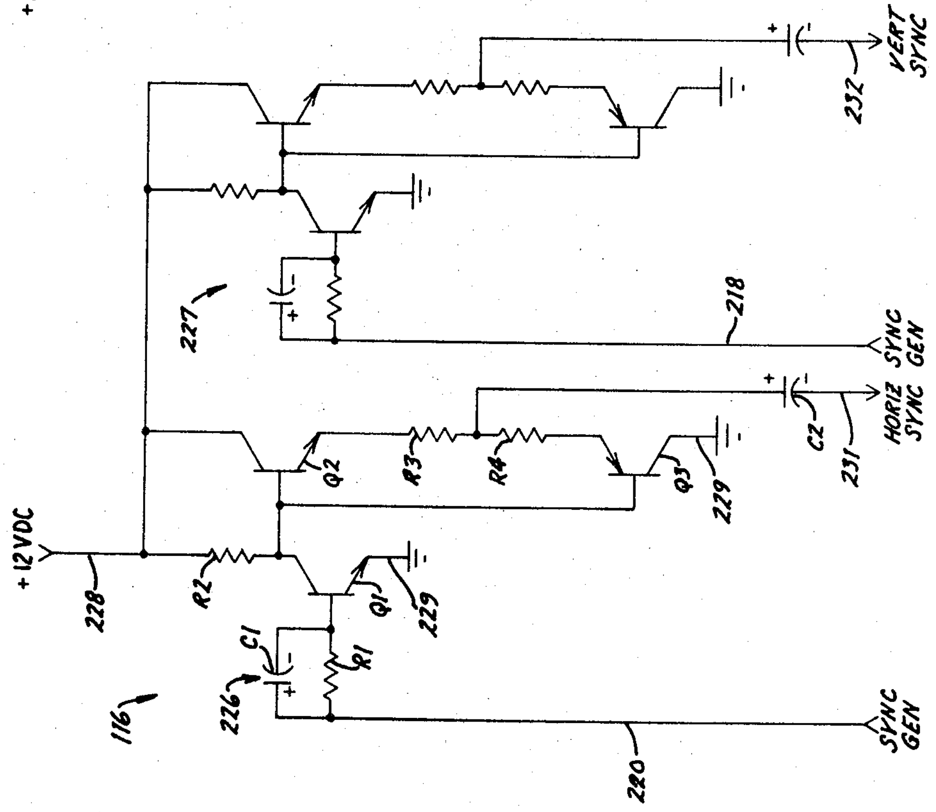
FIG. 4 is a schematic diagram of horizontal and vertical sync driver units of FIG. 1.

The horizontal and vertical sync driver circuits 226 and 227 (FIG. 4) are identical to each other and only one thereof need by discussed. A sync signal, for example, the horizontal sync signal, is applied through line

220, a portion of the path 115, from the sync logic 110 to the base of transistor Q1, which in turn drives the complementary pair, transistors Q2 and Q3. When the collector of transistor Q1 rises in potential due to a drop in base potential thereof resulting from a low potential on line 220, transistor Q2 conducts and transistor Q3 shuts off. On the other hand, when the collector of transistor Q1 drops in potential due to the appearance of a positive sync pulse from line 220, transistor Q2 shuts off and transistor Q3 conducts. Output is taken from a point intermediate emitter resistors R3 and R4 and applied through capacitor C2 to the four cameras 119 through 122, via the line 231, a portion of path 118. Transistor Q2 charges capacitor C2 rapidly during its conduction and transistor Q3 discharges capacitor C2 rapidly during its conduction period. Complementary pair transistors Q2 and Q3 allow the output impedance of the driver circuit 226 to remain constant during both the high and the low swings of the output signal. The particular driver circuit shown is sufficient to drive the sync input of four cameras. It is contemplated that additional drivers may be provided in the event that it is desired to use more than four cameras. Thus, the horizontal sync signal is applied to the cameras and in a similar manner, via the driver circuit 227, and output line 232 thereof, vertical sync is applied to the cameras.

VIDEO AMPLIFIER UNIT (FIG. 5)

The video output of the cameras 119 through 122 is passed by lines 125 through 128, respectively, to the preferably identical video amplifiers 130 through 133, respectively. The purpose of the video amplifiers is to hold the dark level of the video signal at zero and to hold the maximum voltage thereof at 5.8 volts, the video amplifiers thus being arranged to adapt cameras of different outputs to the succeeding circuitry.

Considering the video amplifier 130, the video output of the corresponding camera 119 is applied to the base of transistor Q4 through coupling capacitor C3. The signal is amplified to approcimately 5 volts peak by transistors Q4 and Q5. The gain in the amplifier is adjustable by adjustment of the potentiometer P1, which varies the emitter potential of transistor Q5. Transistors Q6 and Q7 act as buffers to allow the video amplifier 130 to have an output impedance of 75 ohms for matching same to the following circuitry. The diode CR1 biased by potentiometer P2, detects the sync pulses in the incoming video signal and applies same to the capacitor C4 and to the base of transistor Q8. When the sync level drifts either upwardly or downwardly, the average value of the voltage on capacitor C4 changes, causing the collector voltage of transistor Q8 to change in such direction as to change the bias on the base of transistor Q4 in the amount and direction which will bring the sync amplitude back to its proper level. In this manner, the amplifier circuit 130 is adapted to reduce or increase the amplitude of the incoming video signal to provide a video output of the desired level.

Zener diode CR2 conducts when the amplifier output exceeds approximately 5.8 volts and thereupon causes the transistor Q9 to conduct. When transistor Q9 conducts, the amplifier output is dropped back below the point where the Zener CR2 will conduct. This arrangement provides over-voltage protection for output transistor Q7 of the amplifier 130 and comparator module Z1 of the analog portion 150 of the A/D converter of FIG. 8. The amplified video is taken from the amplifier 130 on output line 235 thereof and applied to the sample and hold unit 140.

SAMPLE GENERATOR UNIT (FIG. 6)

The sample and hold unit 140 is also responsive to the output of the sample generator unit 145.

Figure 10:
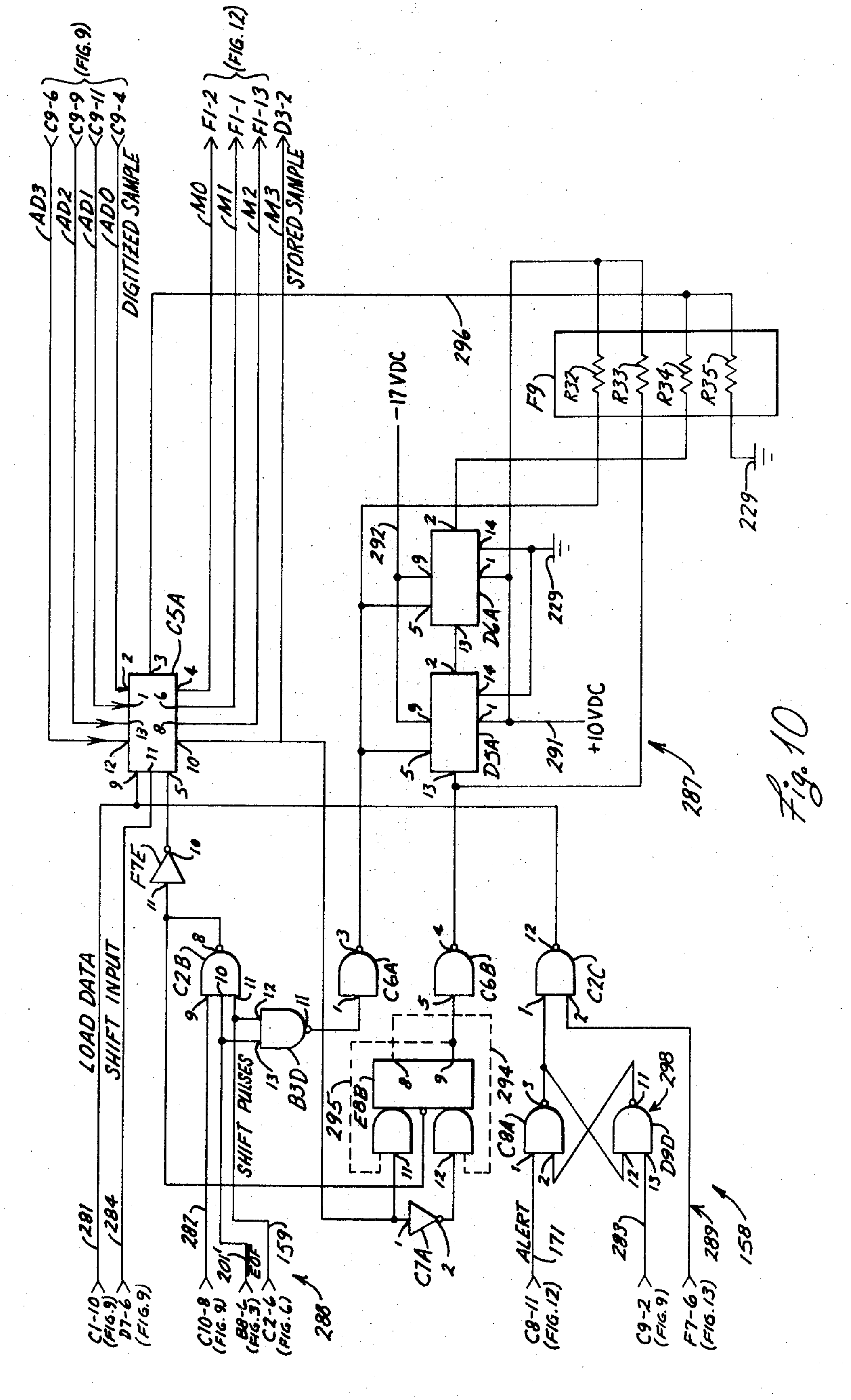
FIG. 10 is a schematic diagram of the memory unit of FIG. 1.

With particular regard to the basic sample pattern, it will be noted that the memory unit of FIG. 10 has a capacity of 516 bits. At 4 bits per sample, this would allow 129 samples total divided among four cameras, giving 32 sample points or segments per camera with one left over. Thus, the sample generator unit 145 must provide a sample pattern consisting of 32 sample points spread uniformly across the viewed area, for each camera.

Figure 17:
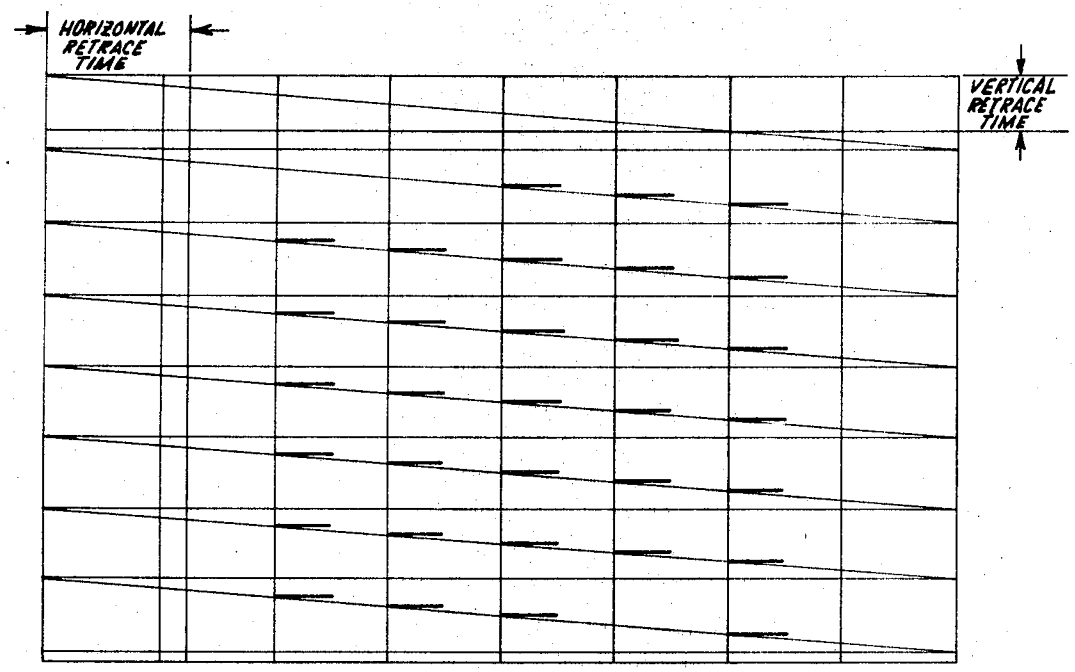
FIG. 17 is a diagrammatic representation of the scanning and sampling pattern of the preferred embodiment of FIG. 1.

The basic sample pattern circuit 240 comprising the exclusive OR gates A10A through A10C generates one sample per scan line. At every fourth line the location of the sample is shifted to the right by 8 usec. This is done as follows. The eight combinations of the variables C1 16, C1 32 and C1 64 applied to the exclusive OR gates A10A through A10C define eight possible sample locations along the line. The variable C1 512 changes state every four lines, C1 1.02 every eight lines and C1 2.04 every 16 lines, such variables being also applied to the exclusive OR gates A10A through A10C. A sample point or segment is generated when the number C1 16, C1 32, C1 64 equals the number C1 512, C1 1.02, C1 2.04, said sample being generated at such time by the exclusive OR gates A10A through A10C. Thus, for lines 0, 1, 2 and 3 of the scanning pattern, sample point is located in the first 8 usec. of the line. For lines 4, 5, 6 and 7, it is located in the second 8 usec. slot. For lines 28, 29, 30 and 31, the sample is located in the last 8 usec. slot. At lines 32, 33, 34 and 35, the pattern begins to repeat itself. Thus, the scanning pattern consists of a group of 32 scanning lines as indicated in FIG. 17, the pattern for each 32 line block being shown in FIG. 21.

Only the first sample in each group of four is used. More particularly, if a sample appears in scan line 0 (FIG. 21), no samples will appear in scan lines 1, 2 and 3. Gates B9C and F5E are used to remove these last three samples from each group of four scan lines by combining the timing signals $\overline{\text{C1 128}}$ and $\overline{\text{C6 256}}$. Thus, the result is the 32 line group of FIG. 21 wherein the sample appears once in every four lines, each sample being offset to the right from the preceding sample by 8 usec. These groups repeat every 32 lines giving 262 lines divided by 32 or 8⅛ groups per field. This would allow 65 samples per field if allowed to stand as is. However, of these, there are sample locations in the horizontal and vertical retrace times as well as at the edge of the picture.

The horizontal masking circuit 241 removes points from the first, second and eighth usec. slots. This removes the samples from the horizontal retrace time as well as from the edges of the picture. Such is carried out by gate B3B, which combines the signals $\overline{\text{C1 64}}$ and $\overline{\text{C1 32}}$ to remove the first two 8 usec. slots and gate B9B which combines timing signals C1 16, C1 32 and C1 64 to remove the last 8 usec. slot.

The vertical masking circuit 242 removes points during the vertical retrace time as well as at the top and bottom edges of the picture. Gate B10A combines timing signals $\overline{C1\ 4.09}$, $\overline{C1\ 8.19}$ and $\overline{C1\ 16.3}$ to remove all points in the first 32 and last six scanning lines of the field. Gate B10B combines timing signals C1 8.19, C1 16.3 and C1 2.04 to remove points in scan lines 33 through 48. This leaves a sample pattern with 33 samples per field. To remove the final one of the samples, C1 512, C1 2.04, C1 4.09, C1 8.19 and C1 16.3 are combined by gates A8A and A9A. The outputs of the aforementioned vertical masking gates are combined by gate B3A and inverted by inverter C1C to form the composite vertical masking signal.

Output gate B7B combines the basic sample signal from the circuit 240, the horizontal masking signal from the circuit 241 and the vertical masking signal from the circuit 242 to form the final sampling signal appearing on the output thereof, such gate also combining the timing signal C1 8 to set the length of the sample, in the present embodiment at 4 usec. It will be apparent that the scanning pattern and masking patterns as well as the length of the sample can be changed at will by varying the timing inputs to the various gates of the circuits 240, 241 and 242, as well as the timing signal applied to input pin 9 of gate B7B.

It should be noted that the use of horizontal and vertical masking not only reduces the number of samples to allow use of a relatively small capacity memory for processing several cameras, but, in addition, reduces the possibility for false propagation of alert signals or alarms where cameras are used which have relatively low ability to precisely place the ends of the scanning lines at the same location in a series of fields or which have a poor capability for precisely and repetitively placing the scanning lines adjacent the top and bottom of the picture at precisely the same location during a series of fields.

The sampling signal is taken from the output of inverter C1D and applied through line 180 to the intrusion logic unit 172 and through line 191 and switch 195 to the video monitor amplifier 187. The sampling signal, preparatory to inversion, is applied as the start digitize signal through line 153 to the A/D converter and computation timing counter unit 152 of FIG. 9. Said start digitize signal is also applied to the shift pulse generator circuit 245 which, though shown as part of the sample generator, will be discussed as to its operation, in connection with the memory unit 158 to which its output connects through the memory shift line 159.

SAMPLE AND HOLD UNIT (FIG. 7)

The sample and hold unit 140 in the particular embodiment shown of FIG. 7 comprises the four identical switch or sample and hold circuits 255 through 258, each connected to the common sample output line 149. The circuit 255, for example, receives the video signal from the output of the corresponding video amplifier 130 on line 235 thereof. The input line 235, together with input lines 262 through 264 of the remaining sample and hold switches comprise the path 135 of FIG. 1. The video signal is thus connected to the source S of FET Q11. The sampling signal for sample and hold circuit 255 is applied thereto on the line 261 from the intrusion logic unit 172 which receives the sampling signals from the sample generator 145 and causes sequential actuation of the sample and hold circuits 255 through 258 to sample the cameras 119 through 122 successively for one field each. If only one camera were to be used, the sampling signal could be applied directly to the sample and hold circuit through the broken line 148 in FIG. 1.

The sampling signal on line 261 is applied to the base of transistor Q10. When the sampling signal swings positive, the transistor Q10 conducts and causes the gate G of FET Q11 to drip in potential which results in conduction of the FET Q11 to transfer the video signal at the source S of FET Q11 through the drain D thereof and to the common output line 149. Thus, samples appear on the line 149 for one field of camera 119 in accordance with the pattern of FIG. 17, then a corresponding set of samples from the camera 120 are applied to line 149, followed by a corresponding set of samples from camera 121, etc., such samples being applied through line 149 to the A/D analog portion 150. The sample and hold circuits 255 through 258 are somewhat similar to the monitor switch circuits of the video monitor switch unit 179 but are of necessity much faster in operation.

A/D CONVERTER ANALOG SECTION (FIG. 8)

The A/D converter analog portion 150 accepts one video sample at a time on line 149 from the sample and hold unit 140 and also accepts a ramp start signal on line 155 from the A/D converter and computation timing counter unit 152. The video sample is applied to the gate G2 of FET section Q12' of the dual FET Q12. The sample is stored on capacitor C7 until the occurrence of a ramp start signal on line 155 indicates that the following circuitry is ready to process it. Use of a video sample of relatively long time duration (4 microseconds in the disclosed embodiment) allows capacitor C7 to, in effect, average out and thus get rid of the effect of short duration noise spikes and other similar spurious signals superimposed on the sample and thus eliminate a possible source of false alarms.

Upon reception of a ramp start signal on line 155, the ramp start line 155 drops to a low potential which cuts off transistor Q14 and allows ramp capacitor C8 to be charged over a period of time by the constant current source, transistor Q13. Thus, a linear voltage ramp builds up on ramp capacitor C8, such linearly rising voltage being applied to the gate G1 of the dual FET section Q12''.

Dual FET sections Q12' and Q12'' are connected as source followers and apply the video sample and linearly rising ramp voltage, respectively, to the comparator Z1 (which in the present embodiment is a Fairchild Model UA710 device). The output of comparator Z1 remains at a high potential until the voltage of the ramp rises to a value equal to the video sample voltage at which point the output of the comparator Z1 switches to a low potential. Transistors Q15 and Q16 amplify the output of comparator Z1 and apply same, as the end of conversion or EOC signal, through the line 156 to the A/D converter and computation timing counter unit 152. Thus, a time duration is established starting with the ramp start signal on line 155 and terminating with the end of conversion signal on line 156, such duration corresponding to the amplitude of the incoming sample signal on line 149.

It may be noted that transistors Q15 and Q16 are required in the particular embodiment shown because the output of the comparator Z1 is a poor cable driver and may result in possible pulse degradation, in the absence of transistors Q15 and Q16, which would cause timing problems.

When the A/D converter and computation timing counter unit 152 receives the EOC signal on line 156, it causes the ramp start line 155 to resume a high potential, causing transistor Q14 to resume conduction. As a result, the voltage on ramp capacitor C8 drops to the saturation voltage of FET section Q12″ which, in the particular embodiment shown, is approximately 150 millivolts.

A/D CONVERTER AND COMPUTATION TIMING UNIT (FIG. 9)

The A/D converter and computation timing counter unit 152 comprises the A/D converter digital portion 275 and the frame counting circuit 276. The start digitize signal applied to line 153 by the sample generator 145 (FIG. 6) sets the flip-flop C3A via the toggle or clock input 1 thereof, upon toggling, the flip-flop C3A switching its complemental output pin 6 from a logical "1" down to a logical "0" and applying same to the ramp start line 155 as the ramp start signal and thence to the A/D analog portion 150 to start ramp generation. The end of conversion (EOC) signal, produced by the A/D converter analog portion 150 upon occurrence of equality of the ramp and video sample amplitude, is applied through line 156 to direct reset pin 4 of flip-flop C3A to reset same, thus returning the ramp start line 155 to a high potential and dropping the potential on the further EOC line 164 from output pin 5 of the flip-flop C3A.

Thus, the flip-flop C3A has been in a set condition for a time period corresponding to the amplitude of the sample applied to the A/D converter 150. The width of the positive going output pulse appearing on output pin 5 of flip-flop C3A can vary from less than 250 nanoseconds to more than 8 microseconds. During this pulse, NAND B3C gates 2MHz clock signals into the four-stage counter C9A. Thus, the count in counter C9A is proportional to the amplitude of the analog sample applied to the A/D converter. The output of the counter C9A appearing on parallel output lines AD3, AD2, AD1 and AD0 is thus the digitized representation of the sample amplitude, or digitized sample. Since the arithmetic unit 161 treats the difference between counts of 1111 and 0000 as being one unit, the counter C9A is allowed to overflow and recycle for high input voltages. This allows high resolution of small voltage changes. The output of counter C9A is applied through line 157 to the memory unit 158 and through line 160 to the arithmetic unit 161.

The A/D converter and computation timing counter unit 152 also includes the frame counting circuit 276 which will be discussed hereinafter with respect to the memory unit.

COMPUTATION TIMING UNIT (FIG. 9)

The computation timing unit 163 (FIG. 9) provides signals to the arithmetic unit 161 to enable same to handle data immediately after the sample is digitized.

The end of conversion (EOC) signal from the output pin 5 of A/D converter flip-flop C3A sets the four bit counter D7A to zero, same being applied thereto through the line 164 and inverter F7F. The inverter C7B converts the resultant logical "0" appearing on pin 6 of counter D7A to a logical "1" and places it on input pin 3 of the NAND gate F8A. The inverter F7F, as a result of the end of conversion, places a logical "1" on input pin 5 of NAND F8A, such inputs on pins 3 and 5 thereof allowing the clock signal C1.5 to pass through input pin 4 of NAND F8A and be applied to input pin 1 of the 4 bit counter D7A. When the count reaches eight (1000), output pin 6 of counter D7A switches to a logical "1" which, through inverter C7B, blocks conduction of clock pulses through NAND F8A. Thus, after each analog to digital conversion of a sample, the counter D7A counts through eight states and then stops.

Figure 9:
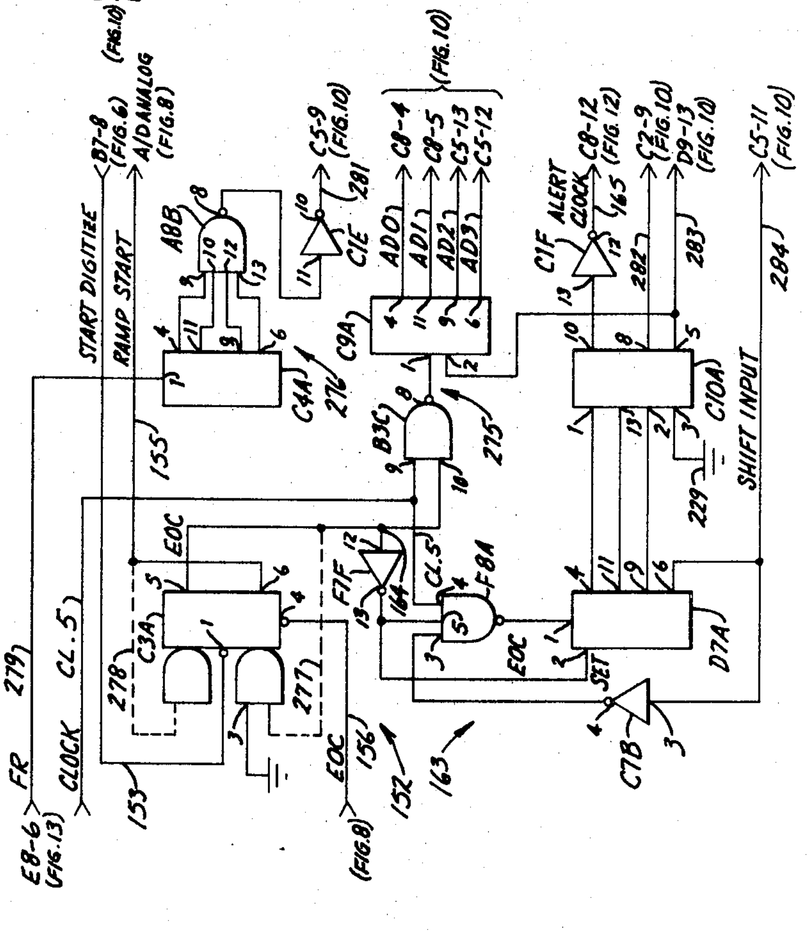
FIG. 9 is a schematic diagram of the A/D converter and computation timing counter unit and computation timing unit of FIG. 1.

These eight states are decoded by the MSI decoder C10A. The outputs of decoder C10A are negative going pulses of 0.5 usec. width. Decoder output pin 10 carries the second, or number 2 pulse decoded, which is inverted by inverter C1F to form the alert clock signal used to clock the alert signal from the output of the multiplexer array of the arithmetic unit 161. The fourth or number 4 pulse decoded is applied through line 282 to the memory unit 158 for transferring data from the converter counter C9A (FIG. 9) into the memory register C5A and to set data into delay flip-flop E8B in the memory unit. The last, or number 8 pulse, from the decoder C10A appearing on output pin 5 thereof is applied through line 283 to the update inhibit flip-flop 298 of the memory unit (FIG. 10) to reset same and also resets the A/D counter C9A (FIG. 9). Further, the output on pin 6 of the counter D7A is applied as a shift input signal to pin 11 of the shift register C5A of the memory unit (FIG. 10).

MEMORY UNIT (FIG. 10)

The memory unit 158 (FIG. 10) comprises a 516 bit shift register composed of the pair of 256 bit MOS shift registers D5A and D6A and 4 bit MSI shift register C5A, the latter having parallel inputs and outputs. In the present embodiment, there are 4 bits per word in the memory, four shift pulses being required therefor between each computation.

Referring to FIG. 6, and more particularly to the memory shift circuit 245 thereof, the flip-flop A7B operates to insure that four pulses are generated following each sample. The occurrence of the sampling pulse on line 153 setting flip-flop A7B directly. The setting of the flip-flop A7B places a logical "1" on an input of NAND C2A. Gates F8C and F8B in response to timing signal $\overline{C164}$, $\overline{C132}$ and $\overline{C116}$ place an 8 microsecond positive pulse on a further input of gate C2A. Timing signal CL 2 is applied to the remaining input of Gate C2A, which timing signal CL2 has four positive transitions during the horizontal sync pulse. Thus, at the end of every line containing a sample pulse, four transitions of the CL2 signal are gated through NAND C2A and thencethrough line 159 into gates C2B and B3D (FIG. 10) of the memory unit 158, such gates being the memory shift control gates.

Flip-flop E8B and inverter C7A correct data timing descrepancies between the high speed MSI register C5A and the slower speed MOS memory units D5A and D6A. Specifically, if there was not data delay, the data would be gone before the MOS memory units D5A and D6A could clock it into the first stage thereof. Flip-flop E8B is shifted on the trailing edge of the clock pulses applied thereto from gate C2B whereas the shift registers D5A and D6A are shifted on the edge.

The leading edge of the load data pulse on line 281, from the A/D converter and computation timing counter unit 152 of FIG. 9, causes data to be transferred from the A/D converter (FIG. 9) on lines AD3, AD2, AD1 and AD0 into the MSI register C5A. The trailing edge of the load data pulse sets flip-flop E8B to the value of the most significant bit appearing on output pin 10 of the MSI register C5A. The leading edge of the first shift pulse appearing on line 284 transfers this bit into the MOS register and shifts the MSI register; the trailing edge then sets flip-flop E8B to a value of the third significant bit. This process continues till all 4 bits are in the first four stages of the MOS register D5A and D6A. At the same time the stored data for the next sample segment is being shifted into the other end of the MSI register C5A. There is no timing problem here since the delay time of the MOS register keeps the data value on the output for more than enough time to transfer it to the MSI register.

The MSI register C5A provides additional memory operation control functions. The shift input pin 11 thereof is controlled by a clock signal which is zero during the computation time for preventing data from being shifted.

The load input pin 9 of MSI register C5A is controlled by two conditions. More particularly, the counter C4A (FIG. 9), the 4 bit counter driven by the field flip-flop B8A and B8B through the frame counter E8A of FIG. 13, counts frames. Every 16 frames, the four outputs of counter C4A are all a logical "1" simultaneously, causing the output of NAND A8B to go to zero and the output of inverter C1E to become a logical "1" for that particular frame. This enables the load input pin 9 of MSI register C5A (FIG. 10) and when a clock pulse comes from the MSI decoder C10A (FIG. 9) through line 282 and gate C2B (FIG. 10) to the clock input pin 5 of MSI register C5A, data is transferred from the A/D counter through lines AD3, AD2, AD1 and AD0 into the memory. Thus, the memory is normally updated every 16 frames.

The other condition controlling the load input 9 of MSI register C5A is generated by the alert signal on line 171 from gate C8D of the multiplex portion of the arithmetic unit of FIG. 12 which sets the inhibit flip-flop 298.

Should a noise spike coincide in time with a sample, an erroneous value for the video may be in the A/D converter. This would cause an alert signal from the arithmetic unit but not an alarm. If this erroneous value were placed in the memory, however, an intrusion indication and a consequent alarm would occur because the incorrect value from memory would be compared with good data, not reflecting an intrusion, for the next 16 frames. It is for this reason that if an alert signal occurs, the inhibit RS flip-flop 298 becomes set. Buffer inverter C2C translates the resultant logical "1" appearing on output pin 3 of NAND C8A of the RS flip-flop 298 to a logical "0" which is applied to the load input pin 9 of MSI register C5A thus inhibiting the load input and preventing possible erroneous data from entering the memory.

Thus, in summary, a digitized sample is entered in parallel from lines AD3, AD2, AD1 and AD0 into the MSI register C5A and passes out from pin 10 thereof in series through the flip-flop E8B and DTL power gate C6B to the memory shift registers D5A and D6A, shifting through the MOS memory as further samples from the same field and further samples from succeeding fields of succeeding cameras are processed. The first mentioned sample is then shifted out of the MOS memory and applied in series through line 296 to input pin 3 of the MSI register C5A, appearing on the parallel output pins 10, 8, 6 and 4 thereof and hence on the stored sample output lines M3, M2, M1 and M0 at the same time that a new sample for the same sample point in the next field by the same camera appears as newly digitized sample on the lines AD3, AD2, AD1 and AD0.

ARITHMETIC UNIT (FIGS. 11 AND 12)

Thus, the arithmetic unit 161 receives a parallel 4 bit representation of the new sample and simultaneously receives a four bit representation of a stored sample for the same point for the same camera, through paths 160 and 169, respectively.

The arithmetic unit 161, comprising the multiplexer circuit 161B and the combinational logic circuit 161A (FIGS. 12 and 11, respectively), acts as a hard wired, read-only memory whose output is a logical "0" if the absolute value of (AD3 AD2 AD1 AD0 − M3 M2 M1 M0) is greater than or equal to R. $R = 2$ in the particular embodiment shown.

More particularly, the combinational logic circuitry 161A (FIG. 11) provides to the multiplexer circuitry 161B a plurality of functions of the variables AD1 and AD0 which are applied to the 64 inputs of the second level multiplexers D1 through E4. The values of the variables M3, AD2 and AD3 applied to the address inputs, pins 2, 1 and 13, of each of the second level multiplexers D1 through E4 determines which of the inputs of each such multiplexer is applied to the output pin 8 thereof and thence to the respective input of the first level multiplexer F1. The variables M2, M1 and M0 applied to the address inputs 2, 1 and 13 of the first level multiplexer F1 determine which of its inputs will be applied to its output pin 8.

Thus, for example, for a stored sample on lines M3, M2, M1 and M0 of value 0100 (or 4) and a corresponding newly digitized sample on lines AD3, AD2, AD1 and AD0 of value 0110 (or 6), the value M2 M1 M0 = 100 would be applied to the address inputs 13, 1 and 2, respectively, of the first level multiplexer F1, so that the output pin 8 thereof would internally connect to input pin 4 thereof and thence to the output pin 8 of second level multiplexer D2. The value AD3, AD2, M3 = 010 would be applied to the address pins 2, 1 and 13, respectively, of the second level multiplexer D2. In consequence, the output pin 8 of second level multiplexer D2 would connect internally to input pin 5 thereof, which carries the value of $\overline{AD1}$. Since AD1 in the present example is a logical "1," $\overline{AD1}$ would be a logical "0" which would be applied to the output pin 8 of first level multiplexer F1 which is the output condition for an alert. This is the correct condition since the difference between the new sample and the stored sample is 2 and an alert is here required for differences of 2 or more.

The output appearing at pin 8 of the first level multiplexer F1 is inverted by inverter F7D and clocked through the gate C8D by the alert clock on line 165 to provide an alert signal on alert line 171, such alert signal being applied by the line 171 to the intrusion logic unit 172.

INTRUSION LOGIC UNIT (FIG. 13)

The intrusion logic unit 172 (FIG. 13) may receive an alert signal on line 171 from the arithmetic unit 161 at any time during a field and such alert signal will set the flip-flop C3B. The end of field (EOF) signal on line 209 clocks the alert signal stored in the flip-flop C3B into the four bit suspicion storage register F2A at the end of that field. The EOF signal on line 209 also resets the flip-flop C3B for receiving a possible alert signal in a succeeding field. Four fields later, when the particular camera responsible for the alert above discussed is again being sampled, the suspicion bit or alert pulse previously clocked into the suspicion storage register F2A is present on output pin 10 thereof in the form of a logical "1" and is placed on input pin 2 of NAND D8A. If a second alert signal is generated during that field, it is inverted by inverter D10F and appears as a logical "1" on the other input, pin 1, of NAND D8A, with the result that a logical "0" appears on the output of NAND D8A indicating an intrusion has occurred.

The field flip-flop A7A of the sync logic unit 110 of FIG. 3 places the $\overline{FFF}$ signal appearing on line 213 on the clock input, pin 1, of the frame flip-flop E8A. The line 213 changes state once per field and, hence, cycles once per frame, thus causing the frame flip-flop E8A to change state once per frame. The field flip-flop A7A of FIG. 3 and the frame flip-flop E8A together give a 2 bit binary code which is decoded by the gates D8B, D8C, D8D and D9A and inverted by the inverters D10B, D10C, D10D and D10E for producing a "one and four camera" code. Thus, a logical "1" will appear on one and only one of the outputs of the aforementioned inverters, such logical "1" output occurring while the corresponding one of the cameras is being sampled. The "one and four camera" code is applied to the gates F4A through F4D for causing same to gate the sampling signal on line 180 sequentially through inverters F5A through F5D to drive the analog sample and hold circuits of the sample and hold unit 140 (FIG. 7) through the lines 261 through 264, respectively, which lines comprise the path 181 of FIG. 1. As a result, the cameras are sampled in sequence, each for a single field.

The "one and four camera" code from the inverters D10B, D10C, D10D and D10E is also applied to the set inputs of the intrusion storage flip-flops F3A, F3B, F10A and F10B to enable same to toggle to a set condition on the trailing edge of an intrusion pulse applied by the inverter D10A to the clock inputs thereof. Thus, when an intrusion is detected, a corresponding one of the four intrusion storage flip-flops will be set and will thus "store" the intrusion signal. The direct output from the set one of the intrusion storage flip-flops is applied through the corresponding one of the lines 325 through 328 and a corresponding one of the lamp drivers E9D, E10A, E10B and E10C to a corresponding intrusion lamp (not shown) to light same and indicate which camera has detected an intrusion. The same direct output is similarly applied through a corresponding one of the inverters F5F, F7A, F7B and F7C and thence through line 177 to the gate C2C of the memory unit 158 of FIG. 10 to allow updating of the memory for the corresponding camera. Still further, the same direct output is applied to the corresponding one of the flip-flops of the monitor switching logic unit 175 of FIG. 14.

The direct reset inputs of the intrusion storage flip-flops F3A, F3B, F10A and F10B are connected to suitable manual switches (not shown) through lines 331 through 334, respectively, such switches conveniently being placed on a panel accessible to the system operator and arranged so that the flip-flops can be reset by pushbuttons or locked to zero by suitable switches. Thus, once the system operator has noted that an intrusion has occurred, noted the particular camera on which it has occurred and made any further necessary investigation, he can, by such actuation of such reset switches, return the set one of the intrusion storage flip-flops to its normal reset condition to enable it to register a future intrusion. Such resetting of the set intrusion storage flip-flop also extinguishes the intrusion lamp driven by the corresponding actuated one of the drivers E9D, E10A, E10B and E10C.

MONITOR SWITCHING LOGIC UNIT (FIG. 14)

The purpose of the monitor switching logic unit 175 is to generate drive signals to the video monitor switch unit 179 so that the monitor 113 will be connected to the one of the cameras which shows an intrusion. It also ensures that several intrusions occurring in close succession on different cameras will not result in multiple images on the monitor.

Normally, all of the intrusion lines 325 through 328 from the intrusion logic unit 172 are at a low potential. This holds the monitor control flip-flops E6A, E6B, E7A and E7B in the reset state. When an intrusion occurs during a field, the reset signal is removed from the corresponding monitor control flip-flop and the set input thereof is enabled. At the end of that field, the end of field (EOF) signal, passed by the gate D9C to the clock inputs of all of the monitor control flip-flops, triggers the thus enabled one of such state. This provides a logical "1" potential on the direct output of that monitor control flip-flop, lighting the associated monitor indicator light (not shown) through the corresponding one of the drivers C6C, C6D, E9A and E9B and through the corresponding one of the lines 352 through 355. Achievement of the set state by one of the monitor control flip-flops E6A, E6B, E7A and E7B also provides, through a corresponding one of the lines 352 through 355, an output to the appropriate one of the switch circuits of the video monitor switching unit 179 for connecting the intrusion indicating camera to the monitor.

Gate E5A detects the logical "0" appearing on the complemental output of the set one of the monitor control flip-flops E6A, E6B, E7A and E7B and turns on the audio alarm 189 and relay 196 (FIG. 1) through the driver E9C as well as inhibiting the EOF gate D9C through the inverter D9B. Such inhibition of the gate D9C prevents the EOF signal from reaching the toggle inputs of the monitor control flip-flops E6A, E6B, E7A and E7B thus assuring that only one thereof at a time can be set and thus assuring that the image of more than one camera will not appear at the same time on the monitor. The line 348 connected to the input pins 9, 13, 2 and 6 of the gates C6C, C6D, E9A and E9B, respectively, may be connected to a manual switch (not shown) for the purpose of placing a ground or logical "0" on such inputs to disable such gates and thus prevent the output of the intrusion detecting camera from being placed on the monitor or actuating a corresponding monitor indicator light. Such may be desired when the operator chooses to view the output of a camera other than the one which has shown an intrusion and while the intrusion is still being stored in the appropriate intrusion storage flip-flop of the intrusion logic unit 172.

VIDEO MONITOR SWITCH UNIT (FIG. 15)

The video monitor switch 179 comprises a series of identical switch circuits, one per camera, one thereof being indicated at 365. The video signal from the corresponding camera, which in the instance of the particular circuit 365 is the camera 119, is applied through the line 125 to the source S of FET Q17, the drain D of FET Q17 being tied to a common output line 186 along with the outputs of the other switch circuits corresponding to the other cameras. The switch signal from the monitor switching logic unit 175, more particularly the line 352, is applied to the gate of FET Q18. When such gate drops in potential, the resulting FET Q18 conduction causes transistor Q19 to conduct. The resultant drop in potential on the collector of transistor Q19 causes the gate G of FET Q17 to drop and thus causes the video applied to the source S thereof to be conducted through the drain D thereof to the common output line 186. When the polarity of the switch input to FET Q18 is reversed, a voltage more positive than the signal voltage on the source S of FET Q17 is applied to the gate G of the FET Q17 blocking conduction thereof and thus preventing the transfer of video by the switch circuit 365 to the output line 186.

VIDEO MONITOR AMPLIFIER UNIT (FIG. 16)

The video monitor amplifier unit 187 includes the camera video amplifier 370 which amplifies the video from the selected camera applied to the line 186 and provides same at a suitable level and output impedance on the line 188 to the monitor 113 whereat such video is displayed as an image of the scene viewed by the selected camera.

The video monitor amplifier unit 187 also include the sample display amplifier circuit 371, which consists of a pulse differentiator and a pulse amplifier. The differentiator, comprising capacitor C20 and resistor R44, will pass only the first 2 microseconds of the sample pulse appearing on the line 191 from the sample generator unit 145. Transistor Q21 amplifies the differentiated pulse and transistor Q4 impedance matches the amplified pulse to the monitor input and applies same to the line 188. The switch 195 in the line 191 allows the operator to choose whether or not sample points will be displayed on the monitor 113. The sample points, if displayed, will be shorter than those disclosed in FIG. 17.

The video monitor switch unit 179 and the video monitor amplifier unit 187, acting together, allow the several cameras' video output signals to be isolated from each other to prevent cross talk, which might impair the operation of the alert and intrusion determining portions of the circuit. The camera video amplifier circuitry 370 serves the additional purpose of isolating the camera video from the sample display circuitry 371.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a system for maintaining surveillance over a scene, capable of sensing changes in a parameter of the scene and of discriminating between changes of interest and changes not of interest in the scene, the combination comprising:

scanning means for scanning the scene and producing a scan signal which varies with changes in a sensed parameter of the scene;

sampling means for taking samples from said scan signal, said samples corresponding to spaced, discrete locations in said scene;

digitizing means for digitizing said samples and having K output lines so as to produce for each sample a digitized sample in parallel form;

memory means for storing each said digitized sample and capable of retrieving a stored digitized sample for a particular discrete location in the scene when said location is again scanned by said scanning means, said memory means having K output lines for providing a stored sample in parallel form;

arithmetic means having 2K inputs receiving in parallel the multibit outputs of said digitizing means and memory means and responsive to a difference of preselected magnitude between a digitized sample and a stored sample for the same location in the scene obtained in a prior scan, for producing an alert signal;

output means responsive to a preselected number of alert signals from different scans of said scene for providing an output indicating that a change of interest has taken place in the scene.

2. The system defined in claim 1, in which said digitizing means includes means for generating a time duration proportional to the value of each said sample and means responsive to said time duration for generating a parallel, multi-bit digital value proportional to said time duration and comprising said digitized sample.

3. The system defined in claim 1, in which said memory means includes first shift register means for receiving a newly digitized sample in parallel form and second shift register means for receiving said newly digitized sample in serial form from said first shift register means and for returning same in serial form to said first shift register means after a preselected time delay synchronized with a full cycle of scanning by said scanning means, said first shift register means having outputs for producing said stored sample in parallel form.

4. The system defined in claim 1, in which said arithmetic means comprises at least one digital multiplexer having an output terminal, $2^n$ input terminals and $n$ address terminals wherein signals applied to the address terminals uniquely determine which of said input terminals is connected to said output terminal; and including means applying to said address terminals signals which include at least a part of one of the digitized sample and stored sample and means for providing to said input terminals functions of at least one variable representing a further portion of the other of said digitized sample and stored sample, wherein said functions are determined in accordance with the relationship of the values of the digitized sample and stored sample required to produce an alert signal.

5. The system defined in claim 1, including means responsive to an alert signal for preventing storage in said memory means of the digitized sample causing such alert signal, means for storing an alert signal while the scanning means responsible for such alert signal completes at least a single scan of the scene and for reading out said stored alert signal during another scan of the scene by said scanning means, and means responsive to the occurrence of an alert signal and a stored alert signal for producing said output.

6. The system defined in claim 1, in which said digitized sample and said stored sample each comprise a multi-bit number, in which the condition for an alert signal comprises a minimum numerical value for the difference of the digitized sample number and the stored sample number; and wherein said arithmetic means comprises at least one digital multiplexer device having an output terminal, a plurality of address input terminals and a plurality of data input terminals, means for generating functions of at least one of said least significant bits of one of said digitized sample number and said stored sample number and for applying said functions to preselected ones of said data input terminals, and means for applying in parallel to the address inputs of said digital multiplexer remaining ones of said bits of said digitized sample number and said stored sample number.

7. The system defined in claim 1, in which said arithmetic means comprises an array of digital multiplexer devices comprising at least one first digital multiplexer device having data inputs connected to the outputs of a plurality of further digital multiplexer devices, means providing functions of at least one portion of the digital representation for one of said stored sample and said digitized sample to the data inputs of said further digital multiplexer devices and means for providing remaining portions of said stored sample and digitized sample to address inputs of all of said digital multiplexer devices, said functions being selected to provide an output from said first digital multiplexer device which changes when the difference between said digitized sample and stored sample exceeds a preselected difference, said changed output constituting said alert signal.

8. The system defined in claim 1 in which said arithmetic means includes an output and means including a plurality of paralleled data flow paths coupling said parallel inputs of said arithmatic means to said output thereof for producing an alert signal pulse without conversion of said samples to serial digital form.

9. The system defined in claim 1, in which said arithmetic means comprises a first circuit including a digital multiplexer having an output terminal, $2^n$ input terminals and $n$ address terminals wherein signals applied to the address terminals uniquely determine which of said input terminals is connected to said output terminal;

means applying to said address terminals signal which include at least a part of one of the digitized sample and stored sample;

a second circuit having $2^n$ further output terminals connected to said input terminals on a one to one basis and a plurality of further input terminals, means applying to said other input terminals the remaining part of said digitized sample and stored sample and means in said second circuit interconnecting said further input terminals with said further output terminals in accordance with the relationship of the values of the digitized sample and stored sample required to produce an alert signal.

10. The system defined in claim 1 in which said digitized sample and said stored sample each comprise first and second multi-bit numbers, said arithmetic means being arranged for comparing such first and second multi-bit numbers and comprising:

a digital multiplexer having an output terminal, N address terminals and $2^N$ input terminals;

means applying to said address terminals bits of at least one of said first and second multi-bit numbers;

a cooperating circuit having $2^N$ outputs each connected to a corresponding input of said multiplexer;

means applying to corresponding inputs of said cooperating circuit the remaining ones of said bits of said multi-bit numbers, said cooperating circuit including means interconnecting said inputs and outputs thereof in accordance with a Karnaugh map arranged to indicate the desired signals to appear on said output terminal for all values of said first and second numbers, whereby for any values of said first and second numbers a signal will appear on said output terminal of said multiplexer indicating whether the difference between such first and second numbers falls within a preselected limit.

11. The system defined in claim 1, in which a plurality of scanning devices are provided, each capable of scanning a separate scene; and including monitor means for displaying signals from said scanning devices; and wherein said output means includes means storing an alert signal from one scanning device discreetly from alert signals from other scanning devices for producing an output only in response to said number of alert signals generated by processing samples from the same scanning device.

12. The system defined in claim 11, in which said output means includes means providing an intrusion signal in response to said number of alert signals from a given scanning device, intrusion storage means for each scanning device actuable by a corresponding intrusion signal and means responsive to such intrusion storage for switching the scan signal of the one of the scanning devices responsible for said intrusion signal to said monitor means.

13. The system defined in claim 11, including sequencing means cooperable with said sampling means for sampling the scan signals of the several scanning devices in a predetermined sequence, said sequencing means including means coordinated with the scanning rate of said scanning devices for providing coded digital signals and gate means responsive to said coded signals for determining said sampling sequence.

14. The system defined in claim 1 in which said scanning means scans a series of paths across the scene, the length of a given scan path being at least a multiple of the length of a sample to enable detection of changes along the path with substantial definition, the length of a sample substantially exceeding the length of typical random noise spikes for averaging out the contribution of such spikes.

15. The system defined in claim 14 in which the sample length is about 4 microseconds.

16. The system defined in claim 14 in which said digitizing means includes first capacitive storage means for receiving and holding said sample in analog form until said digitizing means is ready to digitize said sample, said digitizing means further including a further capacitive storage means, a current source for charging same, and means establishing a pulse count at a constant rate during charging of said further capacitive storage means to the level of said first capacitive storage means for providing thereafter said digitized sample as an output thereof.

17. In a surveillance system, the combination comprising:

a plurality of scanning devices;

timing means for controlling the scanning of said scanning devices;

sample generator means for generating a sample pattern;

sampling means for applying the sample pattern to the outputs of said scanning devices to provide a series of output samples for a given scanning device;

means responsive to said timing means for providing a sequentially occurring plurality of code signals each assigned to a corresponding scanning device and occurring when the corresponding scanning device is being sampled, each code signal lasting at least one scanning field;

gating means assigned to each scanning device and responsive to said code signals for gating said sample pattern therethrough in said sequence to the sampling means for the corresponding scanning device;

processor means for processing said output samples in digital form and providing an alarm upon occurrence of change of interest in the domain monitored by any scanning device.

18. The system defined in claim 17 in which said processor means includes means responsive to such change of interest for providing an intrusion signal, a plurality of intrusion storage devices assigned to corresponding ones of said scanning devices and each responsive to a corresponding one of said code signals for achieving a storage condition upon occurrence of an intrusion signal from the corresponding scanning device, indicator means responsive to each storage device for indicating which scanning device is responsible for an intrusion signal;

a monitor for displaying the output of a selected scanning device; and monitor control means responsive to said storage means for switching to said monitor the output said responsible scanning device.

19. The system defined in claim 18 including means responsive to the output of said monitor control means for preventing display on said monitor of more than one scanning device output at a time.

20. The system defined in claim 18 including further indicator means responsive to said monitor control means for indicating which of said scanning devices is responsible for the display on said monitor.

21. In a surveillance system for maintaining surveillance over a domain, capable of discriminating between changes of interest and changes not of interest in the domain, and usable with at least one sensor capable of providing an electrical output signal comprising first and second sets of samples, the samples of said first set being spaced in and representative of the condition of corresponding portions of said domain during a first time period, the samples of said second set being spaced in time in the same manner as the samples of the first set and representative of the condition of the same corresponding portions of said domain during a second time period, corresponding samples of said first and second set differing in accordance with a change in the condition of the corresponding portion of the domain from said first to said second time periods, the combination comprising:

digitizing means for digitizing a sample of said first set and a sample of said second set;

memory means for storing said digitized sample of said first set;

arithmetic means responsive to a difference of preselected magnitude between said stored sample and said corresponding sample of said second set for generating an alert signal, said alert signal indicating a moderate probability that the change in this scene is a change of interest;

logic means responsive to a preselected number of alert signals for providing an output, said output indicating a high probability that a change of interest has occurred in the domain; and output means responsive to said output of said logic means for indicating an alarm condition in said domain.

22. The system defined in claim 21 in which said sample of said first set and said corresponding sample of said second set each comprise a multi-bit number, said digitizing means having a plurality N of sample output lines for providing the several bits of said digitized sample of said second set in parallel, said memory means having a plurality N of sample output lines for providing the several bits of said stored sample in parallel and said arithmetic means having 2N input lines for receiving the bits of said digitized samples of said second set and said stored sample in parallel.

23. In a surveillance system capable of providing multi-bit numbers representative of a parameter of a domain being monitored and more particularly capable of providing two multi-bit numbers for the same portion of the domain taken at two successive times, apparatus for comparing such first and second multibit numbers, comprising:

at least one digital multiplexer having an output terminal, N address terminals and $2^N$ input terminals;

means applying to said address terminals bits of at least one of said first and second multi-bit numbers and means for generating and applying to the input terminals of said digital multiplexer functions of said remaining ones of said bits of said first and second multi-bit numbers, said functions being selected to provide at said output an indication of whether the difference between said first and second numbers is less than a preselected reference value.

24. The system defined in claim 23, including one first level digital multiplexer and eight second level digital multiplexers, the outputs of each second level multiplexer being connected to a corresponding input of said first level multiplexer, said means for establishing functions comprising NAND and inverter gating circuitry having the least significant bits of one of said first and second numbers applied thereto, said gating circuitry providing Boolean algebra functions of said least significant bits;

means for applying said functions to the input of said second level multiplexers in accordance with a Karnaugh map arranged to indicate desired outputs for all values of said first and second numbers;

means connecting first and second portions of the remaining ones of said bits of said first and second numbers to the address inputs of said first and second level multiplexers, respectively, whereby for any values of said first and second numbers an output will appear on said first level multiplexer indicating whether the difference between such first and second numbers falls within a preselected limit.

25. In a surveillance system capable of discriminating between changes of interest and other changes not of interest, both types of changes being sensed by the system, the combination comprising:

a set of N television cameras and a television monitor capable of displaying the output of said cameras;

a timing counter providing a plurality of timing signals of different periods;

sync logic means responsive to said timing signals for generating horizontal and vertical sync signals for said cameras, a sync signal for said monitor having superimposed horizontal and vertical sync components, an end of field signal occurring at the end of each field of scan of each camera and a field signal which cycles once for each two fields of scan;

video amplifier means for each camera for providing video output signals having the same dark level voltage and maximum voltage for each camera;

sample generator means responsive to said timing signals for generating a basic sample pattern and vertical and horizontal masking signals and including means for combining said basic sample signal with said vertical and horizontal masking signals and with a further one of said timing signals for providing a series of sampling signals of length determined by said further timing signal and defining a final sampling pattern of M sample segments per field;

a set of N sample and hold circuits responsive to said video amplifier means for providing samples;

means responsive to said field signal for providing a frame signal which cycles once in every four fields;

decoding means responsive to said field signal and said frame signal and comprising N decoding gates actuable in a predetermined sequence and further gates responsive to the output of said decoding gates for applying said sampling signals to said N sample and hold circuits in said predetermined sequence for sampling the output of said N cameras in sequence for at least one field at a time;

matched first and second electronic switches controlled by sample storage means and ramp storage means, respectively, said sample storage means receiving samples from said sample and hold circuits;

a constant current source for charging said ramp storage means and discharge means for preventing charging of said ramp storage means;

a bistable device responsive to initiation of sampling signals by said sample generator means for achieving an actuated state and A/D counter means responsive to occurrence of said actuated state and to timing signals from said main timing counter unit for producing a parallel digital output;

means responsive to occurrence of said actuated state for disabling said discharge means and enabling said constant current source for charging said ramp storage means;

comparator means responsive to achievement of a preselected relationship between the storage levels in said sample storage means and said ramp storage means for producing an end of conversion signal and for returning said bistable device to a deactuated state, said A/D counter means responding to occurrence of said deactuated state by cessation of counting, the output of said A/D counter comprising a digitized sample;

means responsive to said end of conversion signal and one of said timing signals and including a further counter and further decoding means responsive thereto for providing a series of control pulses including an alert clock pulse, the last of said control pulses resetting said A/D counter means;

memory means for storing digitized samples and including a shiftable data storage device having a capacity of at least N times M bits and an input-output shift register having a serial output and a serial input in circuit with said shiftable memory means, said input-output shift register having parallel inputs connected to the parallel outputs of said A/D counter means and having parallel outputs for providing in parallel bits of a previously stored digitized sample at the time of the parallel input thereto of a new sample for the same location in the field of the same camera;

frame counting means for counting a quantity T of scanning frames of said cameras and at least indirectly responsive to said field signal;

means responsive to the output of said frame counting means for allowing updating of said memory means once every T frames;

combinational logic means responsive to signals corresponding to the least significant digits of said newly digitized one of said digitized samples for producing Boolean functions of variables representing said least significant digits;

an array of digital multiplexers having a plurality of inputs connected to the output of said combinational logic means, address inputs supplied with the remaining ones of said digits of said newly digitized sample and corresponding stored sample from said A/D counter means and memory means, respectively, said inputs of said array being crosswired in a manner to provide an output when the value of the newly digitized sample and stored sample differs by at least a preselected reference number R;

means responsive to said alert clock signal and to said output of said array for providing an alert signal;

first alert signal storage means for storing said alert signal for the remainder of a field and resettable by said end of field signal and second alert signal storage means for receiving an alert signal from said first alert signal storage means upon occurrence of said end of field signal and for storing said alert signal at least until the end of the next field for the camera having produced said alert signal;

means responsive to a further alert signal from a given camera while said first mentioned alert signal for the same camera remains in said second alert signal storage means for producing an intrusion signal;

a set of N intrusion storage devices, each responsive to said intrusion signal and connected to corresponding outputs of said further decoding means for assuming an actuated condition upon occurrence of an intrusion signal resulting from scanning by the corresponding one of said cameras;

a set of N intrusion indicator devices connected to corresponding ones of said intrusion storage devices and responsive to actuation thereof for indicating the one of said cameras responsible for said intrusion signal;

means responsive to actuation of any one of said intrusion storage devices for allowing updating of aid memory means;

a set of N monitor control switches actuable in response to the occurrence of an end of field signal and actuation of a corresponding one of said intrusion storage devices and a set of N video monitor switches each responsive to actuation of a corresponding monitor control switch for coupling the video output of a corresponding one of said cameras to said monitor;

means responsive to an actuated condition of one of said monitor control devices for preventing actuation of others of said monitor control devices for preventing the appearance of double images on said monitor;

alarm and monitor indication means responsive to actuation of one of said monitor control devices for indicating which of said cameras is connected to said monitor and the occurrence of said intrusion signal;

amplifier means interposed between said video monitor switching means and said monitor and actuable for superimposing upon the image carried by said monitor, a representation of said final sampling pattern.

26. In a method for maintaining surveillance over a domain, for discriminating between changes of interest and changes not of interest in the domain, and usable with at least one sensor capable of providing an electrical output signal comprising first and second sets of samples, the samples of said first set being spaced in and representative of the condition of corresponding portions of said domain during a first time period, the samples of said second set being spaced in turn in the same manner as the samples of the first set and representative of the condition of the same corresponding portions of said domain during a second time period, corresponding samples of said first and second set differing in accordance with a change in the condition of the corresponding portion of the domain from said first to said second time periods, the steps comprising:

digitizing a sample of said first set and a corresponding sample of said second set;

storing said digitized sample of said first set;

generating an alert signal in response to simultaneous application to a memory-like circuit of a plurality of digital bits comprising said stored sample and said corresponding sample of said second set differing from said stored sample by a preselected magnitude, said alert signal indicating a moderate probability that the change in this scene is a change of interest;

providing an output in response to a preselected number of alert signals, said output indicating a high probability that a change of interest has occurred in the domain; and indicating an alarm condition in said domain in response to said output.

27. In a surveillance system, the combination comprising:

a plurality of scanning devices;

timing means for controlling the scanning of said scanning devices;

sample generator means for generating a sample pattern;

means for applying the sample pattern to the outputs of said scanning devices in a predetermined sequence for producing samples; and sequencing means for processing the output samples for each said scanning device in sequence and providing an alarm upon occurrence of change of interest in the domain monitored by any scanning device and including means responsive to a change of interest in the scene scanned by one of said scanning devices for providing an intrusion signal, a plurality of intrusion storage devices, each assigned to a corresponding one of said scanning devices and each responsive to a code signal indicating sampling of the output of such corresponding scanning device for achieving a storage condition upon occurrence of an intrusion signal, whereby achievement of a storage condition by one of said storage devices indicates the particular one of said scanning devices responsible for said intrusion signal, memory means for storing said samples, means for controlling updating of said memory means and normally preventing storage in said memory means of new samples from said scanning devices except on preselected periodic occasions, and means responsive to achievement of a storage condition by one of said intrusion storage devices for causing updating of said memory means with fresh samples at times other than on said periodic occasions.

* * * * *

UNITED STATES PATENT OFFICE
CERTIFICATE OF CORRECTION

Patent No. 3 740 466 Dated June 19, 1973

Inventor(s) James M. Marshall and James W. Biglow

It is certified that error appears in the above-identified patent and that said Letters Patent are hereby corrected as shown below:

Column 51, line 49; after "output" insert ---of---.

Column 56, line 6; before "said" (first occurrence) insert ---a---.

line 30; change "domain monitored" to ---scene scanned---.

Signed and sealed this 16th day of April 1974.

(SEAL)
Attest:

EDWARD M.FLETCHER,JR.
Attesting Officer

C. MARSHALL DANN
Commissioner of Patents